United States Patent [19]
Nakano

[11] Patent Number: 5,459,454
[45] Date of Patent: Oct. 17, 1995

[54] MESSAGE TRANSMISSION DEVICE, AND A MESSAGE TRANSMISSION SYSTEM AND A MESSAGE TRANSMISSION STATUS ADVISING SYSTEM USING THE MESSAGE TRANSMISSION DEVICE

[75] Inventor: Yoshio Nakano, Osaka, Japan

[73] Assignee: Matsushita Electric Industrial Co., Ltd., Osaka, Japan

[21] Appl. No.: 120,332

[22] Filed: Sep. 14, 1993

Related U.S. Application Data

[62] Division of Ser. No. 710,333, Jun. 5, 1991, Pat. No. 5,285,203.

[30] Foreign Application Priority Data

Jun. 5, 1990 [JP] Japan .................................... 2-148244
Sep. 17, 1990 [JP] Japan .................................... 2-247837
Apr. 16, 1991 [JP] Japan .................................... 3-83913

[51] Int. Cl.$^6$ ............................................. G05B 23/02
[52] U.S. Cl. ........................ 340/825.06; 340/825.15; 340/825.17; 340/825.18; 358/402; 358/443; 358/444; 358/434

[58] Field of Search .................. 340/825.06, 825.07, 340/825.15, 825.16, 825.17, 825.18, 825.03; 358/402, 434, 443, 444

[56] References Cited

U.S. PATENT DOCUMENTS

| | | | |
|---|---|---|---|
| 4,590,554 | 5/1986 | Glazer et al. | 374/11.3 |
| 4,608,661 | 8/1986 | Sasaki | 364/131 |
| 4,797,884 | 1/1989 | Yalowitz et al. | 374/9.1 |
| 4,823,256 | 4/1989 | Bishop et al. | 364/187 |

*Primary Examiner*—Brent Swarthout
*Assistant Examiner*—A. Hill

[57] ABSTRACT

An electronic message transmission system including at least one transmission apparatus of the electronic message and a plurality of message receivers of the same wherein the electronic message is transmitted according to a predetermined transmission path connecting message receivers. A transmission state of the electronic message is memorized and up-dated in a memory and thereby, an addresser of the electronic message is able to know the state of the message transmission by referring to the contents of the memory.

16 Claims, 42 Drawing Sheets

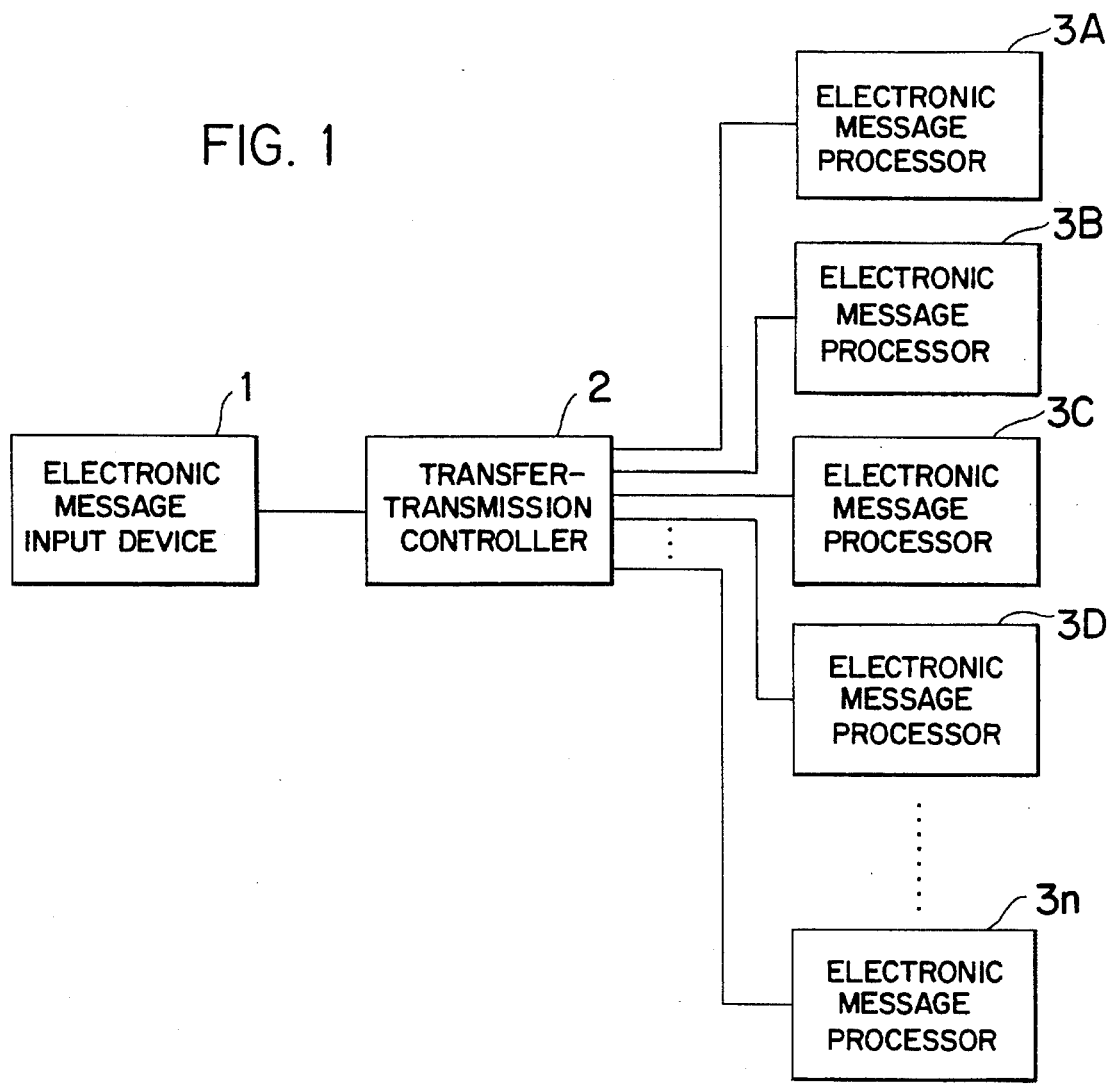
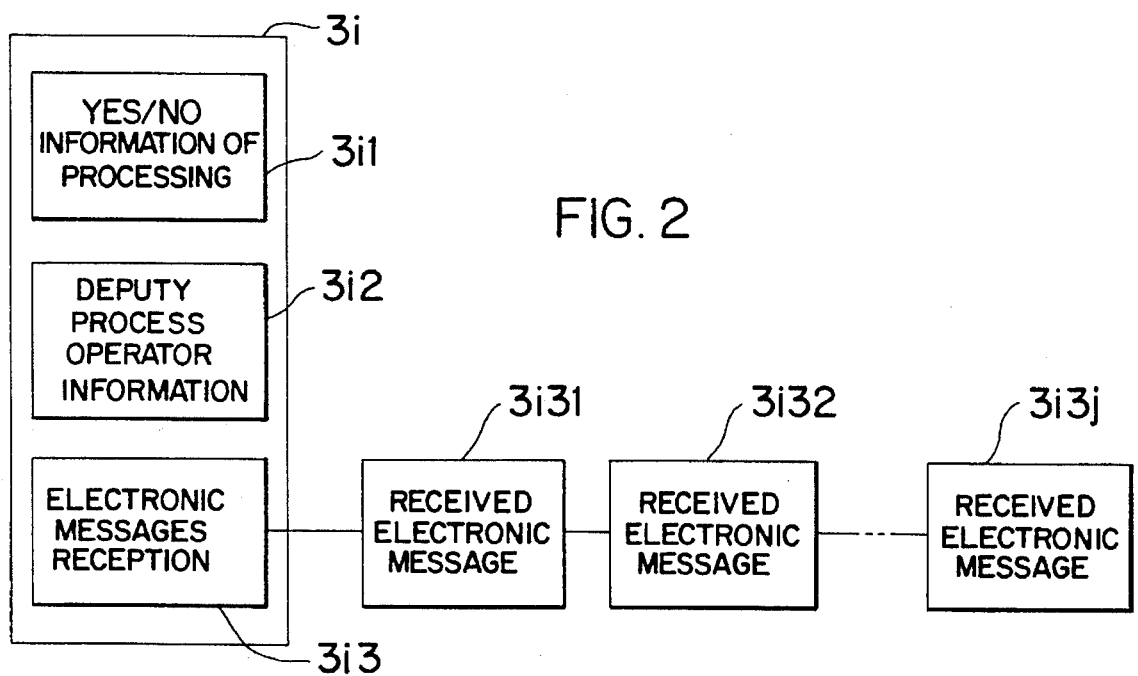

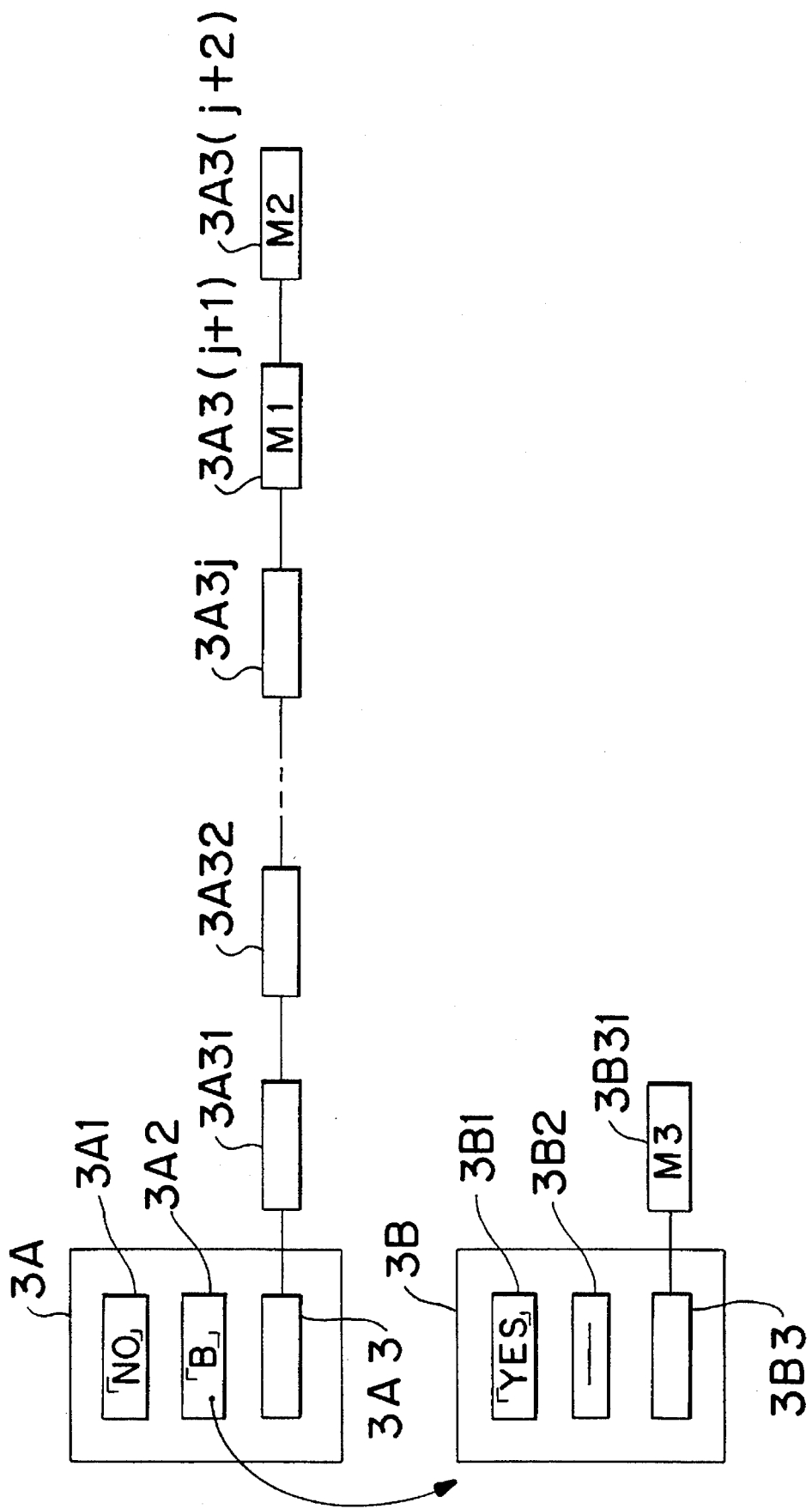

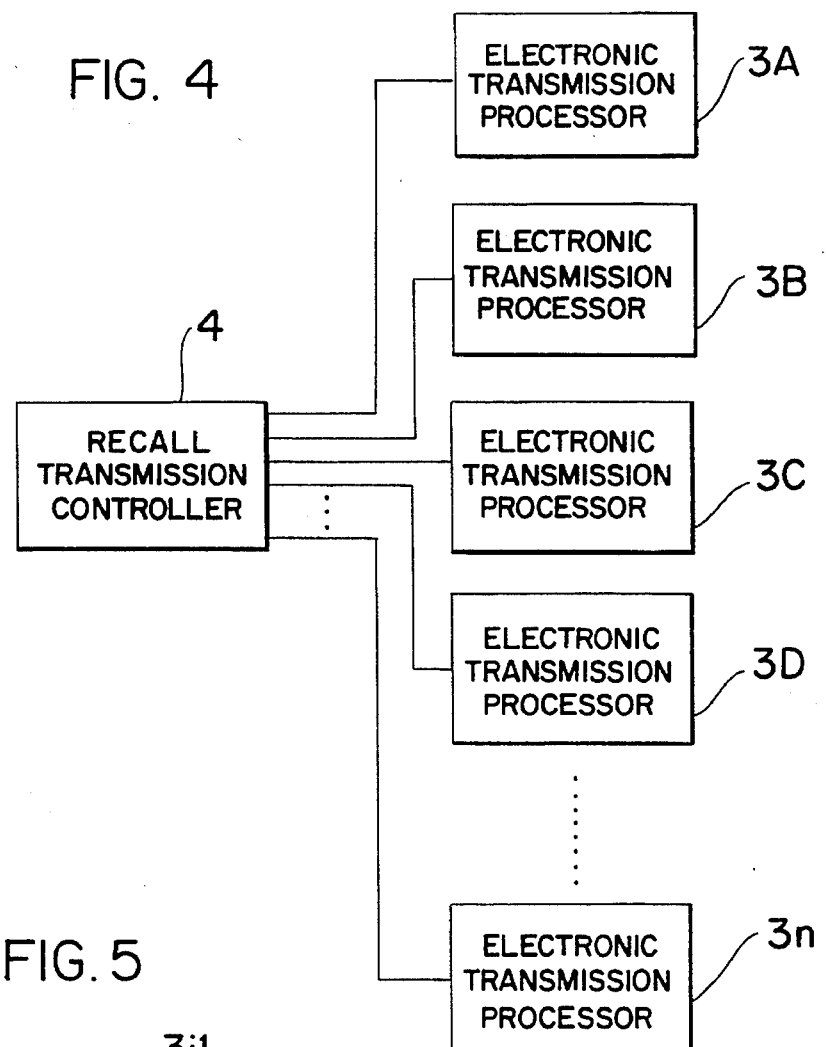
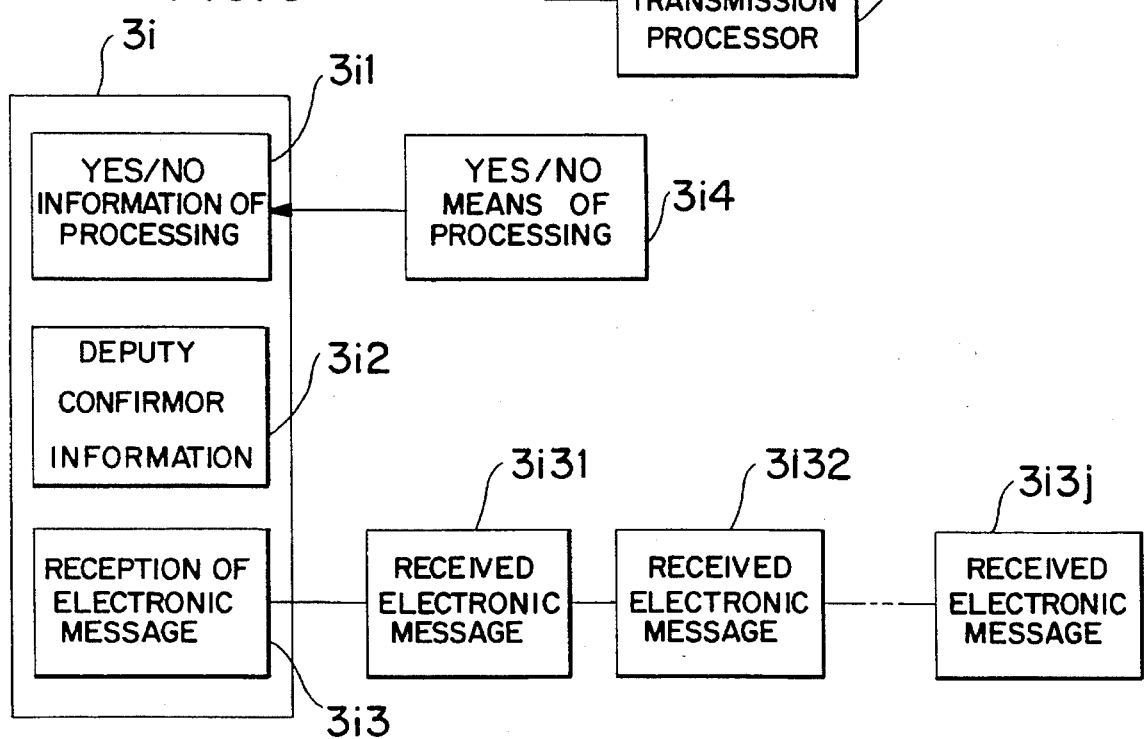

FIG. 10

| ELECTRONIC MESSAGE CLASSIFICATION COLUMN (41) | TRANSMISSION PATH COLUMN (42) |
|---|---|
| A A | A→H→J |
| B B | B→K |
| C C | A→B→C→D |
| D D | C→A→E |

Table 40

FIG. 11

| ELECTRONIC MESSAGE IDENTIFICATION COLUMN (51) | ELECTRONIC MESSAGE PROCESSOR CODE COLUMN (52) |
|---|---|
| #900 | W |
| #1000 | C |
| #1040 | Z |

Table 50

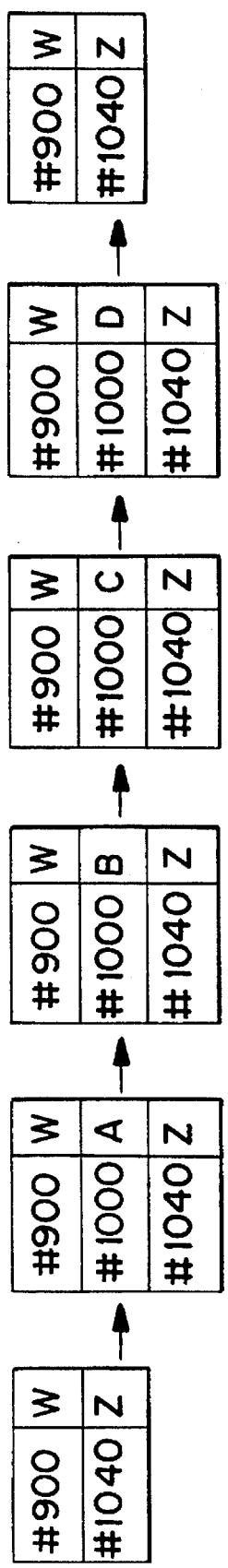

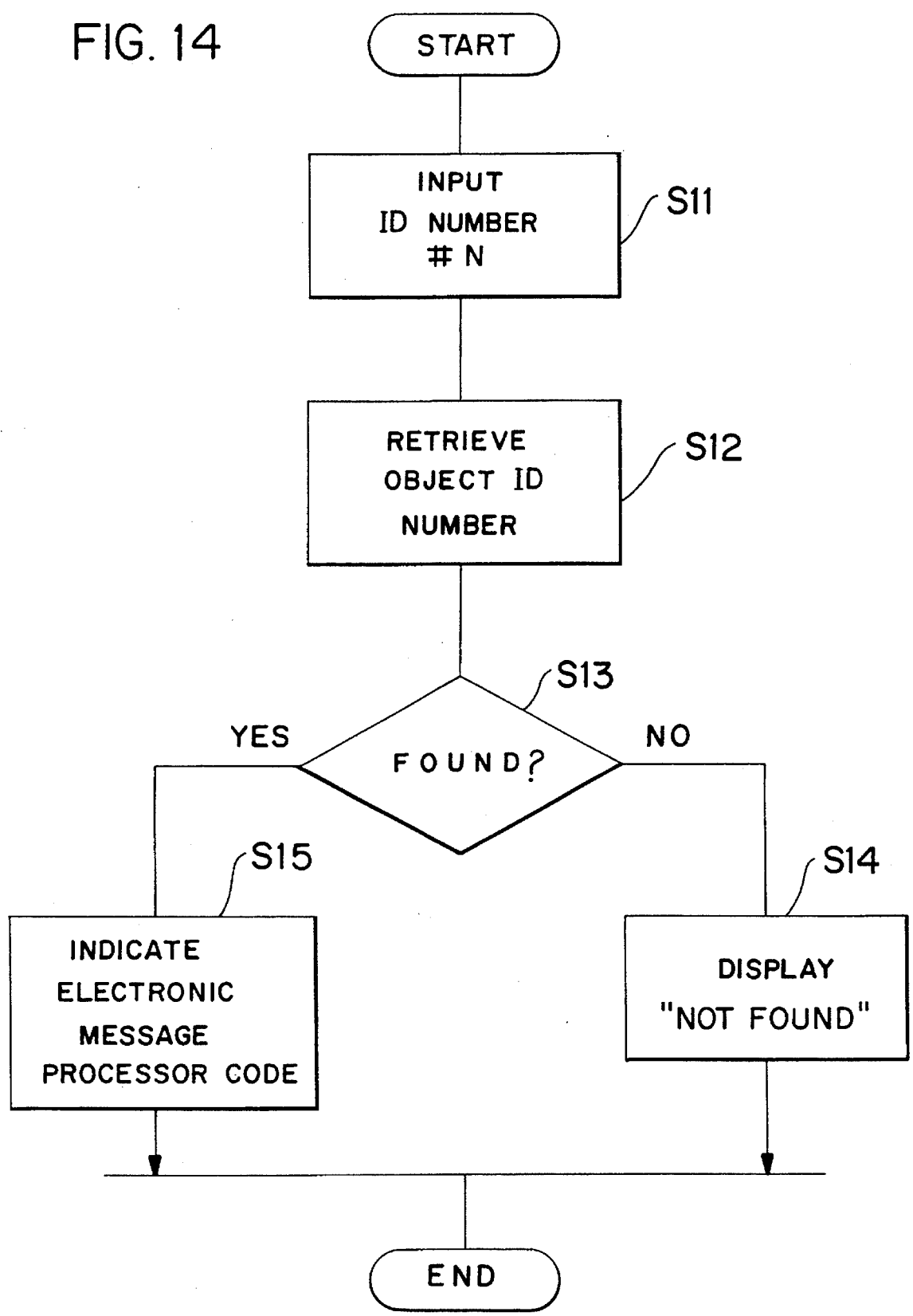

FIG. 16a

| ELECTRONIC MESSAGE CLASSIFICATION COLUMN (54) | ELECTRONIC MESSAGE IDENTIFICATION CODE COLUMN (51) | ELECTRONIC MESSAGE PROCESSOR CODE COLUMN (52) |
|---|---|---|
| K A | #900 | W |
| U U | #920 | C |
| U U | #940 | C |
| U U | #1000 | C |
| U U | #1020 | C |
| K A | #1040 | Z |
| K A | #1100 | W |
|  |  |  |

| ELECTRONIC MESSAGE CLASSIFICATION COLUMN | ELECTRONIC MESSAGE IDENTIFICATION CODE COLUMN | ELECTRONIC MESSAGE PROCESSOR CODE COLUMN | ELECTRONIC MESSAGE TRANSMISSION TIME COLUMN |
|---|---|---|---|
| KA | #900 | W | 9:00 |
| UU | #920 | C | 10:20 |
| UU | #940 | C | 11:30 |
| UU | #1000 | C | 12:00 |
| UU | #1020 | C | 10:45 |
| KA | #1040 | Z | 12:10 |
| KA | #1100 | W | 10:00 |
| | | | |

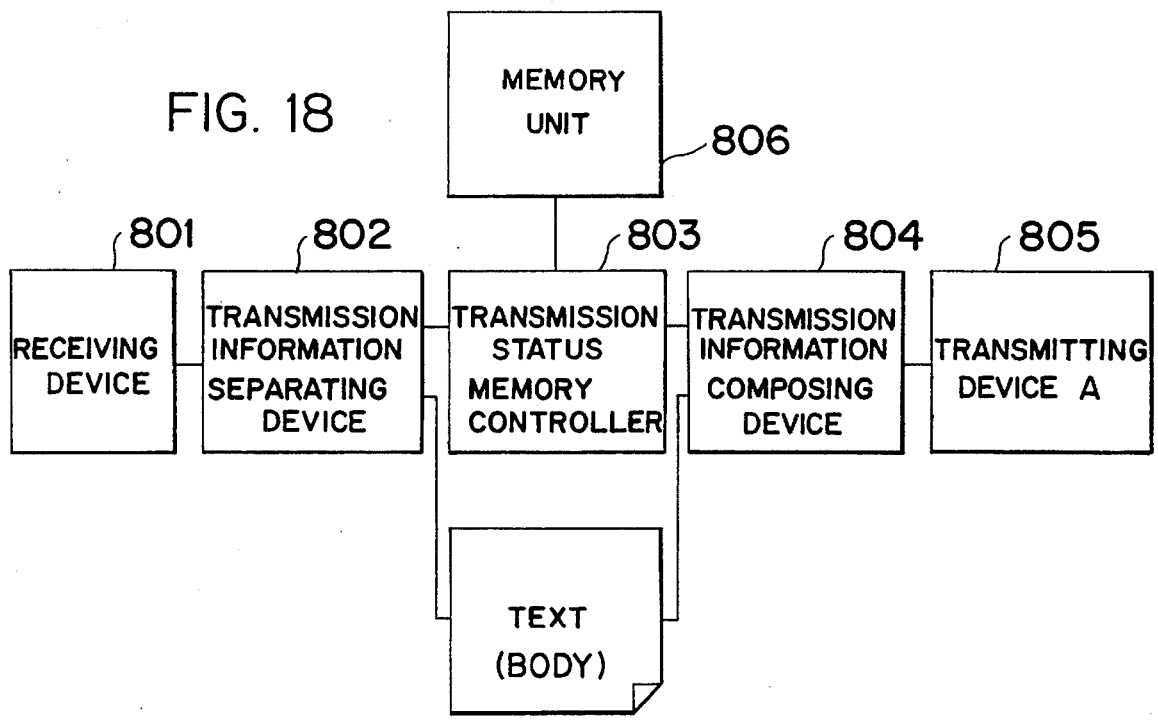
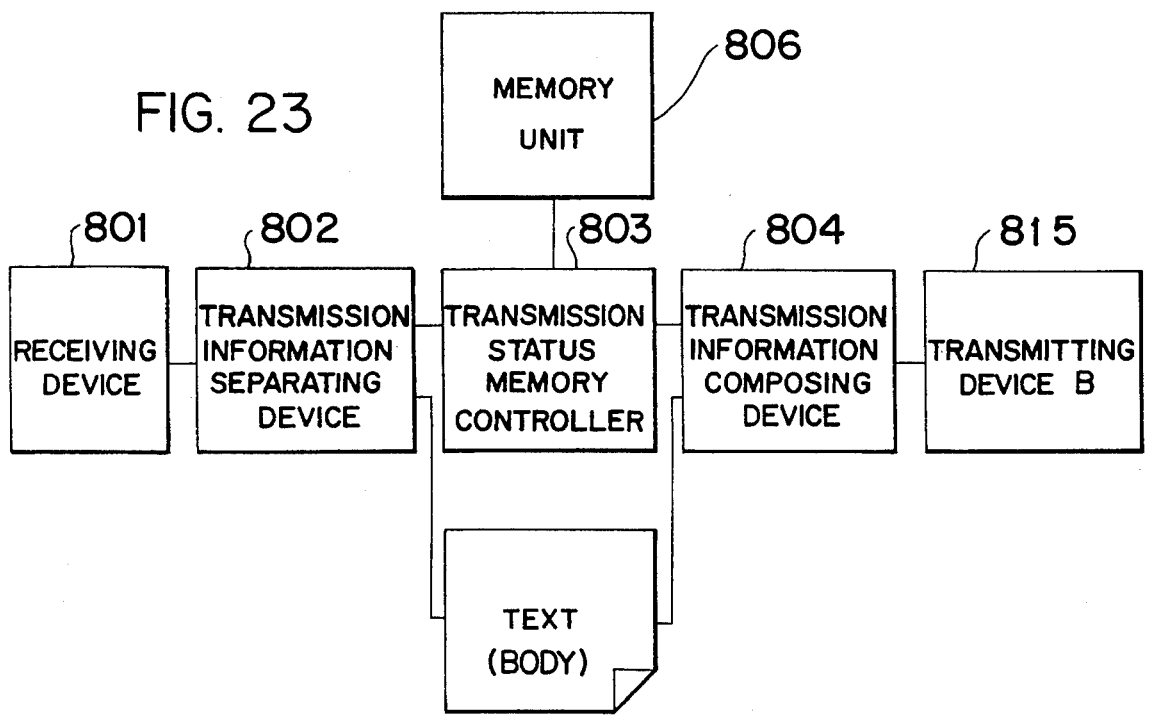

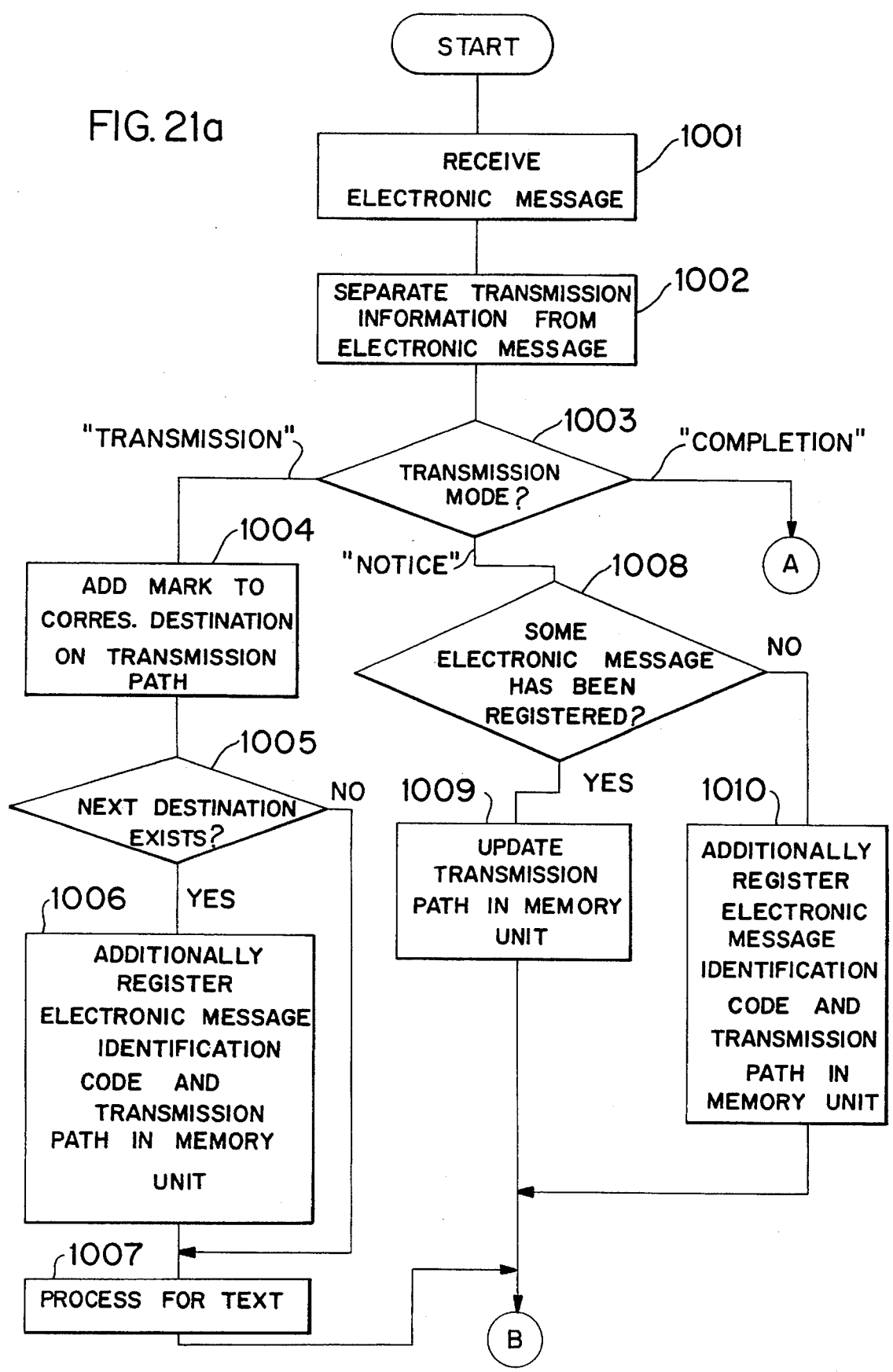

FIG. 22

| DESTINATION (P) RECEIVES | TRANSMIT TO NEXT DESTINATION | TRANSMIT TO PRIOR DESTINATION | CHANGE IN CONTENTS OF MEMORY UNITS |
|---|---|---|---|
| TRANSMISSION<br>#500<br>Xa1,Xa2,P,a4,a5<br>TEXT #500 | TRANSMISSION<br>#500<br>Xa1,Xa2,XP,a4,a5<br>TEXT #500 | NOTICE<br>#500<br>Xa1,Xa2,XP,a4,a5<br>TEXT #500 | CODE \| TRANSMISSION PATH<br>#500 \| Xa1,Xa2,XP,a4,a5 |
| TRANSMISSION<br>#510<br>Xb1,Xb2,Xb3,P<br>TEXT #510 | | TRANSMISSION<br>#510<br>Xb1,Xb2,Xb3,XP<br>TEXT #510 | CODE \| TRANSMISSION PATH<br>#500 \| Xa1,Xa2,XP,a4,a5 |
| NOTICE<br>#500<br>Xa1,Xa2,XP,Xa4,a5<br>TEXT #500 | | NOTICE<br>#500<br>Xa1,Xa2,XP,Xa4,a5<br>TEXT #500 | CODE \| TRANSMISSION PATH<br>#500 \| Xa1,Xa2,XP,Xa4,a5 |
| NOTICE<br>#520<br>XP, C2, C3<br>TEXT #520 | | | CODE \| TRANSMISSION PATH<br>#500 \| Xa1,Xa2,XP,Xa4,a5<br>#520 \| XP, C2, C3 |
| COMPLETION<br>#500<br>Xa1,Xa2,XP,Xa4,Xa5<br>TEXT #500 | | COMPLETION<br>#500<br>Xa1,Xa2,XP,Xa4,Xa5<br>TEXT #500 | CODE \| TRANSMISSION PATH<br>#520 \| XP, C2, C3 |

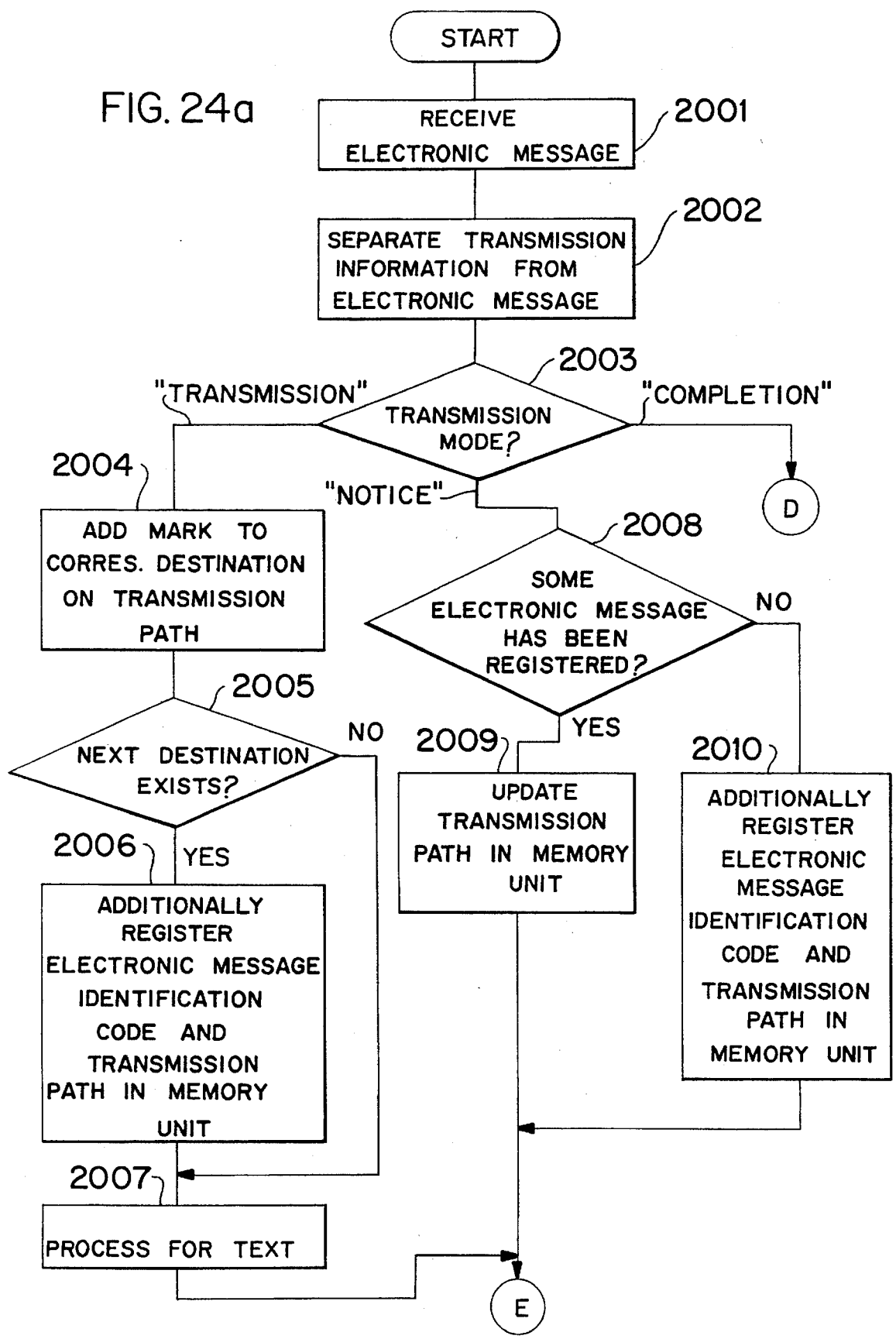

FIG. 25

| DESTINATION (P) RECEIVES | TRANSMIT TO NEXT DESTINATION | TRANSMIT TO ALL PRIOR DESTINATIONS | CHANGE IN CONTENTS OF MEMORY UNIT |
|---|---|---|---|
| TRANSMISSION<br>#500<br>Xa1,Xa2,P,a4,a5<br>TEXT #500 | TRANSMISSION<br>#500<br>Xa1,Xa2,XP,a4,a5<br>TEXT #500 | NOTICE<br>#500<br>Xa1,Xa2,XP,a4,a5<br>TEXT #500 | CODE \| TRANSMISSION PATH<br>#500 \| Xa1,Xa2,XP,a4,a5 |
| TRANSMISSION<br>#510<br>Xb1,Xb2,Xb3,P<br>TEXT #510 | | COMPLETION<br>#510<br>Xb1,Xb2,Xb3,XP<br>TEXT #510 | CODE \| TRANSMISSION PATH<br>#500 \| Xa1,Xa2,XP,a4,a5 |
| NOTICE<br>#500<br>Xa1,Xa2,XP,Xa4,a5<br>TEXT #500 | | | CODE \| TRANSMISSION PATH<br>#500 \| Xa1,Xa2,XP, a4,a5 |
| NOTICE<br>#520<br>XP, C2, C3<br>TEXT #520 | | | CODE \| TRANSMISSION PATH<br>#500 \| Xa1,Xa2,XP,Xa4,a5<br>#520 \| XP, C2, C3 |
| COMPLETION<br>#500<br>Xa1,Xa2,XP,Xa4,Xa5<br>TEXT #500 | | | CODE \| TRANSMISSION PATH<br>#520 \| XP, C2, C3 |

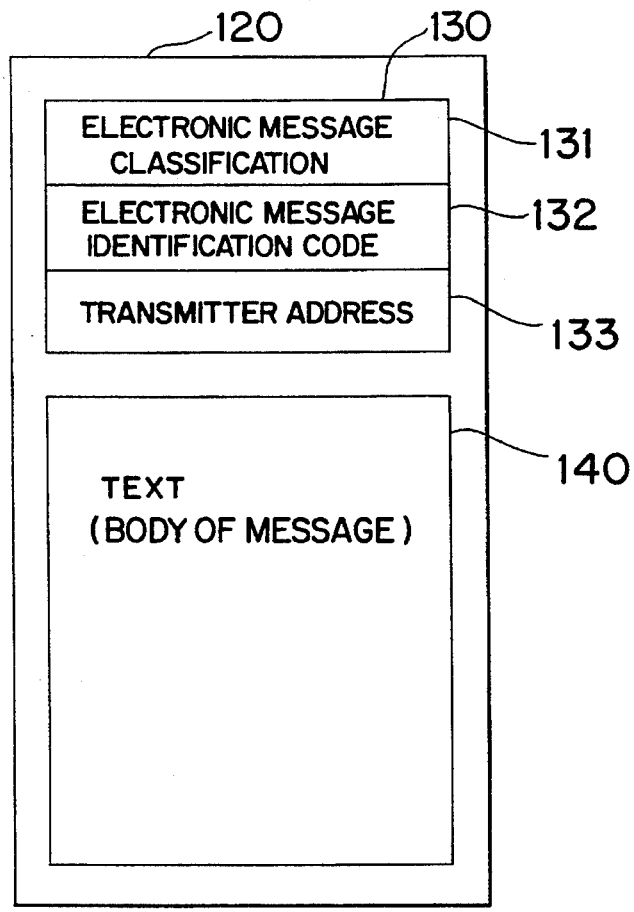

| ELECTRIC MESSAGE CLASSIFICATION COLUMN ─151 | BASIC TRANSMISSION PATH COLUMN ─152 |
|---|---|
| DOCUMENT A | a2.a3.a4 |
| DOCUMENT B | b2.b3 |
| DOCUMENT C | c2 |
| DOCUMENT D | d2.d3.d4 |
| DOCUMENT E | e2.e3 |

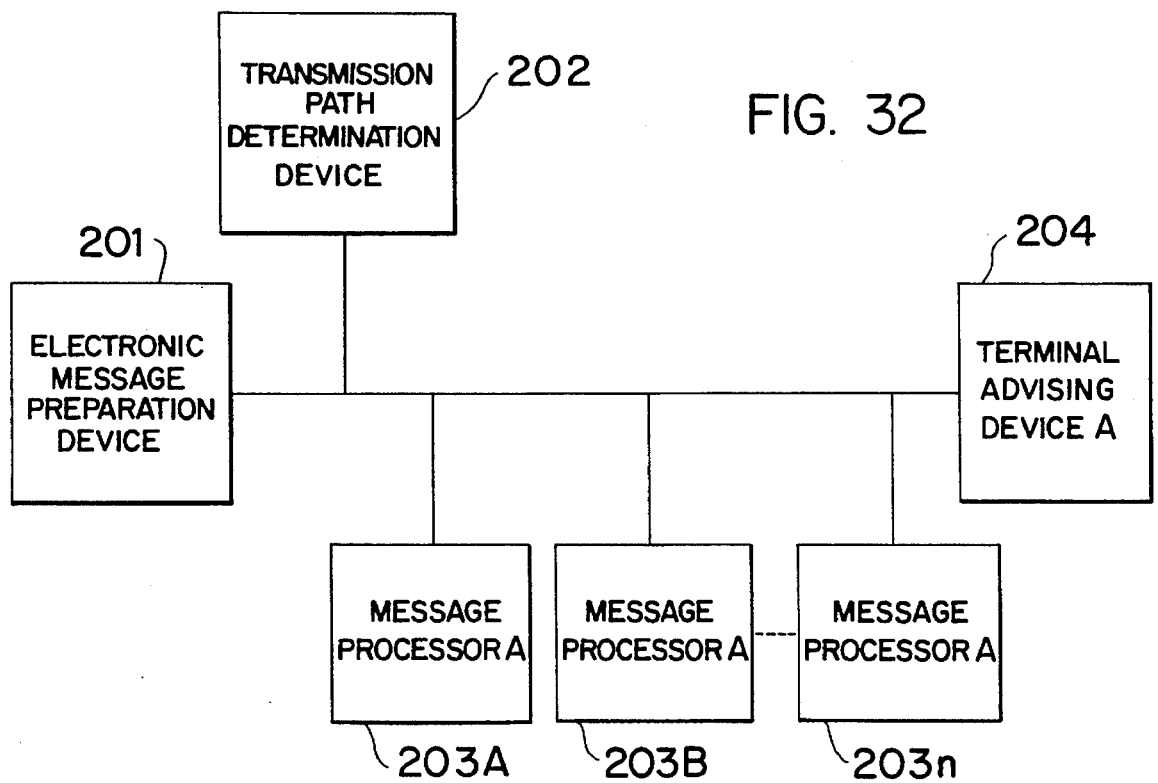
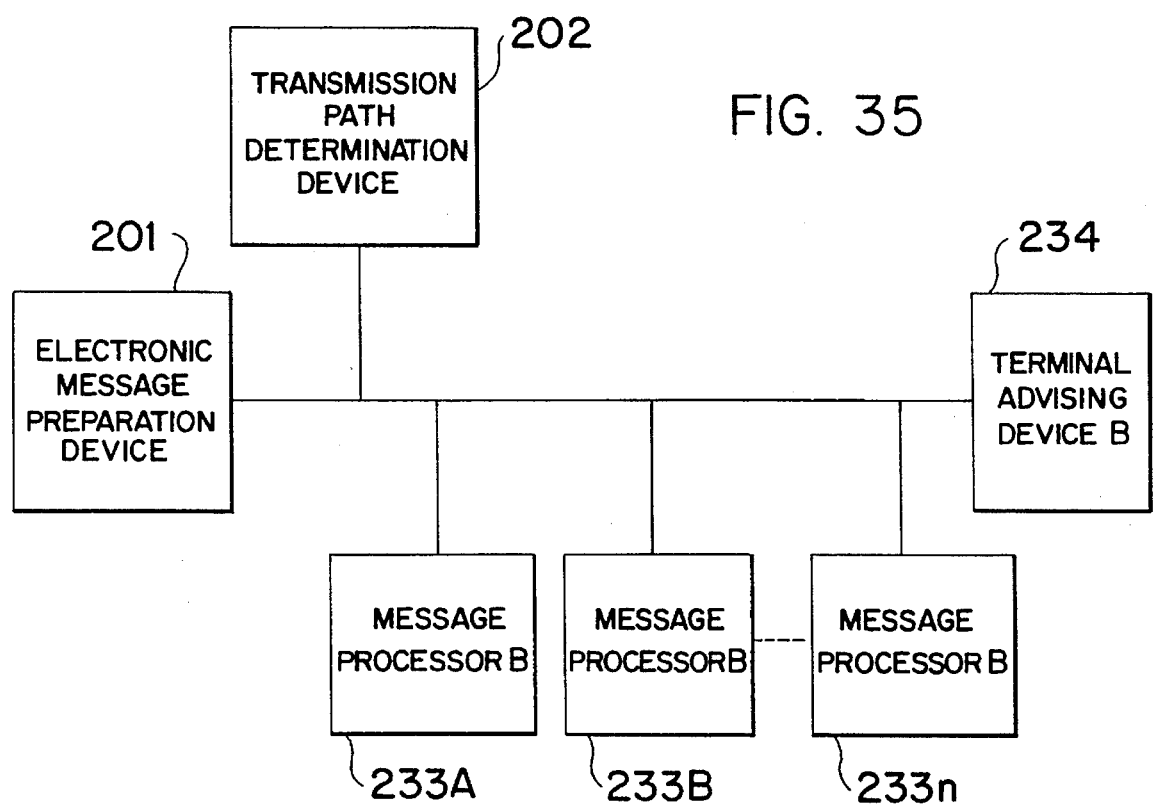

MESSAGE TRANSMISSION DEVICE, AND A MESSAGE TRANSMISSION SYSTEM AND A MESSAGE TRANSMISSION STATUS ADVISING SYSTEM USING THE MESSAGE TRANSMISSION DEVICE

This application is a divisional of application Ser. No. 07/710,333, filed on Jun. 5, 1991, now U.S. Pat. No. 5,285,203.

The present invention relates to a message transmission device, a message transmission system and a message transmission status noticing system using the message transmission device.

BACKGROUND OF THE INVENTION

1. Field of the Invention

The present invention relates to, for example, to a message transmission system for making an efficient operation of electronically transmitted messages or procedures at general offices and to a message transmission status advising system enabling the execution of its objects.

2. Related Art

As one of the message transmission systems, the system disclosed in Pat. Disclosure No. S62-25373 (filed in 1987) is an example of a conventional system. FIG. 37 is a block diagram showing its structure where 301 is an input device for electronic slips, 302 is a circular controller, 303 is a memory unit and 305 is an approval operation device. FIG. 38 shows details of the memory unit 303 where "a circular path table for classified slips" and "a presence/absence table for a individual approve" are provided. The circular path table for classified slips memorizes a path of the slip circular approver and also a deputy approver (sub) when a circular approver (main) is not present. The presence/absence of the approver can be known by "the presence/absence table for individual approver". Thus, when the electronic slip of classification AA is input from the electronic slip input device 301, the circular controller 302 refers "the circular path table for classified slips" within the memory unit 303 and recognizes this slip as being circularly approved by the approvers in the order of A→B→C→D. Then, the circular controller 302 refers "the presence/absence table for individual approver" within the memory unit 303 and judges if this slip can be circulated to the approvers in the order of A→B→C→D. As approvers B and C are absent in this example, F being the deputy approver for B and G being the deputy approver for C are requested to be present from the list of sub approvers for the slip AA in "the circular path table for classified slips" and the slip AA is circulated via the corrected path of approvers in the order of A→F→G→D.

However, in the prior example described above, the circular path was determined at the start of approval of the slip circular so that no necessary step was given in case "the presence/absence table for individual approver" was changed during the circulation and there remained a problem of the system structure being not good enough to determine a circular path without approval-waiting.

Furthermore, deputies for the circular approvers were also controlled for centralizing in the memory unit 303 and there was not much flexibility in changing approvers and designating a deputy's deputy freely.

Further, although the circular path without the approval-waiting could be determined automatically at the start of the slip circular approval, there are disadvantages such as a transmitter being unable to see an actual circulation status of the slips.

Taking the above into consideration, it is an object of this invention to provide a message transmission system which enables a flexible distribution of information between the original and deputy approvers and makes transmitters possible to check transmission speed when transmitting information such as circulars and messages requiring confirmation to a person in charge.

SUMMARY OF THE INVENTION

The object of the present invention is therefore to provide a message transmission system which solves these problems.

The present invention has been developed with a view to substantially solve the above-described disadvantages and has for its essential objective to provide an improved message transmission system.

In order to achieve the aforementioned objective, a message transmission system comprising an electronic message input device for input of a message, electronic message processing means having an acceptability indicator for showing whether an electric message can be processed by a message operator or not by yes or no given by the message operator, and having a deputy operator specifier designating a deputy operator by whom the electronic message is to be processed, and a transmission controller which determines a message receiver, a message operator on duty or a deputy operator by checking the acceptability indicator and a deputy operator specifier. Based on the above-mentioned structure, the transmission device checks the acceptability indicator within the electronic message processing means allocated to the message operator and if the acceptability indicator is yes or if the acceptability indicator is no and a deputy operator is not designated in the deputy operator specifier, the electronic message is transmitted to the electronic message processing means allocated to said message operator, and if the acceptability indicator is no and if a deputy operator is designated in the deputy operator specifier, the electronic message is transmitted to the electronic message processing means allocated to the deputy operator designated in the deputy operator specifier.

This invention further relates to a message transmission status advising system comprising an electronic message input device to input electronic messages, an electronic message processor corresponding to a message process operator, a transmission path memory unit to memorize by electronic message processors within the transmission path in the transmission path memory unit the electronic messages being processed, a transmission controller to transmit the electronic messages to the electronic message processor in order and a processing position indicating device to indicate the content of a processing position memory unit. Based on the above-mentioned structure, the transmission controller transmits electronic messages being input by the electronic message input device to the electronic message processor according to the path memorized in the transmission path memory unit along with having the processing position memory unit memorize, by the electronic message processors, the electronic messages under processing and the processing position indicating device indicates the content of the processing position memory unit being renewed by the transmission controller.

This invention also relates to a message transmission system comprising information receiving means for receiving message information having a transmission mode and a transmission path expressed by an electronic message identification code and address in order and electronic messages including a body of a message (hereinafter referred to as a text) to be processed, information separating means for separating transmission information from electronic messages, transmission status memory means for memorizing transmission status which enables a pair of the electronic message identification code and transmission path being additionally memorized or newly memorized in a storage region or deleted from there depending on a value of the transmission mode, composing means for composing the transmission information and processed text and transmitting means for transmitting to control the transmission of the electronic messages to the next address to said address and to the previous address to said address depending on the value of the transmission mode. In accordance with the above-mentioned structure, the transmitting means transmits the electronic messages to the next address to said address along with the transmission path and also advises the transmission status of the electronic messages to the previous address to said address by means of an electronic message and the transmission status memory means memorizes the transmission status of the electronic messages noticed from the succeeding address to said address in the storage region.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIGS. 1 to 3 show the first embodiment of the present invention,

FIG. 1 is a block diagram showing an outline structure of a message transmission system;

FIG. 2 is a model drawing showing a structure of an electronic message processing device; and FIG. 3 is a drawing describing an operation of the embodiment;

FIGS. 4 to 6 show the second embodiment of the present invention;

FIG. 4 is a block diagram showing an outline structure of the message transmission system;

FIG. 5 is a model drawing showing a structure of the electronic message processing device; and FIG. 6 is a drawing describing an operation of the embodiment;

FIG. 7 is a block diagram showing an outline structure of the present invention;

FIG. 8 is a drawing describing an operation of the embodiment;

FIGS. 9 to 14 show the fourth embodiment of the present invention;

FIG. 9 is a block diagram showing an outline structure of a message transmission status advising system;

FIG. 10 is an explanation drawing showing an example part of a transmission path memory unit;

FIG. 11 is an explanation drawing showing an example part of a processing position memory unit;

FIG. 12 is a flowchart showing an electronic message processing operation;

FIG. 13 is an explanation drawing showing changes in the processing position memory unit, and FIG. 14 is a flowchart showing an indication control operation;

FIGS. 15 to 17 show the fifth embodiment of the present invention;

FIGS. 16(a) and (b) are explanation drawings showing changes in the processing position memory unit respectively, and FIGS. 17(a) and (b) are flowcharts showing the indication control operations respectively;

FIGS. 18 to 22 show the sixth embodiment of the present invention;

FIG. 18 is a block diagram showing an outline structure of a message transmission device;

FIG. 19 is a drawing showing an example structure of electronic messages;

FIG. 20 is a drawing showing an example type of memory in a storage region;

FIG. 21 is a flowchart describing an operation of the message transmission device; and FIG. 22 is a drawing describing changes of contents in the electronic message being received and transmitted and in the storage region;

FIGS. 23 to 25 show the seventh embodiment of the present invention;

FIG. 23 is a block diagram showing an outline structure of the message transmission device;

FIG. 24 is a flowchart describing an operation of the message transmission device; and FIG. 25 is a drawing describing changes in the electronic message being received and transmitted and in the storage region;

FIGS. 26 to 31 show the eighth embodiment of the present invention;

FIG. 26 is a block diagram showing an outline structure of the message transmission device;

FIG. 27 is a drawing showing an example structure of the electronic messages;

FIG. 28 is a drawing showing an example of memory type of transmission path memory unit;

FIG. 29 is a flowchart describing an operation of the message transmission device in an embodiment;

FIG. 30 is an explanation drawing showing an example part of the transmission path memory unit; and FIG. 31 is a drawing showing an example of the electronic messages;

FIGS. 32 to 34 show the ninth embodiment of the present invention;

FIG. 32 is a block diagram showing an outline structure of the message transmission system;

FIG. 33 is a block diagram showing a structure of an original message transmission preparation unit in an electronic message preparation device; and FIG. 34 is a drawing describing a transfer operation of the electronic messages in the message transmission system;

FIGS. 35 to 36 show the tenth embodiment of the present invention;

FIG. 35 is a block diagram showing an outline structure of the message transmission; and FIG. 36 is a drawing describing a transfer operation of the electronic messages in the message transmission system.

FIG. 37 is a drawing showing a general structure of an automatic designation method for a circular path of slips; and FIG. 38 is a drawing showing its specific example.

DETAILED DESCRIPTION OF THE PREFERRED EMBODIMENTS

Figure 3A:
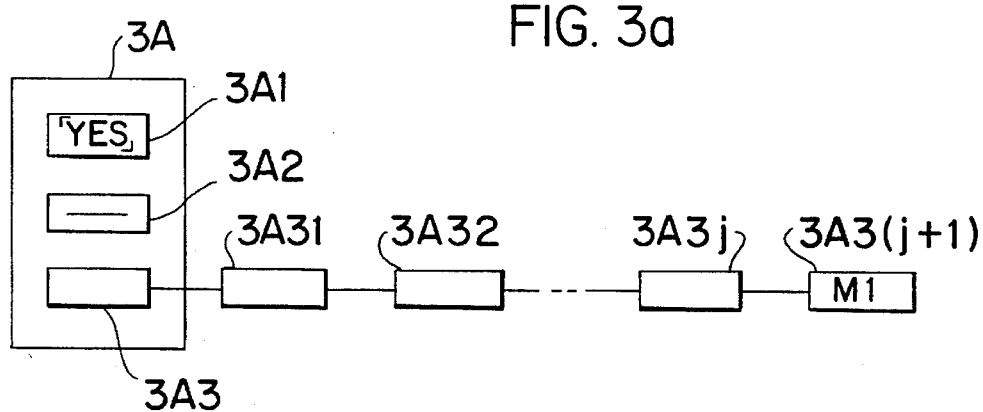
Figure 3B:
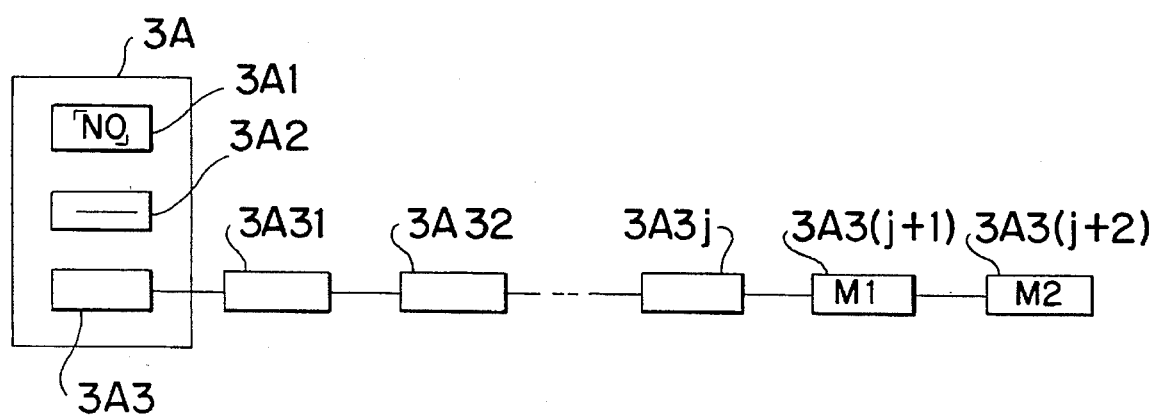

The first embodiment relating to this invention will be described as follows based on FIGS. 1 to 3:

FIG. 1 is a block diagram showing a message transmission system in an embodiment. In FIG. 1, 1 is an electronic message input device, 2 is a transmission controller and 3A–3n are electronic message processing devices. FIG. 2 is a model drawing showing a structure of electronic message processing devices $3i$ ($i$=A, B, ..., n) and $3i1$ designates an acceptability indicator, $3i2$ designates a deputy operator specifier, $3i3$ designates an electronic message receiver and $3i3$–$3i3j$ designate received electronic messages respectively.

An explanation of relative operations follows with reference to FIG. 3. It is assumed that there are four message operators A, B, C, and D and electronic message processing devices 3A, 3B, 3C and 3D are allotted to the four message operators A, B, C, and D respectively. Then, all four message operators A, B, C, and D are in a position to operate the electronic message processing devices 3A–3D. This means that every acceptability indicator 3A1, 3B1, 3C1 and 3D1 is designated as "YES".

When a message M1 is input for addressing to the message operator A from an electronic message input device 1, a transmission controller 2 checks acceptability indicator 3A1 within an electronic message processing device 3A corresponding to the message process operator A. In this case, as "YES" is being designated, the transmission controller 2 transmits the message M1 to the electronic message processing device 3A and the respective message is stored in the electronic message receiver 3A3 as the received message 3A3 (j÷1). (FIG. 3(a))

Then, supposing that the message operator A has to change the designation of the acceptability indicator 3A1 to "NO" for a certain reason next. A deputy operator is not designated yet in the deputy operator specifier 3A2 here. If a new message M2 also addressed to the process operator A is input from the electronic message input device 1, the transmission controller 2 checks the acceptability indicator 3A1. As "NO" is being designated at this time, the transmission controller 2 checks the deputy operator specifier 3A2 also. In this case, as no specific designation is made, the transmission controller 2 transmits the message M2 to the electronic message processing device 3A and the message is stored in the electronic message receiver 3A3 as the received electronic message 3A3 (j+2). (FIG. 3(b))

Now, in the case where the message operator A designates operator B for his deputy operator, that is, the deputy operator specifier 3A2 is designated B, the transmission controller checks the acceptability indicator 3A1 and the deputy operator specifier 3A2 when next message M3 addressed to the operator A is input from the electronic message input device 1, and recognizes the acceptability indicator 3A1="NO" and the deputy operator specifier 3A2="B". As a result, the transmission controller 2 transmits the message M3 to an electronic message processing device 3B and the message is stored in an electronic message receiver 3B3 as received electronic message 3B31. Thus, the operator B acts as a deputy of the process operator A. (FIG. 3(c))

Similarly, if the operator B has to designate for some reason the acceptability indicator 3B1 and deputy operator specifier 3B2 in the message processing device 3B as "NO" and "C" respectively, the transmission controller 2 transmits a message M4 addressed to the operator A to the electronic message processing device 3C and the message is stored in an electronic receiver 3C3 as a received electronic message 3C31. Accordingly, the operator C can also act as a deputy of the operator B. The message operator A, however, does not have to be concerned if the operator B is designating the operator C as a further deputy operator or not.

This is applicable to circulate messages. A message X shall be circulated in order to the message process operators D→A as a regular path. Similar to the above explanation, if all the operators A, B, C, D are supposed to be able to operate the electronic message processors 3A–3D, i.e. the "YES" is designated in either of the acceptability indicators 3A1, 3B1, 3C1 and 3D1, then the message X being input from the electronic message input device 1 will be transmitted to the electronic message processing device 3D by the transmission controller 2 to be circulated in order of message process operators D→A. While the operator D is processing the message X by operating the electronic message processor 3D, the process operator A can change with some reasons the acceptability indicator 3A1 and deputy operator specifier 3A2 in the electronic message processing device 3A to "NO" and "C" respectively. The operator D requests the transmission controller 2 to transmit the message X to the message processing device 3A after finishing the processing regardless of the designation of the acceptability indicator 3A1 as being "NO". The transmission controller 2 confirms the acceptability indicator 3A1="NO" and the deputy operator specifier 3A2="C" and transmits the message X to the electronic message processing device 3C allocated to the operator C who is a deputy operator of the message operator A.

Thus, according to this embodiment, the transmission controller distributes messages to a person in charge or his deputy depending on the conditions of the time without prechecking the acceptability indicators of message process operators on duty by the transmitters' side in advance. Thereby, smoother message transmission can be carried out.

Further, it is also possible to check substitutionally the "YES" or "NO" of acceptability indicators 3A1, 3B1, 3C1 and 3D1 by giving LOGON/LOGOFF information to message transmission systems for the message operators A, B, C and D.

Embodiment 2

Figure 6A:
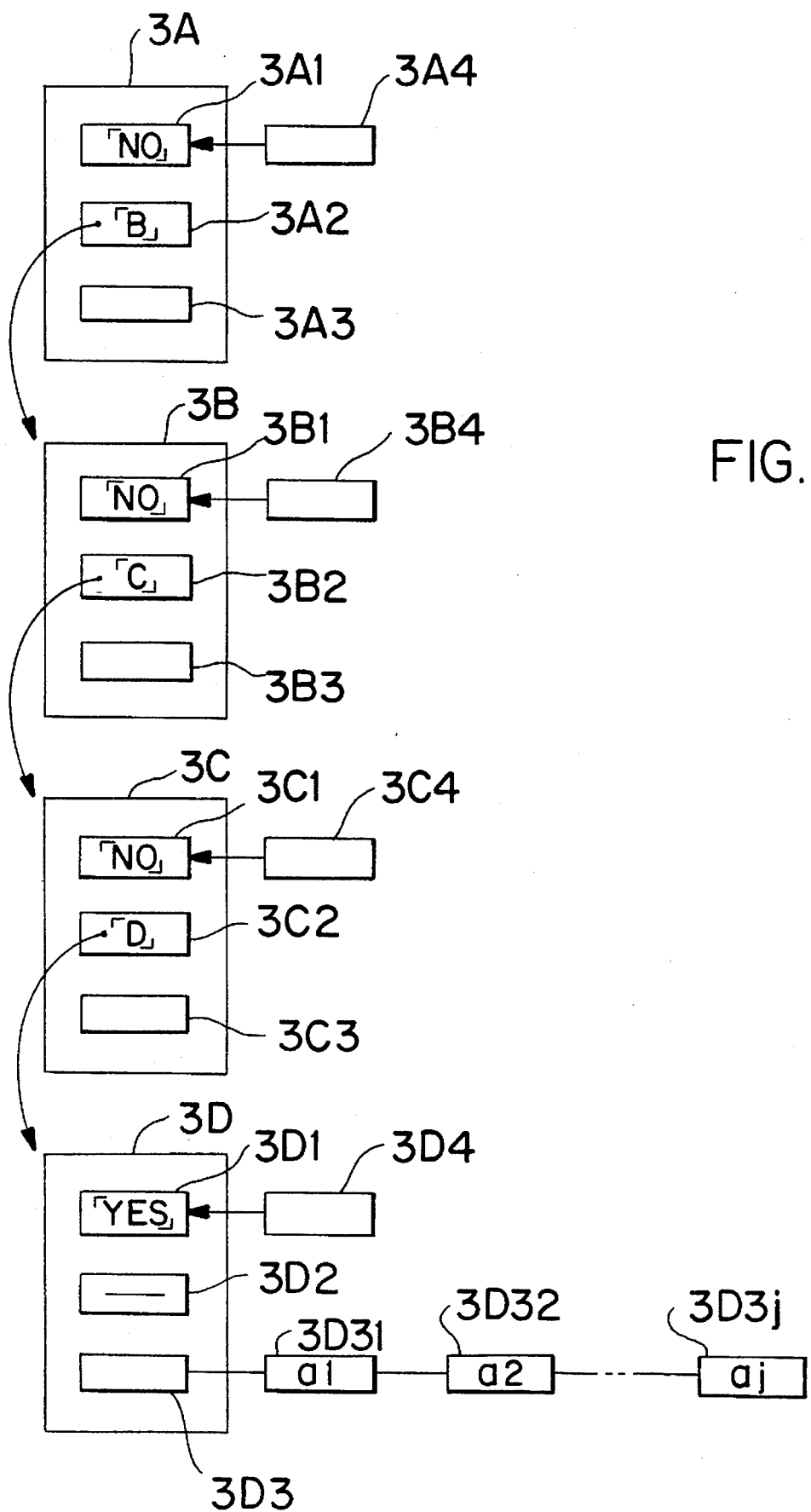
Figure 6B:
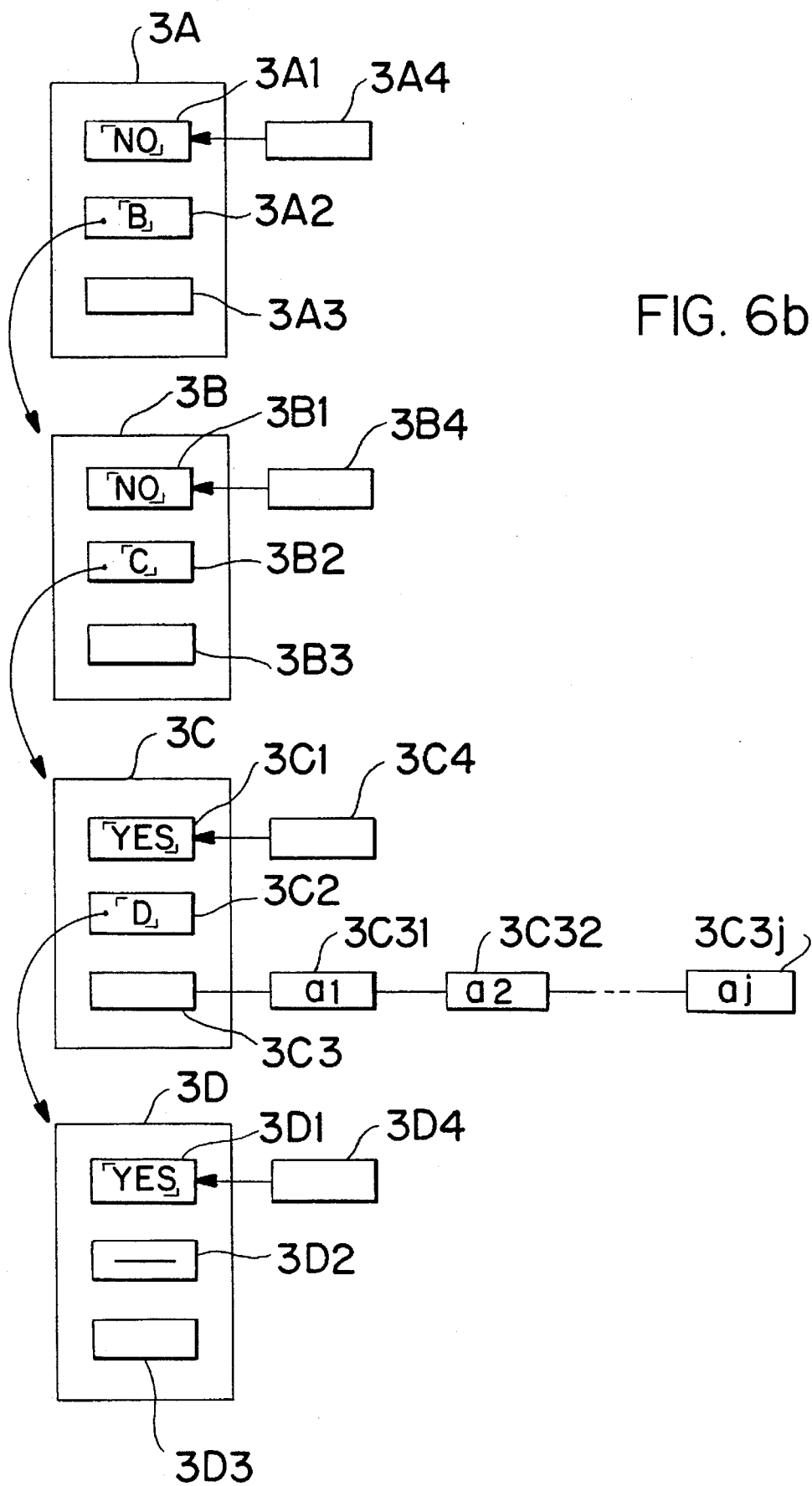
Figure 6C:
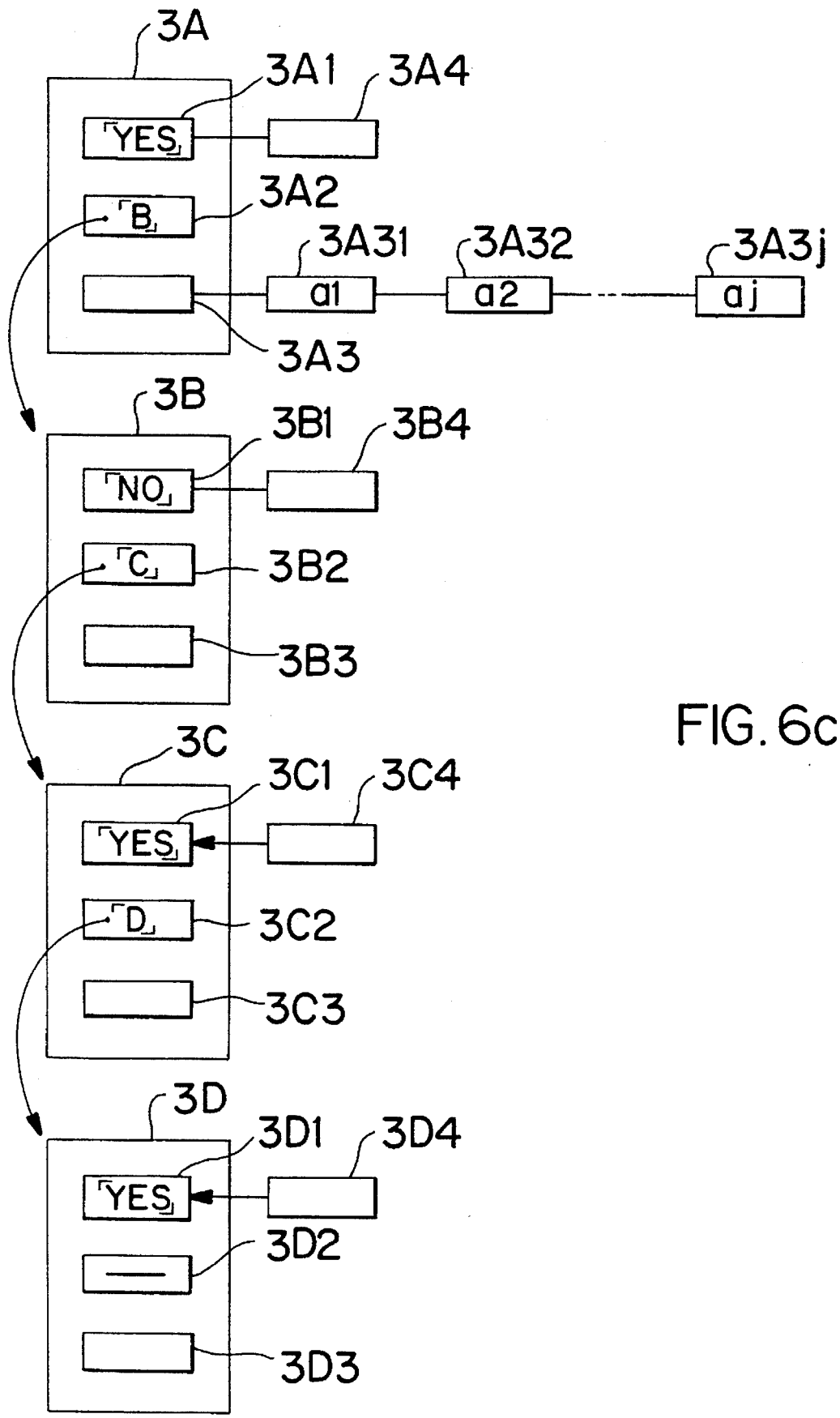

The second embodiment relating to this invention will be described as follows based on FIGS. 4 to 6:

FIG. 4 is a block diagram showing a message transmission system in an embodiment of this invention. In FIG. 4, 4 is a recall transmission controller and 3A–3n are electronic transmission processing devices. FIG. 5 is a model drawing showing a structure of an electronic message processing device $3i$ ($i$=A, B ..., n) and $3i1$ designates an acceptability indicator, $3i2$ designates a deputy operator specifier, $3i3$ designates an electronic message receiver, 3i31–3i3j designates received electronic messages and 3i4 designates an acceptability input device respectively.

An explanation of relative operations follows with reference to 6. Now, it is assumed that there are four message processing devices 3A, 3B, 3C and 3D allotted to each one of the four message operators A, B, C and D respectively. For each of the acceptability indicators 3A1, 3B1 and 3C1, "NO" is designated and for acceptability indicator 3D1, "YES" is designated. Further, for deputy operator specifier 3A2, 3B2 and 3C2, "B", "C" and "D" are designated respectively. The operator D is acting indirectly as a deputy process operator of the message operator A and the electronic message transmitted to the message process operator A originally is left unprocessed as received electronic messages 3D31–3D3j. (FIG. 6(a))

When the operator C changes the designation of the acceptability indicator 3C1 to "YES" by the acceptability input device 3C4 because of any reason, the recall transmission controller 4 checks the deputy operator specifier 3C2. In this case, as "D" is designated, the recall transmission controller 4 starts to check conditions of the electronic message processing device 3D allocated to the operator D. Since the acceptability indicator 3D1 of the operator D is designated as "YES" and the received electronic messages 3D31–3D3j are left unprocessed in the electronic message receiver 3D3, the recall transmission controller 4 transmits the received electronic messages 3D31–3D3j to the electronic message processing device 3C and the messages are stored in the electronic message receiver 3C3 as the received electronic messages 3C31–3C3j. Thus, the electronic messages, which the operator C received as an indirect deputy of the message operator A under the condition of acceptability being "NO" and were transferred to the deputy operator D, are recalled when the operator C returns to the condition of acceptability being "YES" (FIG. 6(b))

Similarly afterward, supposing that the operator A changes the designation of acceptability indicator 3A1 within the electronic message processing device 3A to "YES" by the acceptability input device 3A4. The recall-transmission controller 4 checks the deputy operator specifier 3A2 and recognizes the operator B is designated as a deputy operator. Then, the recall transmission controller 4 checks the acceptability indicator 3B1 and the deputy operator specifier 3B2 within the electronic message processing device 3B and recognizes the acceptability indicator 3B1="NO" and the deputy operator specifier 3B2="C". In the electronic message receiver 3B3, no received electronic message exists then and therefore, the recall transmission controller 4 starts to make further checking of the electronic message processing device allocated to the operator C designated as a deputy of the deputy operator B. Since the acceptability indicator 3C1 within the electronic message processing device 3C is "YES" and the received electronic messages 3C31–3C3j are left unprocessed in the electronic message receiver 3C3, the recall-transmission controller 4 transmits the received electronic messages 3C31–3C3j to the electronic message processing device 3A and the messages are stored in the electronic message receiver 3A3 as received electronic messages 3A31–3A3j. Accordingly, if there are some electronic messages left unprocessed among those transferred to a deputy operator of the operator A under the condition of the operator A being unable to process even after the operator A returns to the available conditions, they are recalled to the electronic message processing device 3A of the original operator A. (FIG. 6(c))

As described above, according to this embodiment, it is possible to carry out a smoother message transmission under exact and correct processing and judgements by highly response and committed persons by recalling unprocessed messages among those which were transmitted while the acceptability indicator of the message process operator on duty is "NO" to the original message process operator when the acceptability indicator returns to "YES".

Embodiment 3

The third embodiment relating to this invention will be described as follows based on FIGS. 7 to 8.

Figure 7:
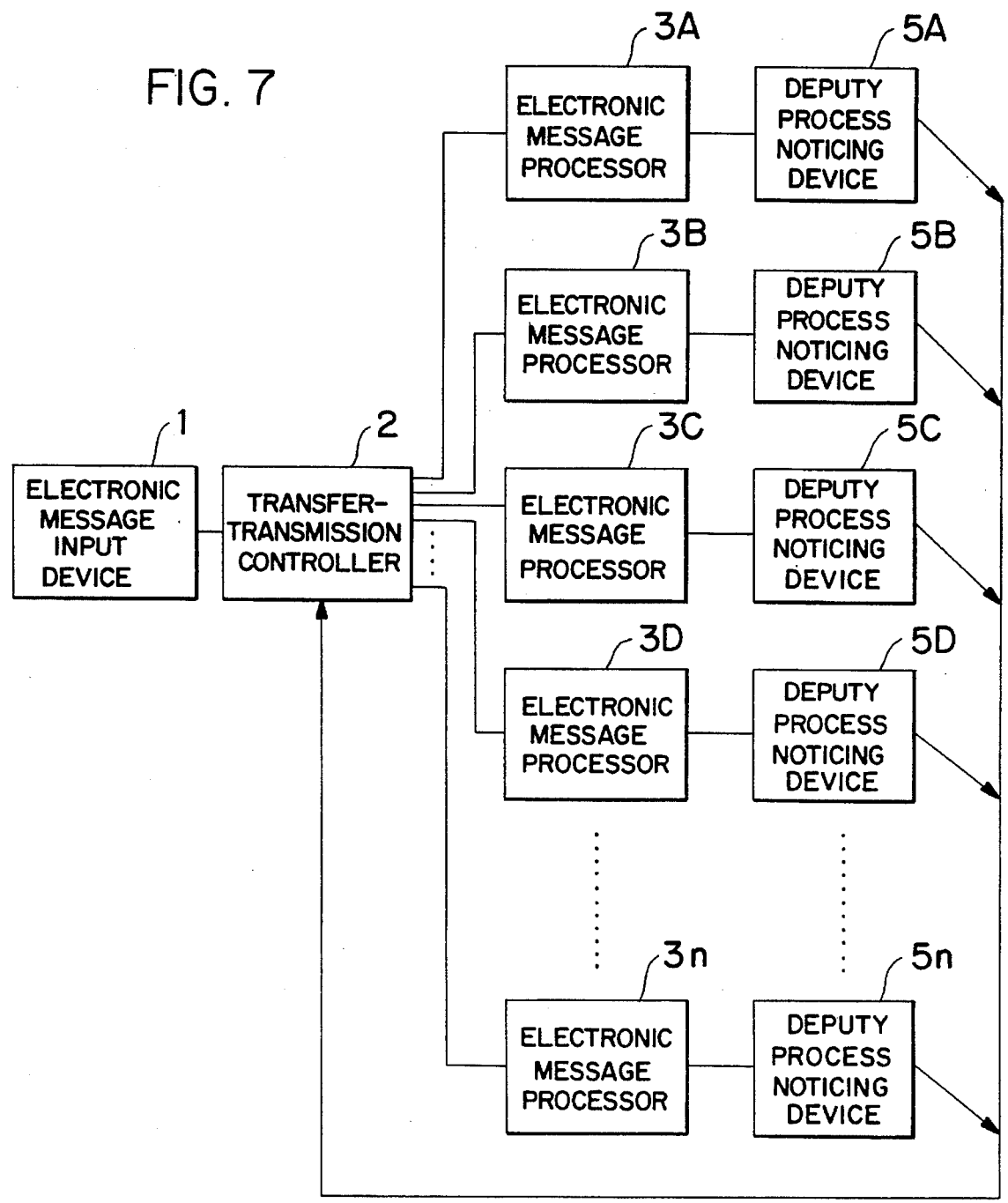
FIGS. 7 to 8 show the third embodiment of the present invention.
Figure 8A:
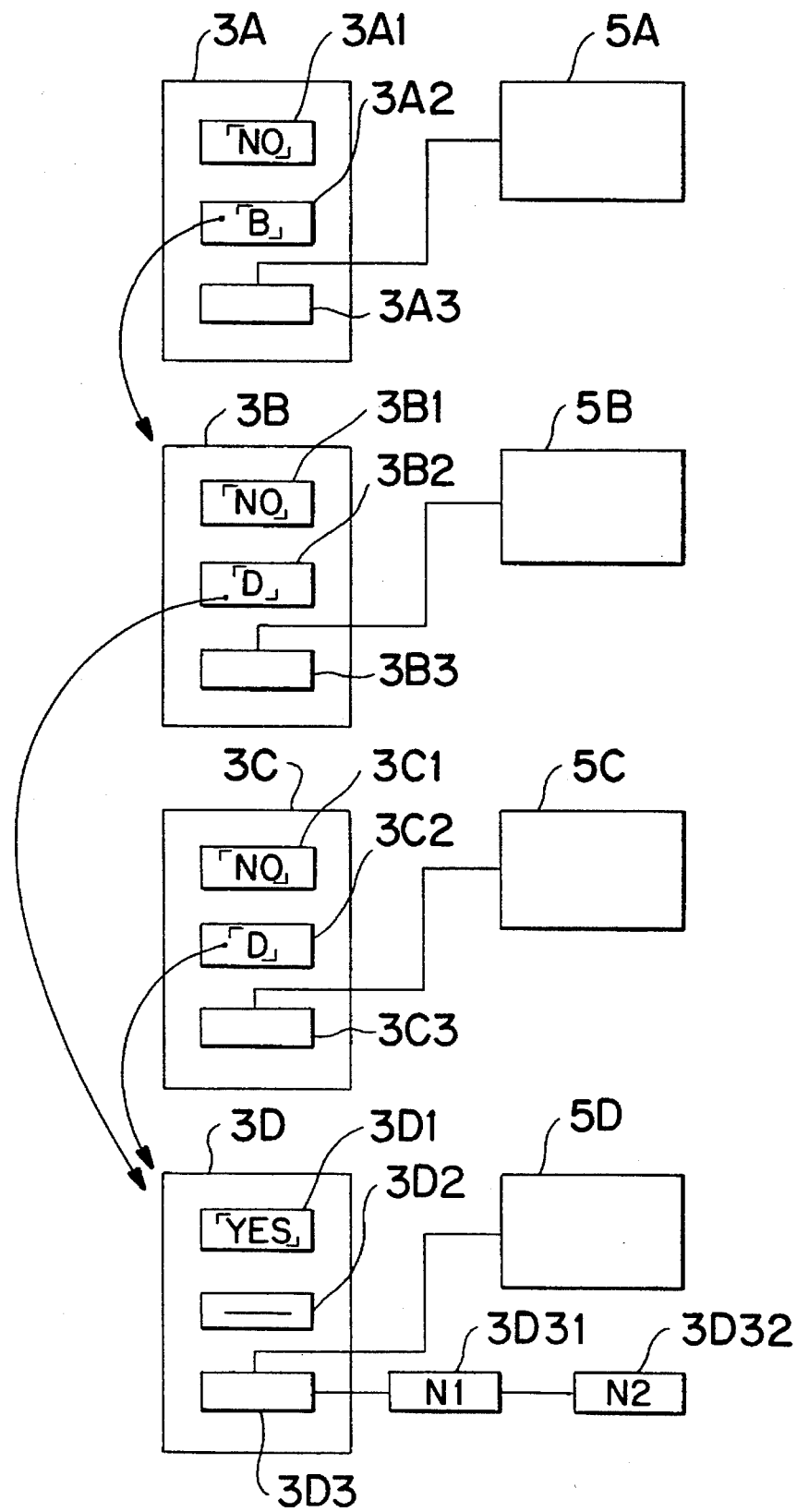
Figure 8B:
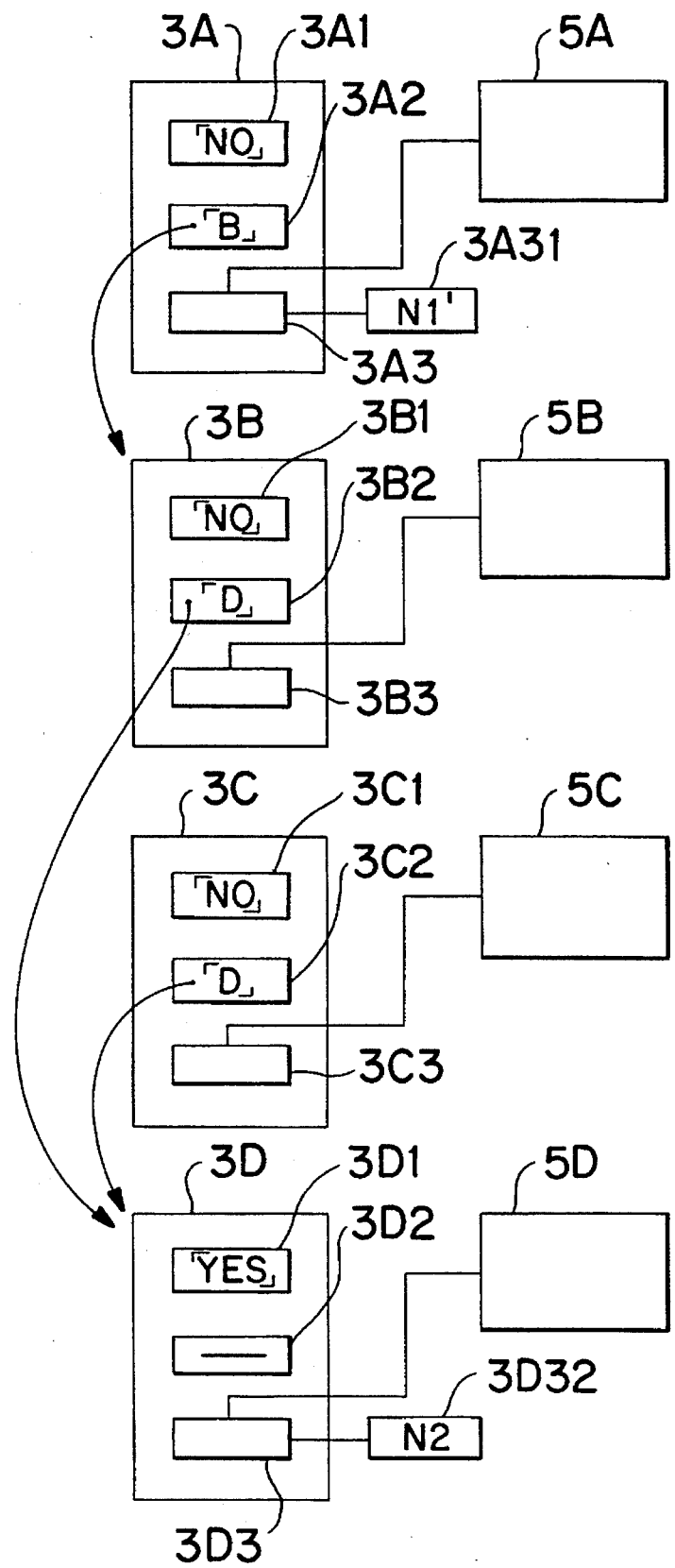
Figure 8C:
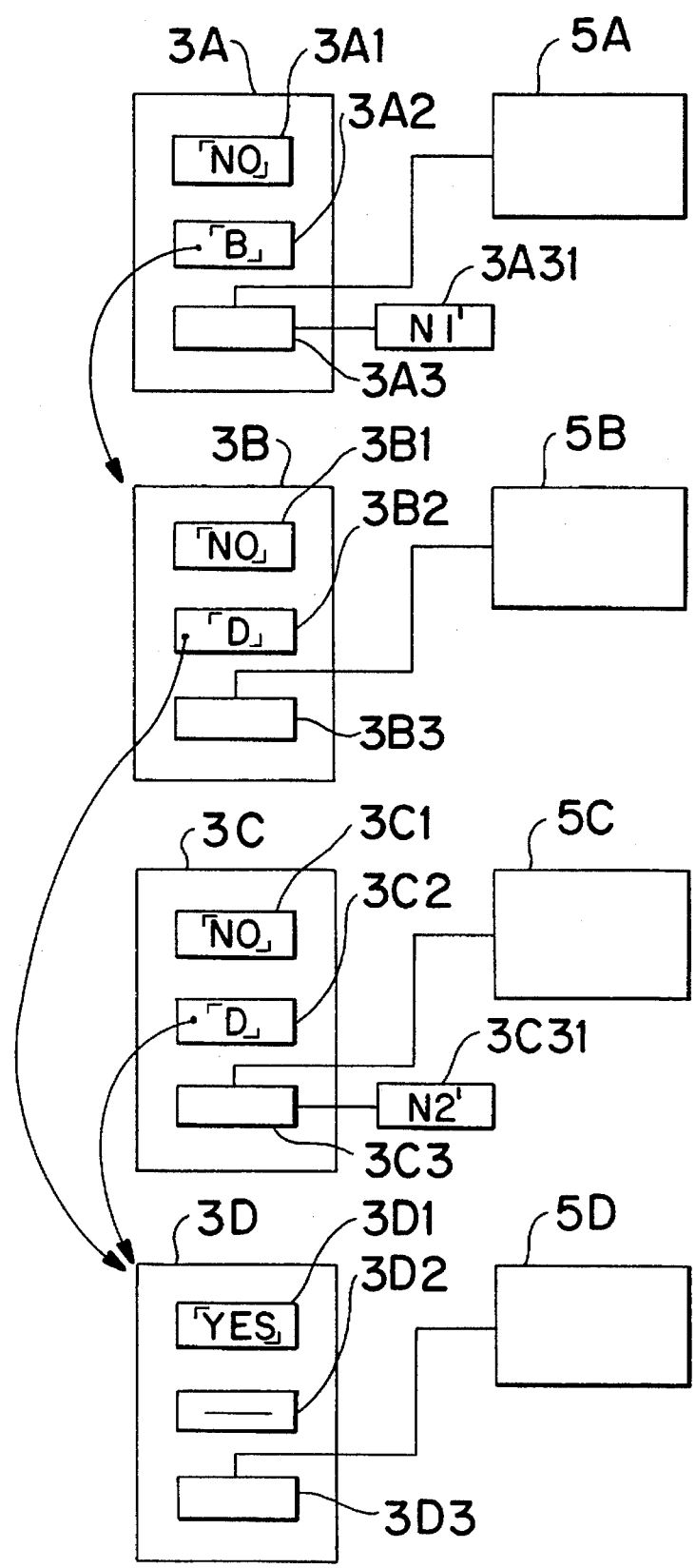

FIG. 7 is a block diagram showing a message transmission system in an embodiment of this invention. In FIG. 7, 1 is an electronic message input device, 2 is a transmission controller, 3A–3n are electronic processing devices and 5A–5n are deputy process noticing devices respectively.

An explanation of relative operations follows with reference to FIG. 8. Now, it is assumed that there are four message operators A, B, C and D and electronic message processing devices 3A, 3B, 3C and 3D are allotted to the message operators A, B, C and D respectively. For each of the acceptability indicators 3A1, 3B1 and 3C1, "NO" is designated and for 3D1, "YES" is designated. Further, for deputy operator specifier 3A2, "B" is designated and for 3B2 and 3C2, "D" is designated respectively.

When a message N1 addressing to the message operator A, that is, an original message operator specifier in N1 being "A" as a supplemental information of N1 is input from the electronic message input device 1, the transmission controller 2 checks the acceptability indictor 3A1 and the deputy operator specifier 3A2 and then recognizes the acceptability 3A1="NO" and the deputy operator specifier 3A2="B".

As the acceptability indicator 3A 1 is "NO", the transmission controller 2 further checks the electronic message processing device 3B allocated to the message operator B designated by the deputy operator specifier 3A2. Since the acceptability indicator 3B1 is "NO" and the deputy operator specifier 3B2 is "D", the transmission controller 2 checks the electronic message processing device 3D allocated to the message operator D. Then, the message N1 is stored in an electronic message receiver 3D3 as a received electronic message 3D31, since the acceptability indicator 3D1 is "YES".

Similarly, when a message N2 addressed to the operator C, that is, an original message operator specifier in N2 being "C" as supplemental information of N2, is input from the electronic message input device 1, the transmission controller 2 recognizes that the acceptability indicated 3C1="NO" and the deputy operator specifier 3C2="D". As 3C1 is "NO", the transmission controller 2 further checks the electronic message processing device 3D allocated to the operator D designated by the deputy operator specifier 3C2. Since the acceptability indicator 3D1 is "YES", the message N2 is stored in the electronic message receiver 3D3 as a received electronic message 3D32. (FIG. 8(a))

The operator D processes the received electronic messages 3D31 and 3D32 by operating the electronic message processing device 3D which was transferred in a similar manner as described above.

Firstly, the received electronic message 3D31 (=message N1) is picked out from the electronic message receiver 3D3. After the received electronic message 3D31 is processed by the operator D, the received electronic message 3D31 is removed from the electronic message receiver 3D3. However, since the original message operator specifier of the received electronic message 3D31 indicates "A", a deputy processing noticing device 5D tries to inform that the operator D has processed the message by deputy which should be processed originally by the operator A. Thereby, the deputy processing noticing device 5D transmits an electronic message N1' to the electronic message processing device 3A allocated to the operator A which notifies that the operator D has processed the message N1 as a deputy. However, this notifying message is out of object from electronic messages handed by a so-called deputy mechanism. (Fig. 8(b))

Similarly also, when the received electronic message 3D32 (=message N2) is picked out from the electronic message receiver 3D3 and the message is processed by the operator D, since the original message operator specifier of the received electronic message 3D32 indicates "C", the deputy processing noticing device 5D tries to inform that operator D has processed the message by deputy which should be processed originally by the operator C. Thereby, the deputy processing noticing device 5D transmits an electronic message N2' to the electronic message processing device 3C allocated to the operator C which notifies that the operator D has processed as a deputy the message N2. (FIG. 8(c))

As described above, according to this embodiment, it can be known which message is processed by which deputy operator and message transmissions can be carried out with an exact process status during the acceptability indicator being "NO" because the deputy processing noticing devices inform to the original message operator that an electronic message was processed by the deputy operator from among the messages transmitted during the acceptability indicator of the message operator on duty being "NO" accordingly.

Embodiment 4

Figure 9:
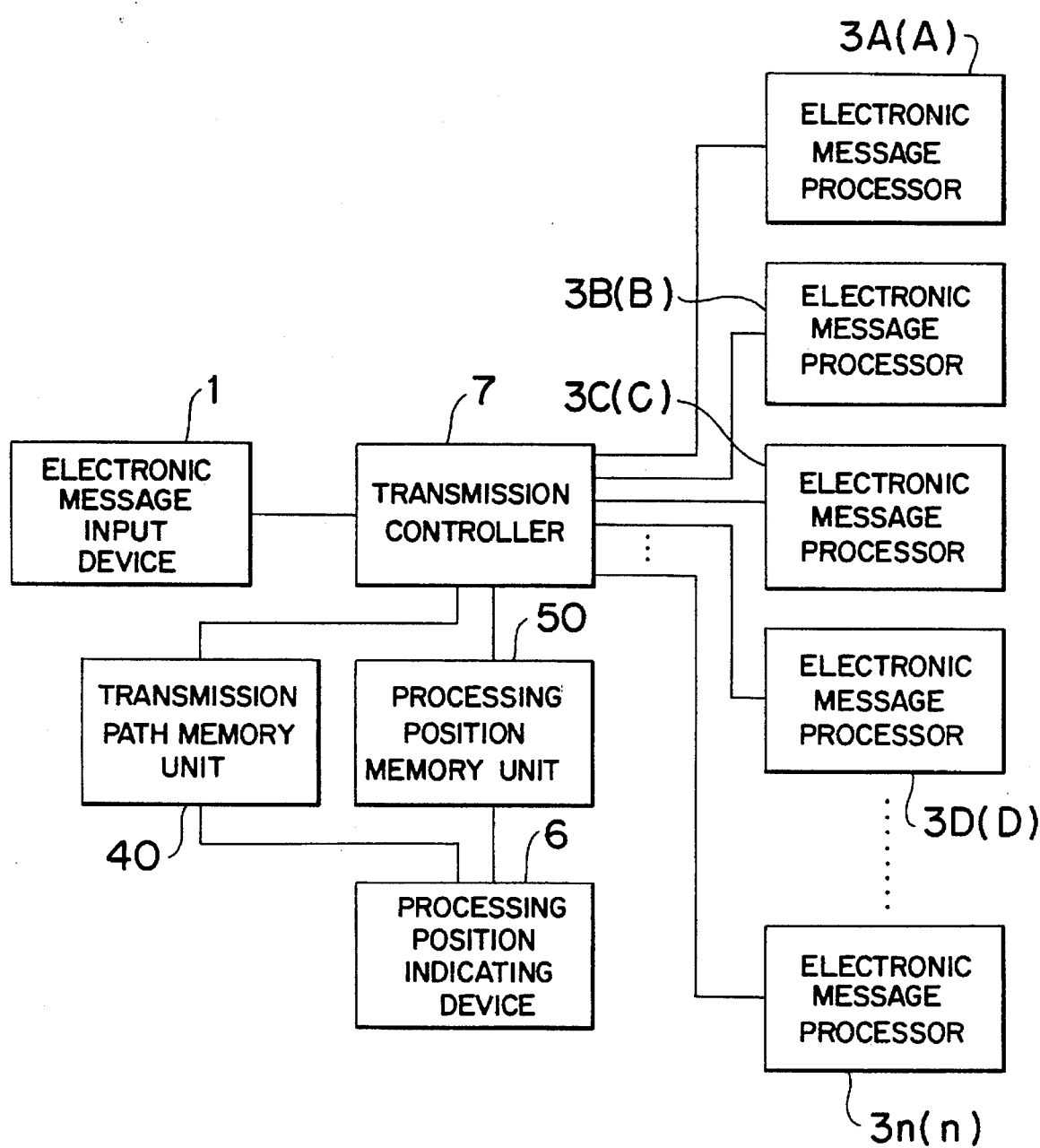

The fourth embodiment relating to this invention will be described as follows based on FIGS. 9 to 14:

FIG. 9 is a block diagram showing a message transmission status advising system in an embodiment of this invention. In FIG. 9, 1 is an electronic message input device, 2 is a transmission controller, 3A, 3B— are electronic message processors, 40 is a transmission path memory unit, 50 is a processing position memory unit and 6 is a processing position indicating device respectively.

FIG. 10 is a drawing showing an example of memory types of the transmission path memory unit 40 where 41 is an electronic message classification column and 42 is a transmission route column.

FIG. 11 is a drawing showing an example of memory types of the processing position memory unit 50 where 51 is an electronic message identification column and 52 is an electronic message processor code column.

An explanation of the operation of the message transmission status advising system follows, wherein electronic messages are identified by ID numbers and the electronic message processors 3A, 3B— are identified by codes A, B—.

Now, it is assumed that an electronic message "CC" is input from the electronic message input device 1. Firstly, a message controller 7 gives this message an ID number and returns its numeric value (e.g. "#1000") to the electronic message input device 1. A user recognizes that the ID number of prepared electronic message is "#1000" by this and he can check a message transmission status by using this value afterward.

Next, the transmission controller 7, since a classification of the electronic message #1000 is "CC", retrieves the transmission path column 42, wherein the electronic message classification column 41 within the transmission path memory unit 40 is "DD", and obtains a transmission path "A→B→C→D".

The following operations are to be carried out for the obtained route P(P (1)=A, P (2)=B, P (3)=C, P (4)=D), wherein |P| indicates a length of the transmission path and #N indicates an ID number of the electronic message. In this example, |P|=4 and N=1000.

Figure 12:
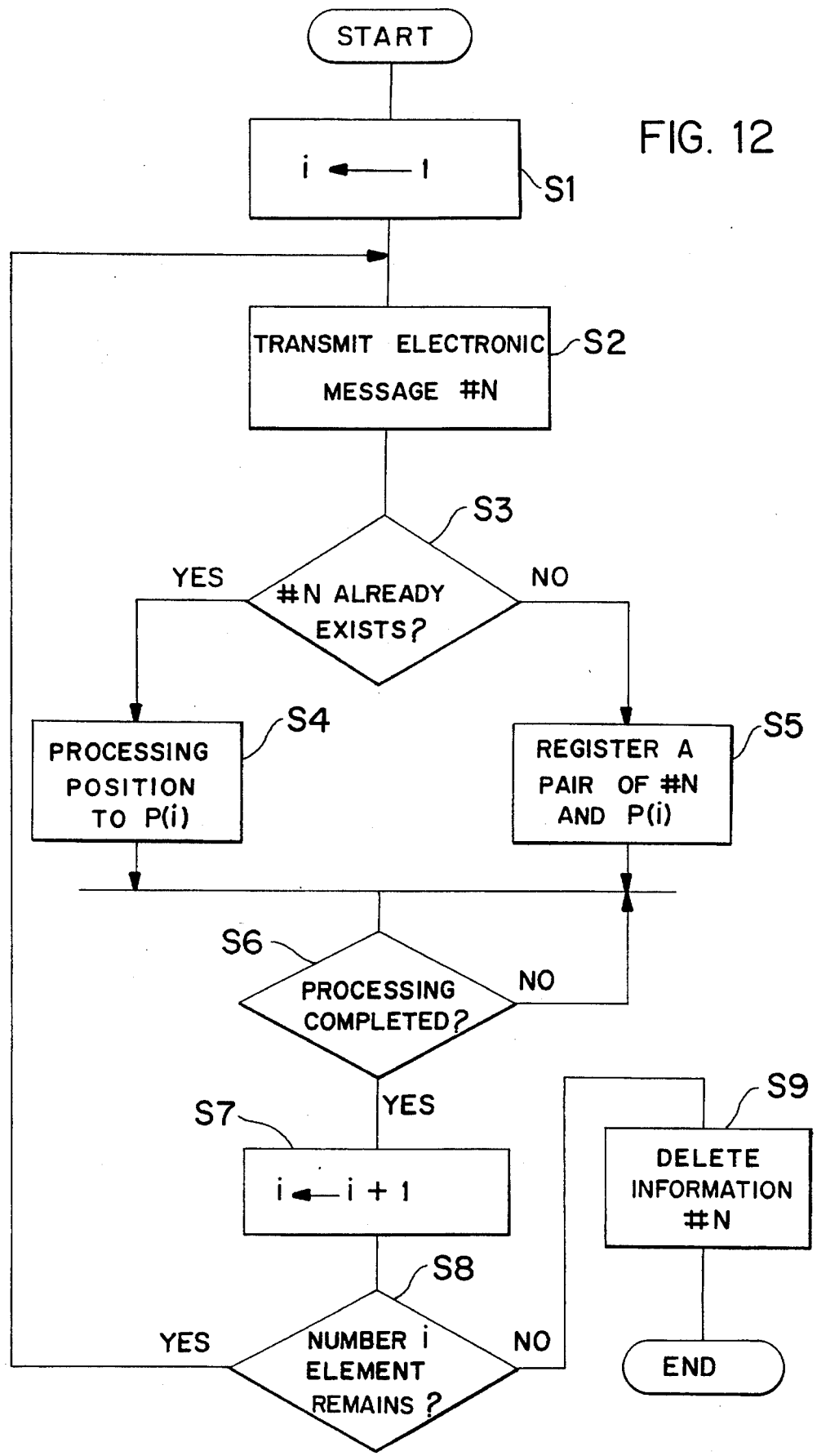

As shown in a flowchart of FIG. 12, at first, i, which is a parameter of P, is to be initialized as 1 (S1) and the electronic message #N is to be transmitted (S2) to an electronic message processor 3 {P (i)} for an identification code P (i).

However, since the i is 1, the electronic message #N is transmitted to the electronic message processor 3 {P (i)}=A. Then, a judgement is to be made if #N exists in the electronic message identification code column 51 within the processing position memory unit 50 or not (S3). If the judgement is yes, a value of the electronic message processor code column 52 corresponding to #N is to be changed to P (i) (S4). Whereas if the judgement is no, information of the electronic message identification code column 51=#N and electronic message processor code column 52=P (i) are to be additionally registered in the processing position memory unit (S5).

Then, it is judged (S6) whether the processing in the electronic message processor 3 {P (i)} is finished or not. If the processing is not finished, its judgement, i.e., step 6, is to be kept on. Whereas if the processing is finished, i.e. if the electronic message #N is returned to the transmission controller 7, the i is to be increased by 1 (1←i+1) (S7).

Next, the judgement is to be made if i <|P| is yes or not, i.e., to judge if the number i element still remains in the transmission path or not. If the number i element remains, the operation returns to step 2. While if the number i element does not remain, the information of the electronic message identification code column 51=#N within the processing position memory unit 50 is to be deleted from the registration and the operation finishes.

The user can confirm the message transmission status during the message transmission/processing being made according to the procedures mentioned above. If an ID number of the electronic message for knowing its transmission status is given to the processing position indication device 6 (in this case, its value is "#1000" and it is notified by the transmission controller 7 when the electronic message is input from the electronic message input device 1), the processing position indication device 6 checks the electronic message identification number 51 within the processing position memory unit 50. If the object ID number is identified, the electronic message processor number column 52 corresponding to it can be obtained.

FIG. 13 illustrates changes within the processing position memory unit 50 when the electronic messages are being transmitted to the transmission path in order of A→B→C→D, wherein:

(a) shows a status before an electronic message is issued, (b) shows a status of the electronic message being transmitted to the electronic message processor A as an ID number #1000 after the electronic message is issued, (c) shows a status of the electronic message being transmitted to the electronic message processor 3B after being processed in the electronic message processor 3A, (d) shows a status of the electronic message being transmitted to the electronic message processor 3C after being processed in the electronic message processor 3B, (e) shows a status of the electronic message being transmitted to the electronic message processor 3D after being processed in the electronic message processor 3C, and (f) shows a status of the electronic message of ID number #1000 disappearing after being processed in the electronic message processor 3D.

Namely, the processing position indicating device 6 can tell the progress of the process to a transmitter by properly-referring the content of the processing position memory unit 50 and indicating the progress on a display. FIG. 14 is a flowchart showing its operation. At first, ID number #N of the electronic message for required processing position (S11) is input. Then, an object ID number from the electronic message identification number 51 within the processing position memory unit 50 (S12) is retrieved and a judgement is made on whether the object ID number is found or not (S13). If the object ID number is found, the electronic message processor code column 52 paired with the electronic message identification number #N is indicated on a display.

Embodiment 5

The fifth embodiment relating to this invention will be described as follows based on FIGS. 15 to 17:

In the above-mentioned embodiment, only an electronic message processing position may be indicated. However, in this embodiment, the processing position indicating device 6 is so designed to indicate an electronic message processing position in a chart together with a transmission path by combining the contents of the processing position memory unit 50 further with those of the transmission path memory unit 40.

FIG. 15 shows examples of the chart.

Figure 15A:
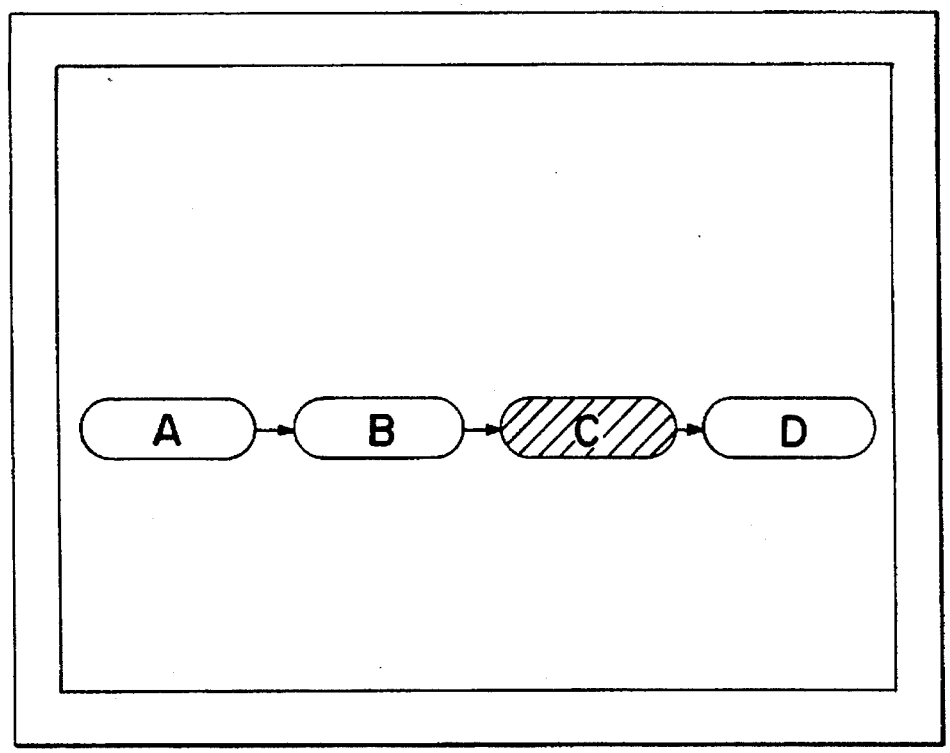
FIGS. 15(a) and (b) are explanation drawings showing an example of the indication respectively.

FIG. 15(a) is an example where, since an electronic message classification of ID #1000 is "UU", the processing position indicating device 6 displays on a screen a transmission path A→B→C→D in a chart and at the same time indicates the "C" in an emphasized way for recognizing that the respective message is transmitted to the electronic message processor 3C. FIG. 16 shows a variety of examples of the content of the processing position memory unit 50 to be referred in this process and 54 is an electronic message classification column. This shows that the electronic message #1000 is under transmission to the electronic message processor C.

Figure 17A:
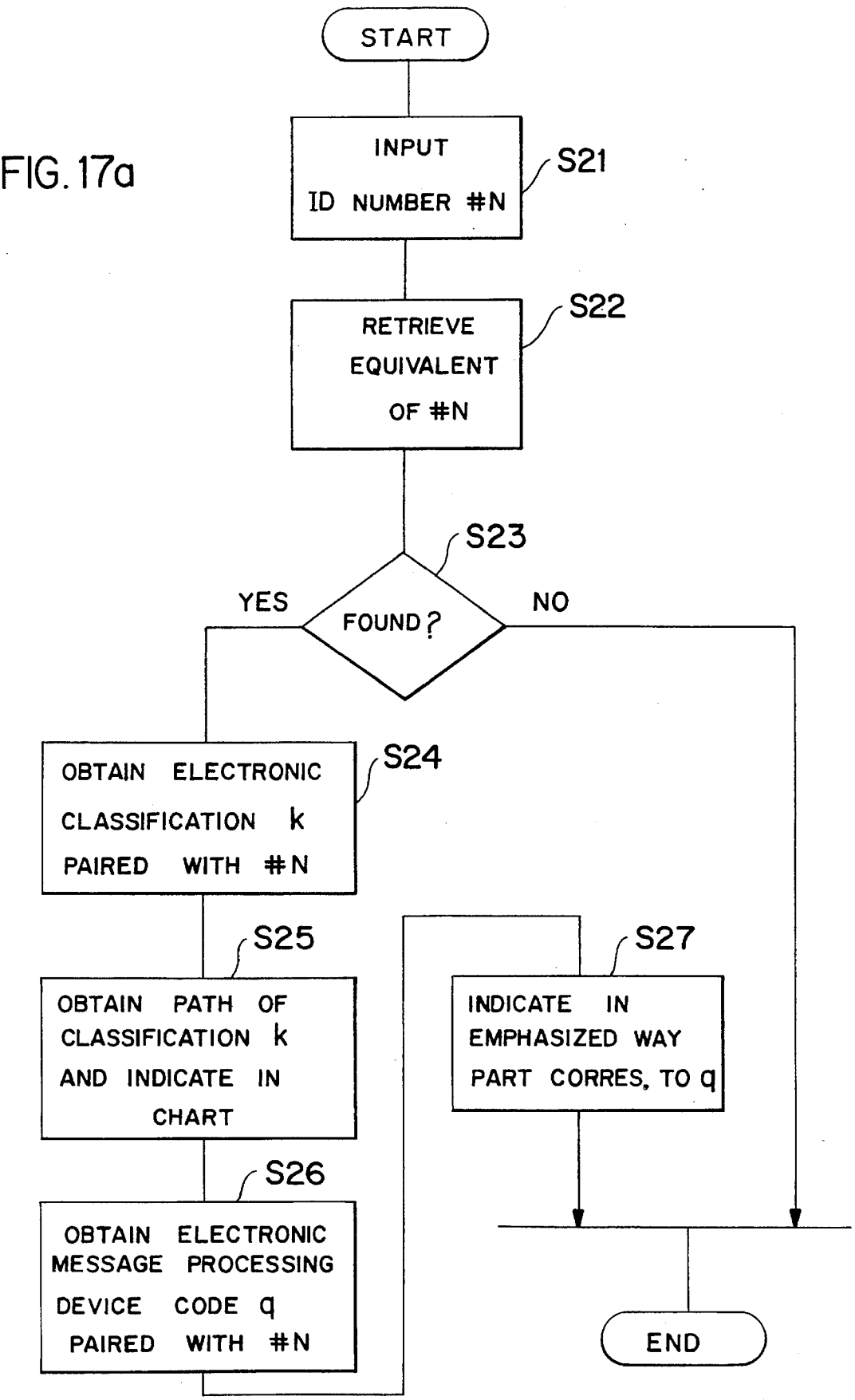

FIG. 17(a) is a flowchart showing this process. Firstly, in the same way as in the Embodiment 1, ID number #N of the electronic message for the required processing position (S21) is input and an equivalent of #N in the electronic message identification code column 51 from the processing position memory unit 50 (S22) is retrieved. Then, a judgement is made on whether the ID number #N is found or not (S23) and if the ID number #N is not found, the process is finished. Whereas if the ID number #N is found, an identification by retrieval from the electronic message classification column 54 that the electronic classification k being paired with the electronic message identification code #N is made (in the above-mentioned example, classification k is "DD") (S24). A path of the classification k from the transmission path memory unit 40 is obtained and indicated in a chart (S25). Next, the electronic message processing device code 1 being paired with the electronic message identification code #N is identified (in the above-mentioned example, device code 1 is C) (S26). Afterward, in an emphasized way, the part "C" corresponding to the electronic message processor code 1 is indicated within the transmission path (S27) and the process is finished.

Figure 15B:
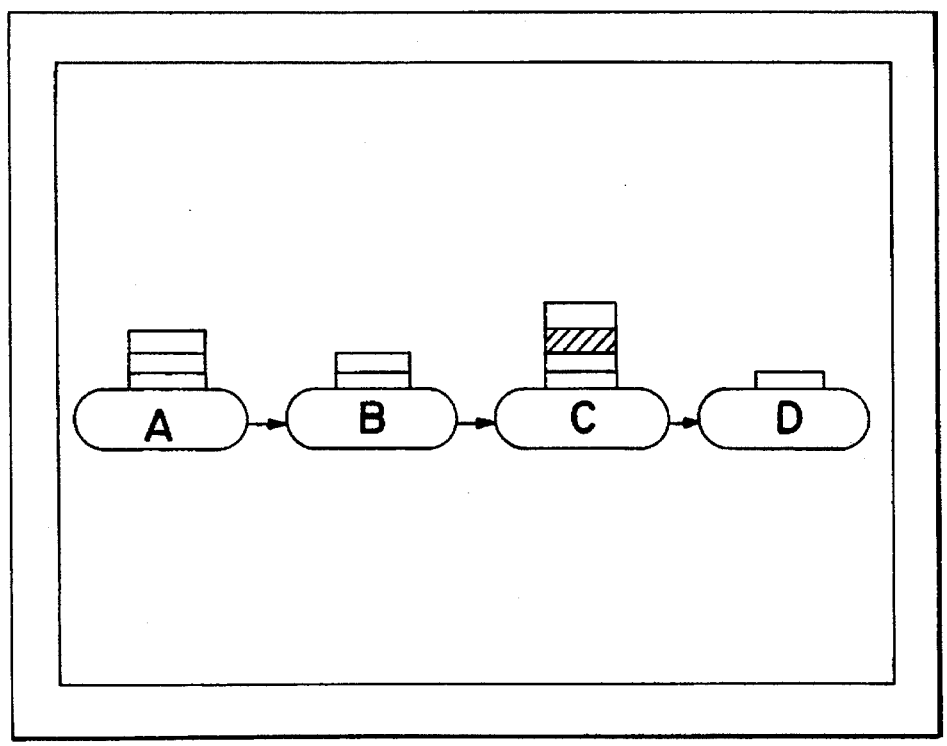

FIG. 15(b) is an example of indication in a chart wherein the number of electronic messages under transmission obtained from the processing position memory unit 50 referring individual electronic message processors A–D for the transmission path A→B→C→D are graphically indicated and at the same time, required messages are indicated in an emphasized way. FIG. 16(b) shows a variety of examples of the content of the processing position memory unit 50 referred to in this process and 53 is an electronic message transmission time column and 54 is an electronic message classification column. The electronic message #1000 is under transmission to the electronic processor 3C. Further, four electronic messages #920, #940, #1000 and #1020 are being transmitted to the electronic processor C and #1000 is the third one from the electronic message transmission time column as far as the electronic processor 3C is concerned. Therefore, for drawing transmitters' attention, the third electronic message indicated on the electronic processor 3C is to be emphasized.

Figure 17B:
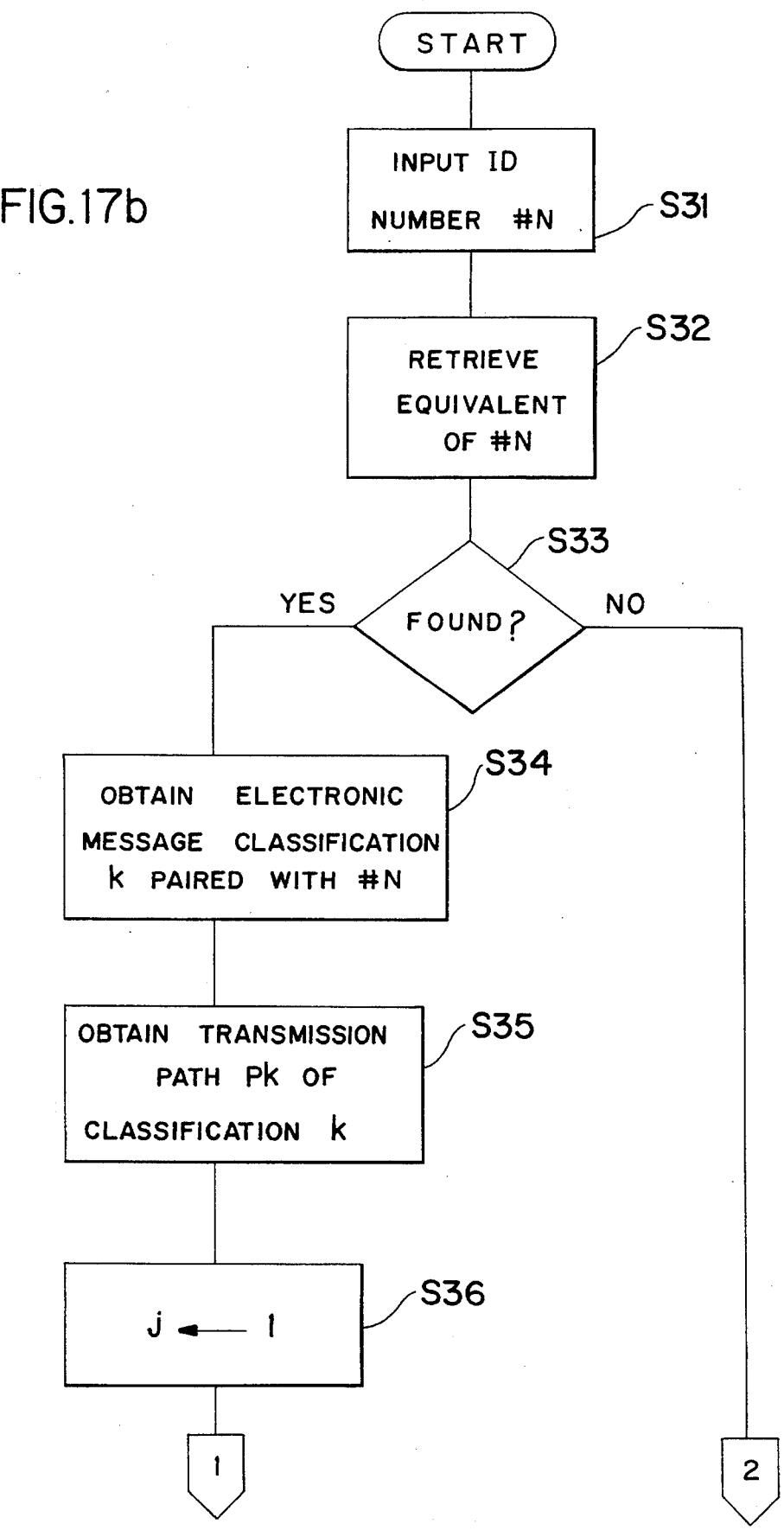
Figure 17C:
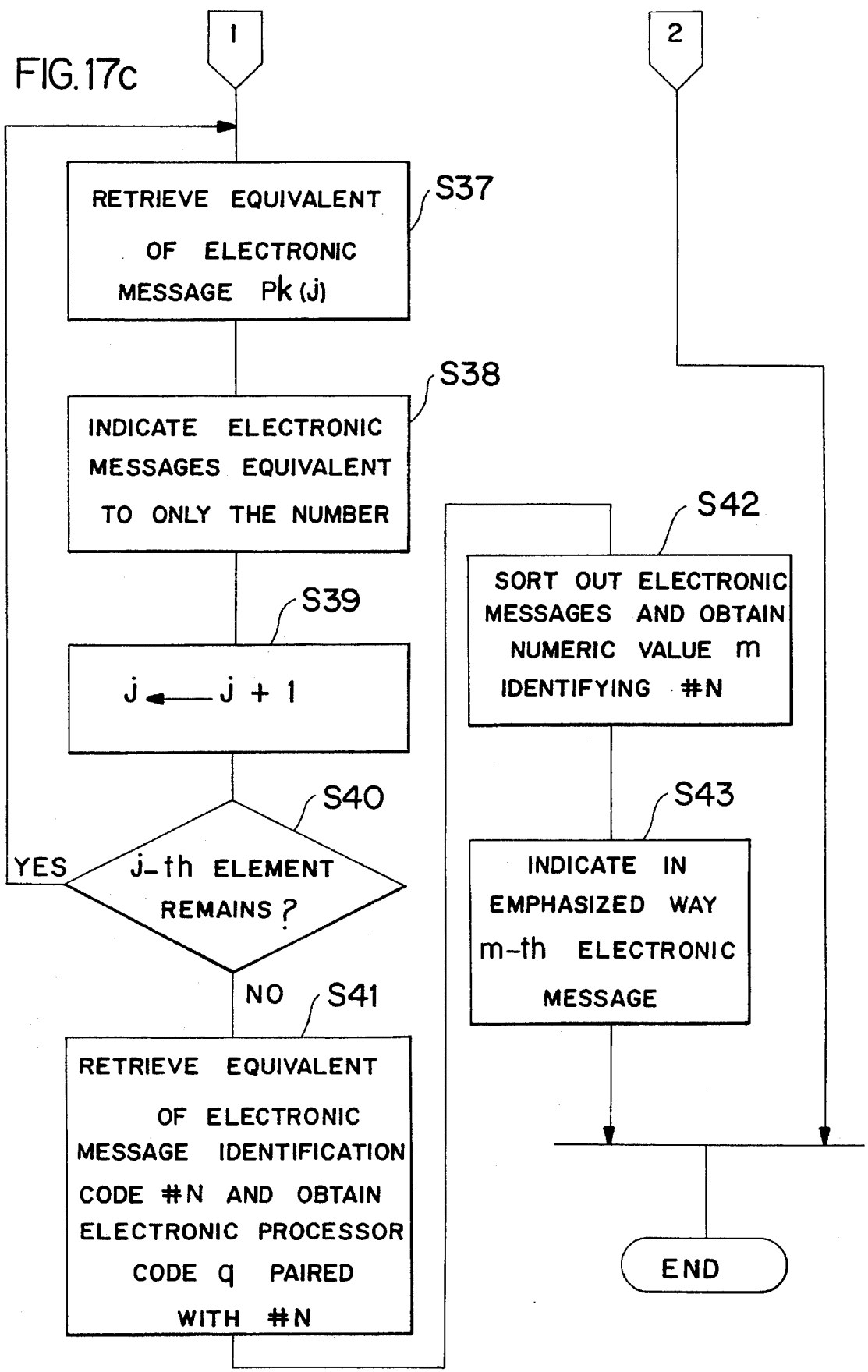

FIG. 17(b) is a flowchart showing this process. Firstly, as mentioned above, ID number #N of the electronic message for required processing position (S31) is input and an equivalent of #N in the electronic message identification code column S1 is retrieved from the processing position memory unit 50 (S32) . Then a judgement is made on whether the ID number #N is found or not (S33). If the ID number #N is not found, the process is finished. Whereas if the ID number #N is found, an identification by retrieval that the electronic message classification k being paired with the electronic identification code #N is made (in the above example, classification k is "UU") from the electronic message classification column 54 (S34). A transmission path Pk (in the above example, Pk=A→B→C→D) of the classification k is obtained and indicated in a chart (S35). Then, a variable j is initialized to 1 (S36) and an equivalent of the electronic message processor Pk(j) is retrieved from the processing position memory unit 50 (S37). Further, electronic messages are indicated in the form of square frames, which are equivalent to only the number of the electronic message processor corresponding to this code, and additionally indicated on the upper part corresponding to the electronic message processor Pk(j) within the indicate transmission path Pk (S38). Then, j is increased by 1 (S39) and a judgement is made on whether an element of number j still remains in the transmission path or not (S40). If an element of number j still remains, the process returns to step 37. Whereas if an element of number j does not remain, the process proceeds to step 41. In step 41, an equivalent of the electronic message identification code #N is retrieved from the processing position memory unit 50 and the electronic processor code q being paired with the identification code #N is obtained. Then, electronic messages are sorted out which the electronic message processor determines to be corresponding to this code from the electronic transmission time column in order of time and a numeric value m which identifies a number equivalent to the electronic message identification code #N (S42) is obtained. In an emphasized way, the number m electronic message being indicated upon the upper part corresponding to the electronic message processor code 1 shown in chart (S42) is indicated and the process is finished.

As described above, according to this embodiment, a message transmission status advising device for enabling visual recognition of processing can be realized.

Furthermore, the electronic message input device 1, the electronic message processor 3 {P (i)}} and the processing position indicating device 6 are separated individually in the above embodiments, but it will be possible to control the electronic message ID number by a work station uniformly made with an optional combination of each. In this case, when an electronic message input or an electronic message for processing is being transmitted, the above-mentioned indication processing can be carried out, for example, by indicating an electronic message iconography and making a click selection of the electronic message.

Embodiment 6

Figures 19, 20:
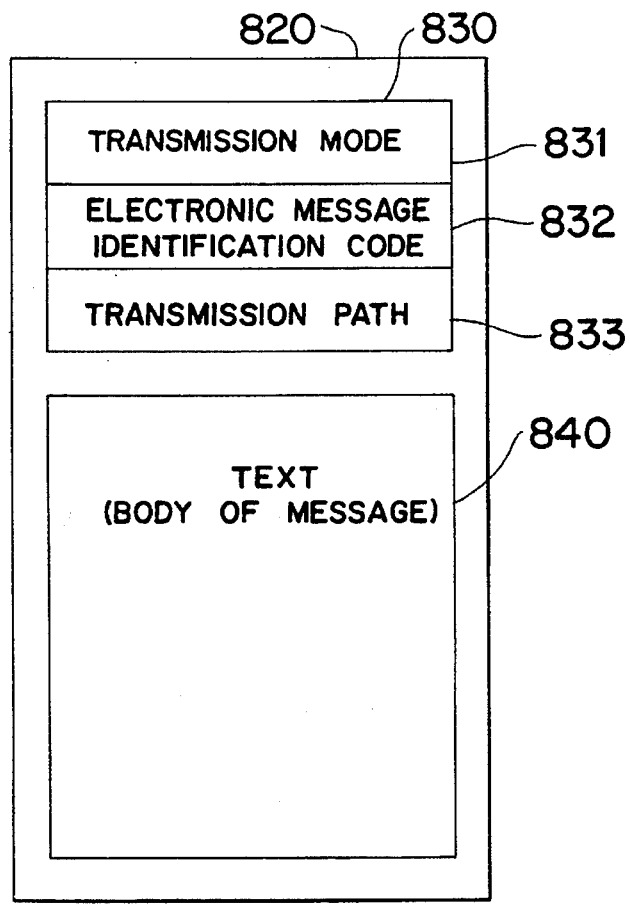

The sixth embodiment relating to this invention will be described as follows based on FIGS. 18 to 22:

FIG. 18 is a block diagram showing a message transmission device in an embodiment of this invention. In FIG. 18, 801 is a receiving device, 802 is a transmission information separating device, 803 is a transmission status memory controller, 804 is a transmission information composing device, 805 is a transmitting device A, and 806 is a storage region respectively. FIG. 19 is a drawing showing an example of an electronic message structure where 820 is an electronic message, 830 is a transmission information, 831 is a transmission mode, 832 is an electronic message identification code, 833 is a transmission path, and 840 is the body of the electronic message respectively. FIG. 20 is a drawing showing an example of memory types of the storage region 806 where 851 is an electronic message identification code column and 852 is a transmission path column.

Figure 21B:
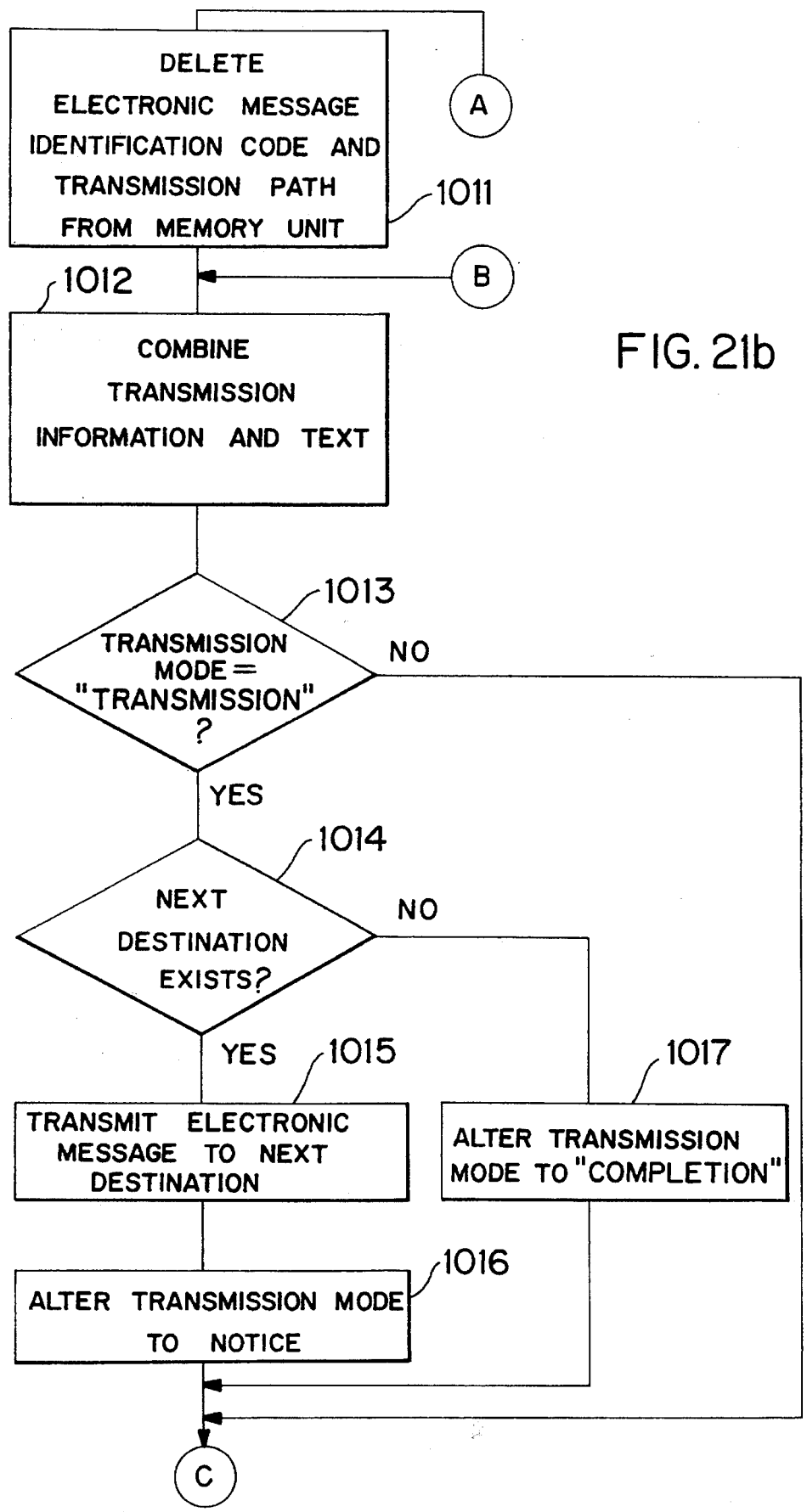
Figure 21C:
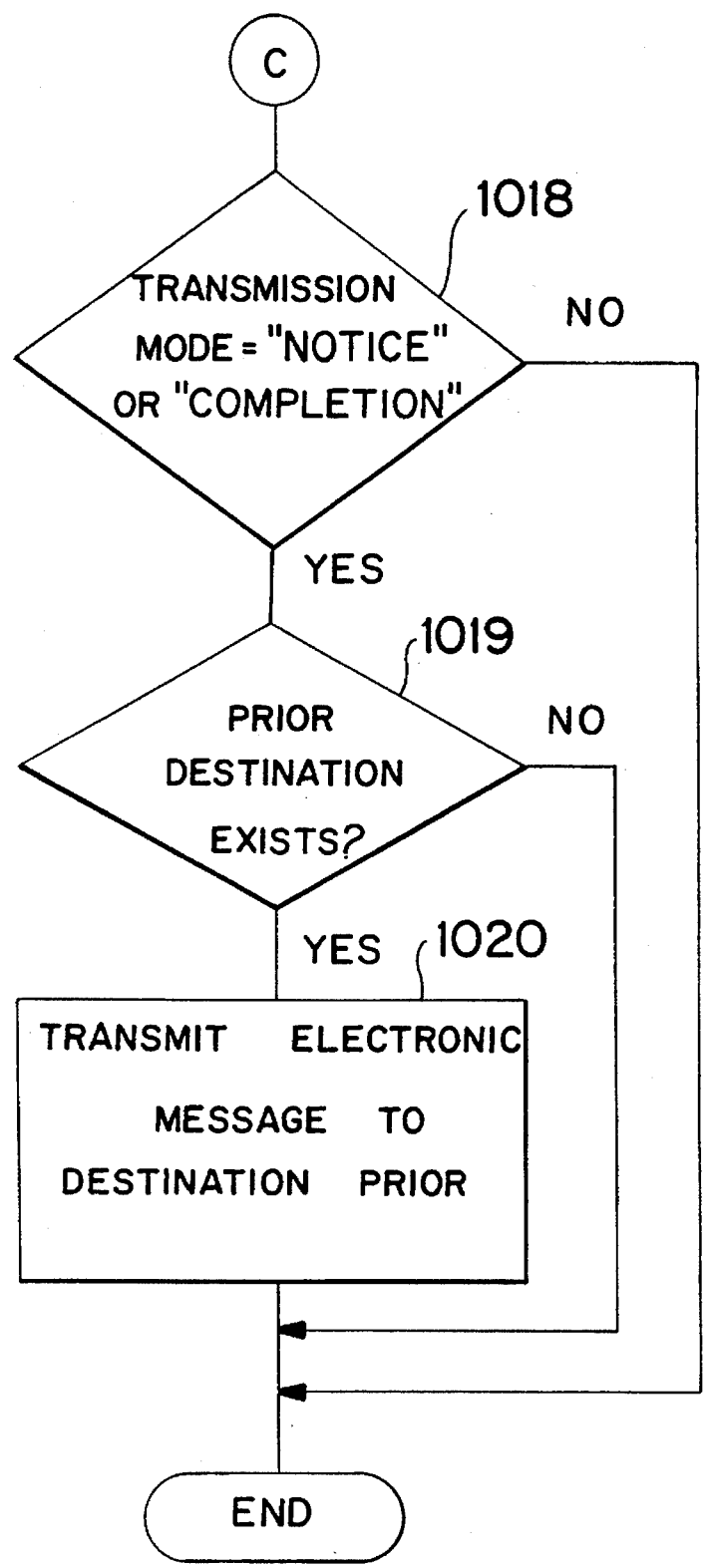

An explanation of the relative operations according to the process flowchart indicted in FIG. 21 is as follows:

(Start)—Carrying out the following operations whenever a new electronic message comes in.

(1001)—The receiving device 801 receives the electronic message.

(1002)—The transmission separation device 802 separates the electronic message into the transmission information 830 and the text 840.

(1003)—The transmission status memory controller 803 carries out processing depending on a value of the transmission mode 831 within the message information 830 i.e., if the value of the transmission mode 831 is "Transmission", the process proceeds to (1004) if the value of the transmission mode 831 is "Notice" the process proceeds to (1008) and if the value of the transmission mode is "Complete" to (1011) respectively.

(1004)—The transmitting device S gives a "Finish" code to the relevant address (own address) in a transmission path written on the transmission path 833 and specifies processing by the relevant electronic message transmission device.

(1005)—The transmission status memory controller 803 checks if there is a next address to which the electronic message 820 should be transmitted (recall) or not depending on the contents of the transmission path 833. If there is a next address, the process proceeds to (1006) and if there is not a next address, the process proceeds to (1007).

(1006)—The transmission status memory controller 803 additionally stores in the storage region 806 a set of the electronic transmission identification code 832 and the transmission path 833, i.e. contents of the electronic transmission identification code 832, are additionally registered in the electronic message identification code column 851 within the transmission information 830 and those of transmission path in transmission path column 852 within the same.

(1007)—The electronic transmission 820 carries out its objective operation by a means not indicated in chart i.e., processing for the text (such as approval), and proceeds to (1012) after completion of the process.

(1008)—The transmission status memory controller 803 checks if the same contents indicated in the electronic message identification code 832 within the transmission information 830 are stored (registered) in the electronic message identification code column 851 within the memory region 806 or not. If the information is already registered, it proceeds to (1009) and if the information is not registered, the process proceeds to (1010).

(1009)—The transmission status memory controller 803 rewrites contents of the transmission path column 8S2 to those of the transmission path 833 for a set of the electronic message identification code column 851 and the transmission path column already stored and proceeds to (1012) next.

(1010)—The transmission status memory controller 803 additionally stores in the storage region a set of the electronic message identification code 832 and the transmission path 833 within the transmission information 830. That is, contents of the electronic message identification code 832 are additionally registered in the electronic message identification code column 833 within the memory region 806 and those of transmission path 833 in the transmission path column 8B2 within the same. The content of this process is the same as that in (1006). Then the process proceeds to (1012) next.

(1011)—The transmission status memory controller 803 detects the same content as indicated in the electronic message identification code 832 within the transmission information 806 from the electronic message identification code column within the same and deletes its information from the electronic message identification code column 851 and the transmission path column 852 and proceeds to (1012) next.

(1012)—The transmission information composing device 804 composes the transmission information 830 and the text 840 to form the electronic message 820.

(1013)—The transmitting device 805 checks a value of the transmission mode 831 within the transmission information 830. If its result is "Transmission", the process proceeds to (1014) and if the result is not "Transmission", the process proceeds to (1018).

(1014)—The transmitting device A805 checks, depending on the content of the transmission path, if there is a next address to which the electronic message 820 having finished the text processing should be transmitted or not. If the text processing should be transmitted, the process proceeds to (1015) and if the text processing should not be transmitted, the process proceeds to (1017).

(1015)—The transmitting device A805 transmits the electronic message 820 to the next address to relevant address in the transmission path written in the transmission path 833.

(1016)—The transmitting device A805 changes the contents of the transmission code within the transmission information 830 from "Transmission" to "Notice" and proceeds to (1018).

(1017)—The transmitting device A805 changes the contents of the transmission mode 831 from "Transmission" to "Completion" and proceeds to (1018).

(1018)—The transmitting device A805 checks the contents of the transmission mode 831 and if its value is either one of "Notice" or "Completion", proceeds to (1019) and if not, proceeds to (Finish).

(1019)—The transmitting device A805 checks if there is any prior address to the relevant address to which the processing status of the electronic message should be noticed or not. If there is any relevant prior address, the process proceeds to (1020) and if there is not any relevant prior address, the process proceeds to (Finish).

(1020)—The transmitting device A805 transmits the electronic message 820 to one address prior to the relevant address in the transmission path written on the transmission path 833.

(Finish) A series of processing for the received electronic messages finishes.

The above operation will be described more specifically using examples in FIG.

Now, the electronic message identification code 832 is expressed by a series number #N and the transmission path 833 in order of addresses such as t1, t2, t3 . . . tn. Further, the "Finished" code of transmission is shown as '*' and *t1 *t2 t3 . . . tn expresses that the transmission to t1 and t2 out of t1 . . . tn is finished and is understood by processing at t3. Nothing is to be considered as being stored in the storage region under an initial state.

(a) When an electronic message (transmission mode, electronic message identification code, transmission path text )=( "Transmission", #500 (*a1, *a2, p, a4, a5) , text #500) is received by the transmitting device 801, the transmission status memory device recognizes the transmission mode 831 as being "Transmission" and puts '*' to the relevant address p within the transmission path 833 making it as *p and registers a set (electronic message identification code, transmission path) =(#500, (*a1, *a2, *p, a4, a5) in the storage region 806. The transmitting device A805 recognizes the transmission mode as being "Transmission" and after transmitting an electronic message (transmission, #500, (*a1, *a2, *p, a4, a5), text #500) to the next address a4 to the relevant address, transmits an electronic message (Notice, #500, (*a1, *a2, *p, a4, a5), text #500) to one prior address a2 to the relevant address changing the transmission mode 831 to "Notice".

(b) When an electronic message (transmission, #510, (*b1, *b2, *b3, p), text #510) is received by the receiving device 801, the transmission status memory controller 803 recognizes the transmission mode as being "Transmission" and puts '*' to the relevant address p within the transmission path 833 to make it as *p. However, since p is at the end of the transmission path 833, the registration of a set (electronic message identification code, transmission path)=(#510, (*b1, *b2, *b3, *p) to the storage region 806 is not carried out. The transmitting device A805, since the transmission mode is "Transmission" and p is at the end of the transmission path, changes the transmission mode 831 to "Completion" and transmits an electronic message of (completion, #510, (*b1, *b2, *b3, *p), text #510)) to one prior address b3 to the relevant address.

(c) When an electronic message (Notice, #500,-(*a1, *a2, *p, *a4, a5), text #500) is received by the receiving device 801, the transmission status memory controller 803 recognizes the transmission mode 831 as being "Notice" and checks if there is a set of "Electronic message identification code=#500" within the storage region 806 or not. In this case, as there exists the respective set, the transmission status memory controller 803 makes renewal of the transmission path of the set to (*a1, *a2, *p, *a4, a5). The transmitting device A805 transmits the electronic message (Notice, #500, (*a1, *a2, *p, *a4, a5), text #500) to one prior address a2 to the relevant address.

(d) When an electronic message (Notice, #520, (*p, c2, c3), text #520) is received by the receiving device 801, the transmission status memory controlling 803 recognizes the transmission mode 831 as being "Notice" and checks if there is a set of "Electronic transmission identification code=#520" within the storage region 806 or not. In this case, as there exists no such set, the transmission status memory controller 803 registers a set (electronic message identification code, transmission path)=(#520, (*p, c2, c3)). The transmitting device A805, since the transmission mode is "Notice" and p is at the head of the transmission path, does not transmit any electronic message of (Notice, #520, (*p, C2, C3), text #520).

(e) When an electronic message of (completion, #500, (*a1, *a2, *p, *a4, *15) , text #500) is received by the receiving device 801, the transmission status memory controller 803 recognizes the transmission mode as being "Completion" and checks a set of "Electronic message identification code=#500" within the storage region 806 and deletes a respective set. The transmitting device A805, since the transmission mode 831 is "Completion", transmits the electronic message of (completion, #500, (*a1, *a2, *p, *a4, *a5), text #500) to one prior address a2 to the relevant address.

As described above, according to this embodiment, it is possible to grasp the transmission status of electronic messages by providing a transmission information which indicates a transmission path and a range of finished transmission as a collateral information of the electronic message and by having a transmission memory device check transmission information within the electronic message being transmitted. Further, being provided with a storage region for memorizing the result of checking, users can recognize transmission status of the electronic message in question by referring to the contents of the storage region at any time.

In this case, the transmitting device A805 makes notice of the transmission information showing its status by a relay system one after another and so a heavy traffic for notice can be avoided.

Furthermore, the text is included in an electronic message for noticing a transmission status to one prior address to the relevant address in this embodiment, but the text can be omitted.

Embodiment 7

Figure 24B:
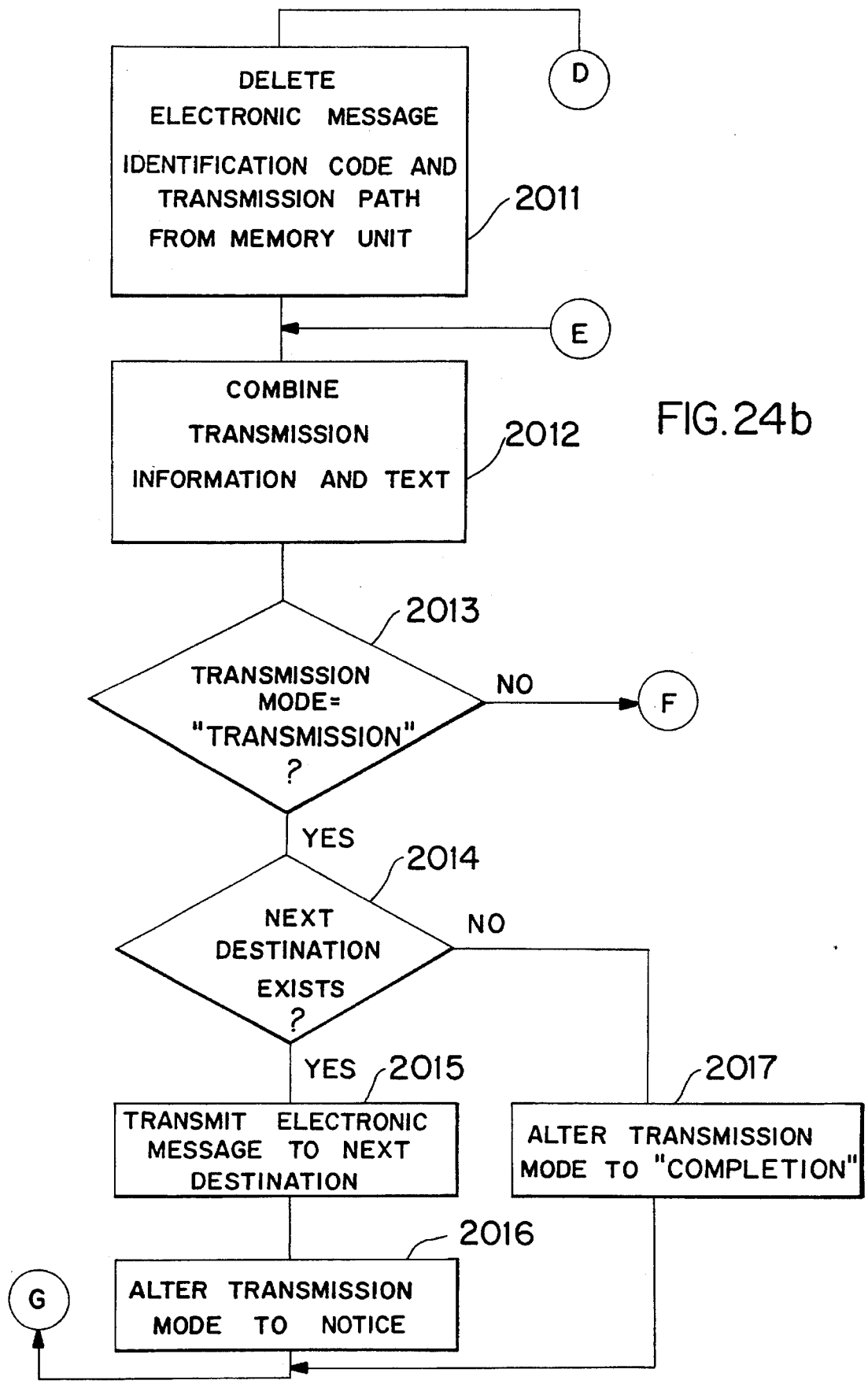
Figure 24C:
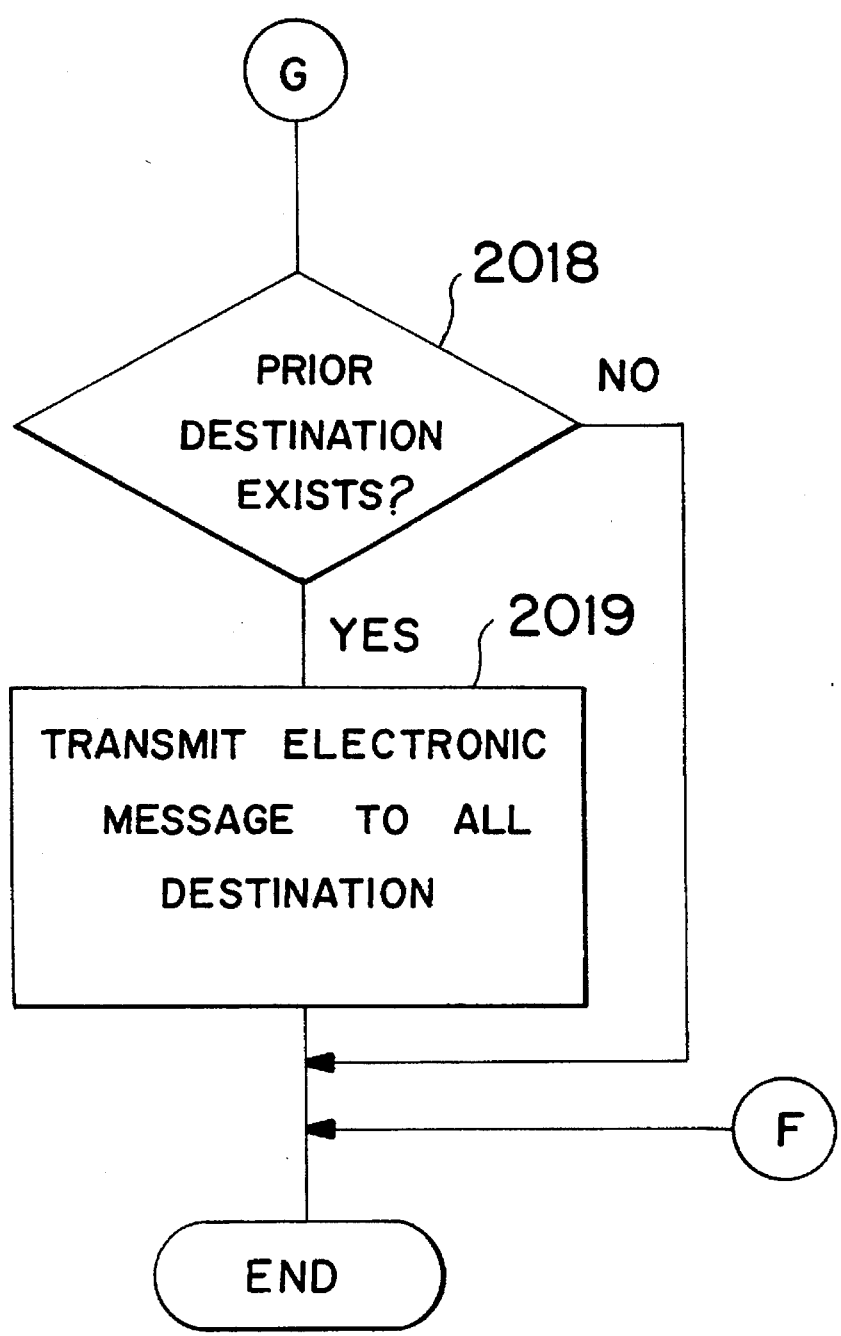

The seventh embodiment relating to this invention will be described as follows based on FIGS. 23 to 25:

FIG. 23 is a block diagram showing a message transmission processor in an embodiment of this invention.

In FIG. 23, the elements having the same numbers as in FIG. 18 are the same as in the sixth embodiment and 815 is a transmitting device B.

An explanation of relative operations according to the process flowchart indicated in FIG. 23 is as per below: The operations, except those of the transmitting device B, i.e., (2001)–(2012), are identical with (1001)–(1012) in the sixth embodiment (FIG. 19) and so operations (2013)–(Finish) only are explained herein.

(2013)—The transmitting device B815 checks a value of the transmission mode 831 within the transmission information 830. If the value is "Transmission", the process proceeds to (2014) and if the value is not "Transmission", the process proceeds to (2018).

(2014)—The transmitting device B815 checks if there is any next address to which the electronic message 820 having finished processing of the text should be transmitted or not from the contents of the transmission path 833. If there is a next address for transmission, the process proceeds to (2015) and if there is not a next address for transmission, the process proceeds to (2017).

(2015)—The transmitting device B815 transmits the electronic message 820 to the next address to the relevant address in the transmission path written on the transmission path 833.

(2016)—The transmitting device B815 changes the contents of transmission mode 831 within the transmission information 830 from "Transmission" to "Notice" and–next proceeds to (2018).

(2017)—The transmitting device B815 changes the contents of transmission mode 831 from "Transmission" to "Completion" and proceeds to (2018) next.

(2018)—The transmitting device B815 checks if there is any prior address to the relevant address to which the processing status of the electronic message 820 should be noticed from the contents of the transmission path 833. If there is any prior address, the process proceeds to (2019) and if there is not any prior address, the process proceeds to (Finish).

(2019)—The transmission device B815 transmits the electronic message to one prior address to the relevant address in the transmission path written on the transmission path 833.

(Finish) A series of processing for received electronic messages finishes.

The above operations will be described more specifically by using the examples in FIG. 25.

(a) When an electronic message (transmission mode, electronic message identification code, transmission path, text)=(transmission, #500, (*a1, *a2, p, a4, a5), text #500) is received by the receiving device 801, the transmission status memory controller 803 recognizes the transmission mode 831 as being "Transmission" and puts '*' to the relevant address p within the transmission path 833 making it as *p and registers a set (electronic message code, transmission path)= (#500, (*a1, *a2, *p, a4, a5)) in the storage region 806. The transmission device B815 recognizes the transmission mode 831 as being "Transmission" and after transmitting the electronic message (transmission, #500, (*a1, *a2, *p, a4, a5), text #500) to the next address a4 to the relevant address, transmits an electronic message (notice, #500, (*a1, *a2, *p, a4, a5), text #500) to all the prior addresses a1 and a2 to the relevant address changing the transmission mode to "Notice".

(b) When an electronic message (transmission, #500, (*b1, *b2, *b3, p), text #510) is received by the receiving device 801, the transmission status memory controller 803 recognizes the transmission mode as being "Transmission" and puts '*' to the relevant address p within the transmission path 833 to make it as *p. However, since p is at the end of the transmission path 833, the registration of a set (electronic identification code, transmission path)=(#510, (*b1, *b2, *b3, *p)) in the storage region 806 is not carried out. The transmitting device B815, since the transmission mode is "Transmission" and p is at the end of the transmission path 833, changes the transmission mode 831 to "Notice" and transmits an electronic message of (notice, #510, (*b1, *b2, *b3, *p), text #510)) to all the prior addresses B1, B2 and B3 to the relevant address.

(c) When an electronic message (notice, #500, (*a1, *a2, *p, *a4, *a5), text #500) is received by the receiving device 801, the transmission status memory controller 803 recognizes the transmission mode as being "Notice" and checks if there is a set of "Electronic transmission identification code=500: within the storage region 806 or not. In this case, as there exists the respective set, the transmission status memory controller 803 makes a renewal of the transmission path of the set to (*a1, *a2, *p, *a4, *a5). The transmitting device B815 will not make any transmission as the transmission mode is "Notice".

(d) When an electronic message (notice, #520, (*p, c2, c3), text #520) is received by the receiving device 801, the transmission status memory controller 803 recognizes the transmission mode as being "Notice" and checks if there is a set of "Electronic transmission identification code=#520" within the storage region 806 or not. In this case, as there exists no such set, the transmission status memory controller 803 registers a set (electronic transmission identification code, transmission path)=(#520, (*p, c2, c3)) in the storage region 806.

(e) When an electronic message (completion, #500, (*a1, *a2, *p, *a4, *a5), text #500) is received by the receiving device 801, the transmission status memory controller 803 recognizes the transmission mode as being "Completion" and checks a set of "Electronic transmission identification code=#500" within the storage region 806 and deletes the relative one. The transmitting device B815 will not make any transmission as the transmission mode is "Completion".

As described above, according to this embodiment, it is possible to grasp the transmission status of electronic messages by providing a transmission information-which indicates a transmission path and a range of finished transmission as a collateral information of the electronic message and by having a transmission status memory controller check transmission information within the electronic message being transmitted. Further, being provided with a storage region for memorizing the result of checking, users can recognize the transmission status of the electronic message in question by referring to the contents of the storage region at any time.

In this case, the transmitting device B makes notice of the transmission information showing its status to all the addresses at a time and, therefore, a smooth and quick notice can be carried out.

Furthermore, the text is included in an electronic message for noticing a transmission status to all the prior addresses to the relevant address in this embodiment also, but the text can be omitted.

Embodiment 8

Figure 26:
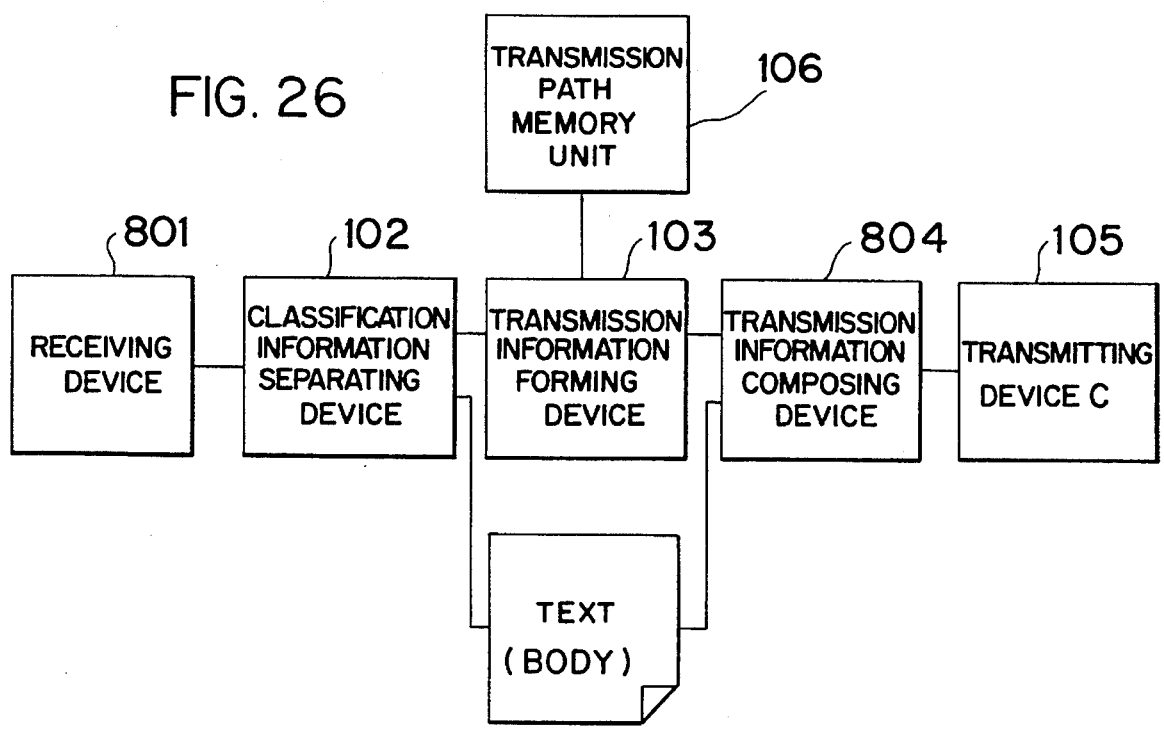

The eighth embodiment relating to this invention will be described as follows based on FIGS. 26 to 31:

FIG. 26 is a block diagram showing a message transmission device in an embodiment of this invention. In FIG. 26, 801 is a receiving device, 102 is a classification information separating device, 103 is a transmission information forming device, 804 is a transmission information composing device, 105 is a transmitting device and 106 is a transmission path memory unit respectively. FIG. 27 is a drawing showing an example of a structure of electronic message being input where 120 is an electronic message being input, 130 is a classification information, 131 is an electronic message classification, 132 is an electronic message identification code, 133 is a transmitter address and 140 is a text respectively. A structure of an electronic message being output is the same as that of the first embodiment. FIG. 28 is a drawing showing an example of memory types of the transmission path memory unit 106 where 151 is an electronic message classification column and 152 is a basic transmission path column.

Figure 29A:
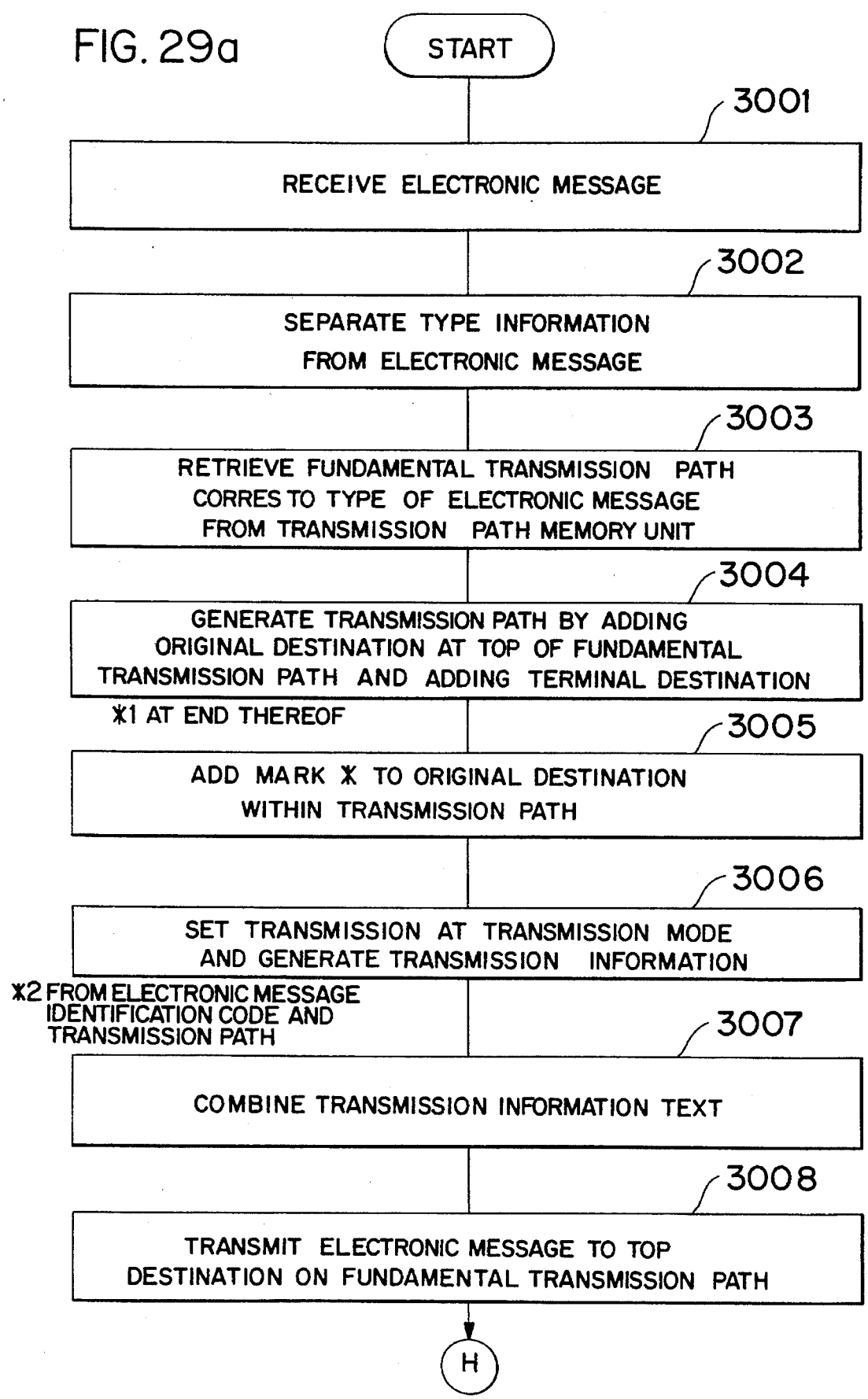
Figure 29B:
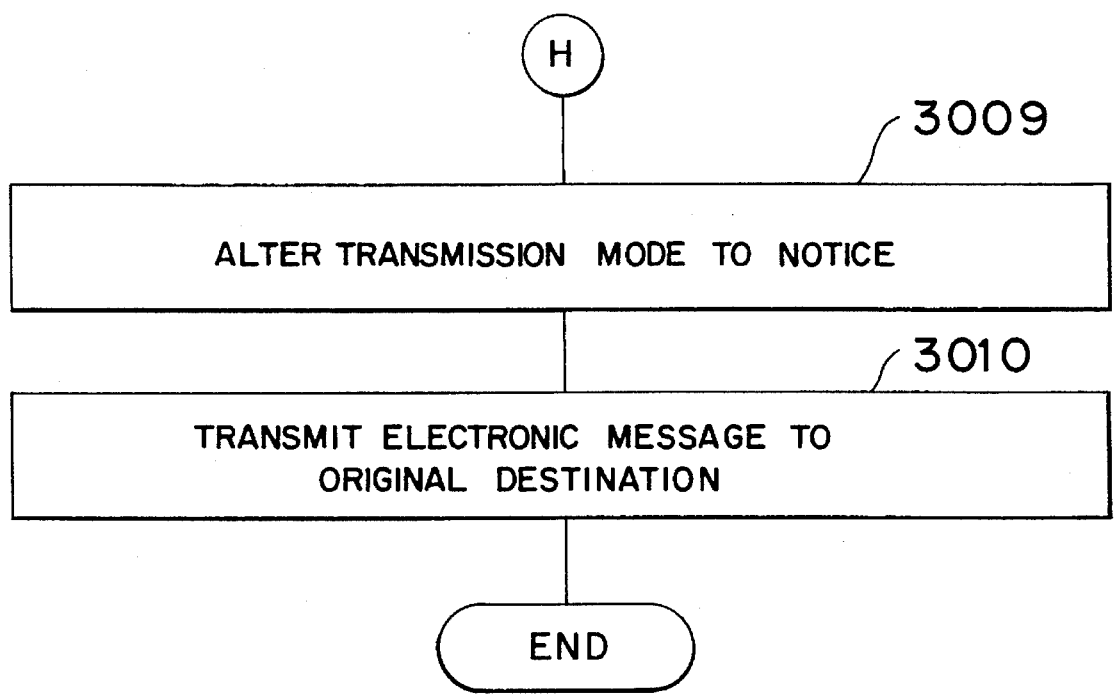

An explanation follows of the relative operations according to the processing flowchart shown in FIG. 29:

(Start) The following operations are carried out whenever a new electronic message comes in.

(3001)—The receiving device 801 receives the electronic message 120.

(3002)—The classification information separating device 102 separates the received electronic message 120 into the classification information 130 and the text 840.

(3003)—The transmission information forming device 103 retrieves from the electronic message classification column 151 within the basic transmission path memory unit 106 the message identical with the contents shown in the electronic message classification 132 within the classification information 130 and obtains a basic transmission path corresponding to the electronic transmission classification 131.

(3004)—The transmission information forming device 103 puts the transmitter address 133 to the head of the obtained basic transmission path and also a special terminal address (e.g., 's') to its end and forms the transmission path 833.

(3005)—The transmission information forming device 103 gives a "Finished" code to the head address (=the transmitter address 133) in the transmission path written on the transmission path 833 within the transmission information 830.

(3006)—The transmission information forming device 103 forms the transmission information 830 from the transmission mode 831 having a value of "Transmission", where the electronic message identification code 832 is a copy of the electronic message identification code 132 and the transmission path 833.

(3007)—The transmission information composing device 804 composes the transmission information 830 and the text 849 into the electronic message 820.

(3008)—The transmitting device C105 transmits the electronic message 820 to the next address in the transmission path written on the transmission path 833, i.e., the head address of the basic transmission path 133.

(3009)—The transmitting device C105 changes the contents of the transmission mode within the transmission information 830 from "Transmission" to "Notice".

(3010)—The transmitting device C105 transmits the electronic message to the head address to which its processing status should be noticed, i.e., to the transmitter address 133.

(Finish) A series of processing for the received electronic messages finishes.

The above operations will be described more specifically by using the following examples. Now, supposing that there are documents A–E as electronic message classifications and their basic transmission paths RA–RE are RA=(a2, a3, a4), RB=(B2, B3), RC=(c2), RD=(d2, d3, d4), RE=(e2, e3), then, the contents of the transmission path memory unit will become the same as in FIG. 30.

Figures 30, 31:
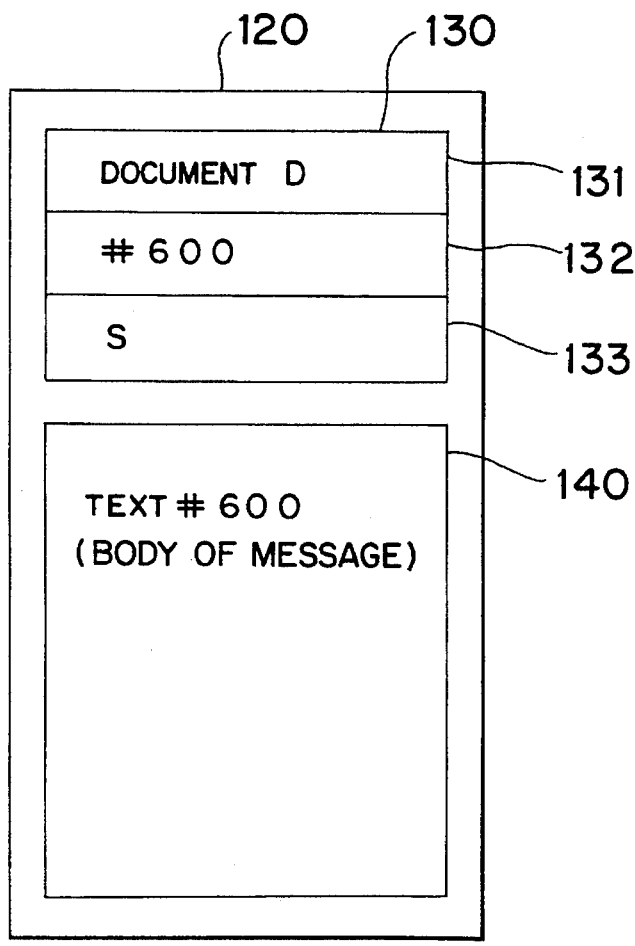

When the electronic message shown in FIG. 31 (electronic message classification, electronic message identification code, transmitter address, message body)=(document D, #600, 's', #600) is received by the transmitting device 801, the classification information separating device 192 separates the electronic message into the classification information 130 and the 140.

Then, the transmission information forming device 103 forms the transmission information 830 in the following procedures:

(a) Since the electronic message classification 131 within the classification information 130 is "Document D", the transmission information forming device 103 retrieves the electronic message classification column 151= "Document "D" from the transmission path memory unit 106. As a result, a set (electronic message classification, basic transmission path) =(document D, (d2, d3, d4)) can be obtained.

(b) The transmitter address 133 and the terminal address are given to the basic transmission path obtained in (a) and a transmission path =(s, d2, d3, d4, z) is formed.

(c) A "Finished" code is given to the head address of the transmission path 833 formed in (b) and the transmission path=(*s, d2, d3, d4, z) is formed.

(d) The transmission information=(transmission, #600, (*s, d2, d3, d4, z) is formed from the contents of the electronic message identification code 132 and the result of (c).

After this, the transmission information composing device 804 composes the transmission information 830 and the text 840 and (transmission mode, electronic message identification code, transmission path, text)=(transmission, #600, (*s, d2, d3, d4, s), text #600). The transmitting device C105 transmits the composed electronic message 820 to the next address (='d2') and after changing the transmission mode to "Notice", transmits the electronic message (notice, #600, (*s, d2, d3, d4, z), text #600) to the transmitter address 133 (='s').

As described above, according to this embodiment, by providing a transmission information showing its path including a transmitter address in accordance with its classification and a range of finished transmission as a collateral information, the transmission information can be made as if its path were determined already at the transmitter's side. Since the transmitter address is included in the course of the transmission path, a circulation of the messages and notice of the transmission status to the transmitter address in a relay system according to the transmission path are possible without providing any special transmission controller.

Further, in this embodiment, a basic transmission path is determined in advance (fixed), however, as described in the prior example of Pat. Disclosure No. 62-25373 (filed in 1987), it can be decided by providing a deputy depending on the conditions at the time (variable).

Embodiment 9

Figure 33:
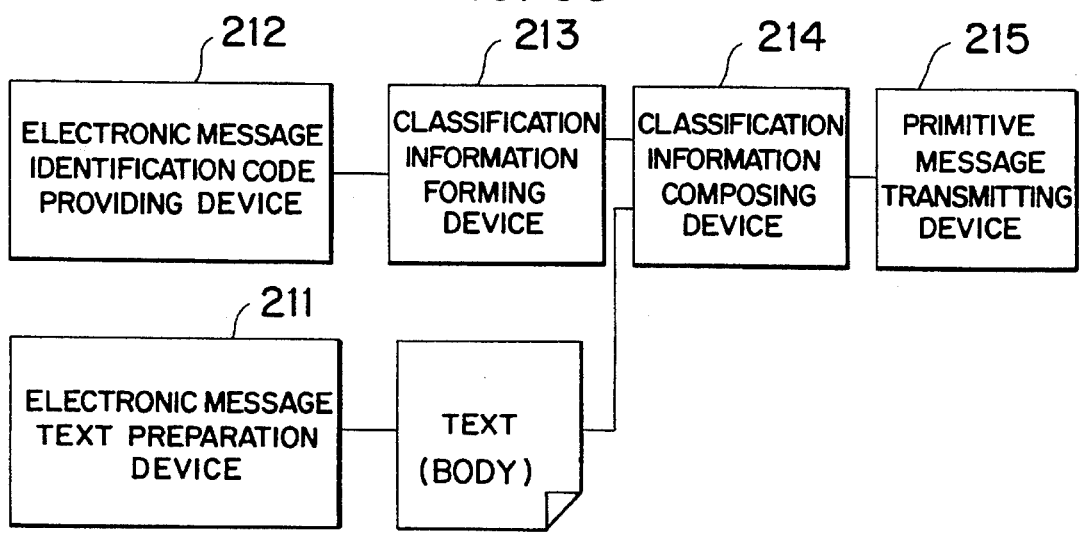

The ninth embodiment relating to this invention will be described as follows based on FIG. 32 to 34:

FIG. 32 is a block diagram showing a message transmission system in an embodiment of this invention. In FIG. 32, 201 is an electronic message preparation device, 202 is a transmission path determination device, 203A, 203B–203n are message processors A and 204 is a terminal noticing device A respectively. FIG. 33 is a drawing showing a structure relating to a primitive message preparation operation in the electronic message preparation device 201 where 211 is an electronic message text preparation device, 212 is an electronic message identification code providing device, 213 is a classification information forming device, 214 is a classification information composing device and 215 is a primitive message transmitting device respectively.

Firstly, an explanation about the original message preparation operation of the electronic message preparation device 201 follows:

Users prepare the text of electronic messages to be circulated by using the electronic message identification code providing device 212.

After the text is prepared, the electronic message identification code providing device 212 forms an identification code which can identify the electronic message for transmission of the prepared text as the prime one. The classification information forming device 213 forms the classification information from the electronic message classification of the text prepared by the electronic message text preparation device 211, the electronic message identification code formed by the electronic message identification code providing device 212 and an address given to the electronic message text preparation device 211. The classification information composing device 214 composes the classification information formed by the classification information forming device 213 and the text prepared by the electronic message text preparation device 211 and prepares the primitive message. Then, the primitive message transmitting device 215 transmits the primitive message to the transmission path determination device 202. These operations can be carried out by using electronic mail functions such as UNIX.

Figure 34:
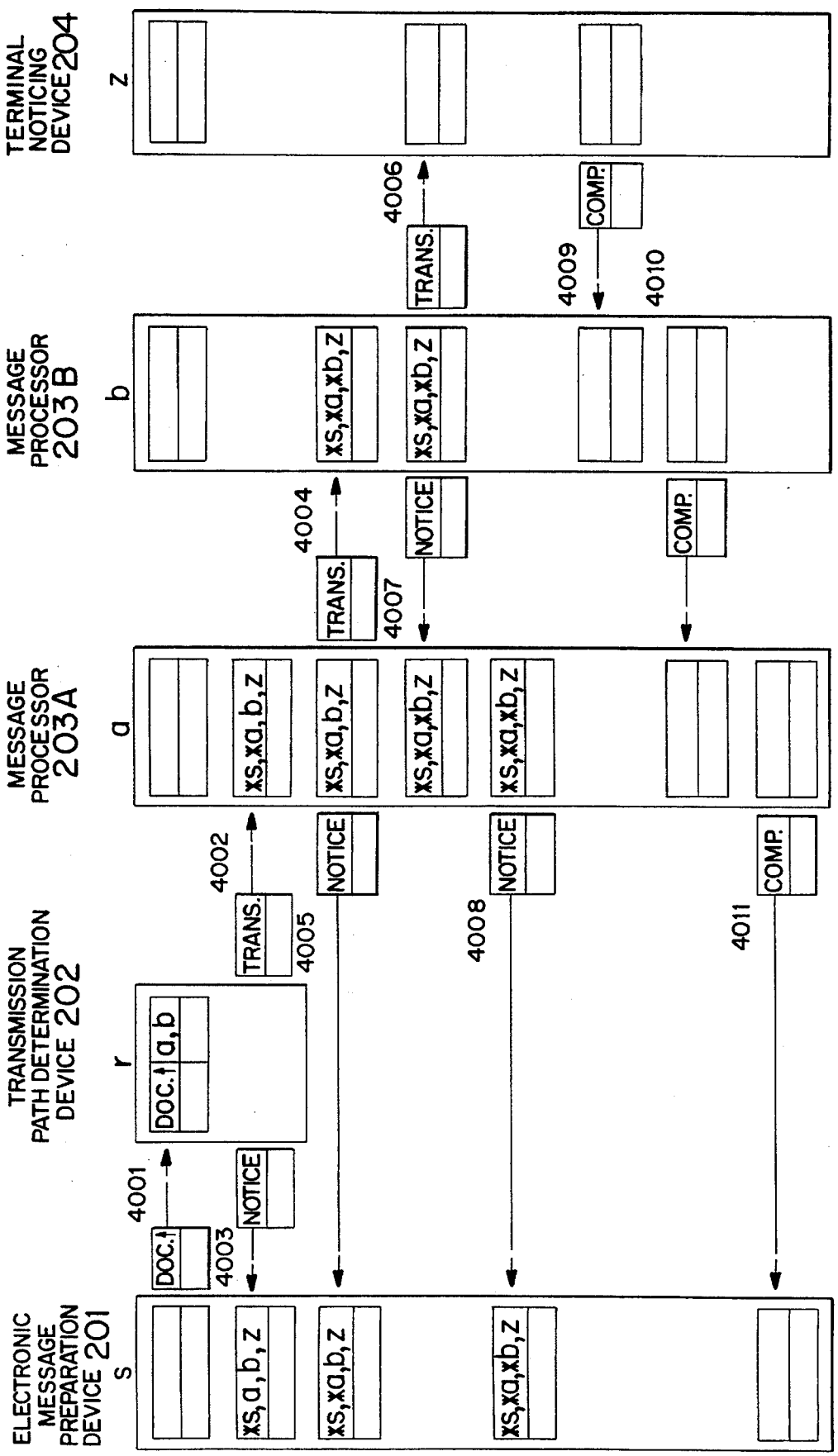

Next, the following explanation is provided to explain how the primitive message prepared in this way will be circulated in the message transmission system of this embodiment by referring to FIG. 34. Now, it is assumed that the addresses of the electronic message preparation device 201, the transmission path determination device 202 and the terminal noticing device are s, r and z respectively and an address i corresponds with the message processor A203i:

(4001)—Assuming that users prepared an electronic message having a classification of "Document T" by the electronic message preparation device 201, then, the electronic message preparation device 201 transmits this document to the transmission path determination device 202.

(4002)—The transmission path determination device 202 forms a transmission path (s, a, b, z) since the basic transmission path of "Document T" is (a, b). From this, the users recognize the operational order of the message processor A for transmission is to be in the order of 203A and 203B. The primitive message prepared by the electronic message preparation device 201 is then processed and the electronic message is transmitted to the address a.

(4003)—In order to notice the electronic message having been transmitted to the message processor A203A, the transmission path determination device 202 transmits the respective message to the electronic message preparation device 201. The electronic message preparation device 201 additionally memorizes the transmission status (*s, a, b, z) in its storage region.

(4004)—The message processor A203A receives the electronic message transmitted in (4002) and additionally memorizes the transmission status (*s, *a, b, z) in its storage region. After finishing processing of the text, the electronic message is transmitted to the next address b, i.e., the message process A203B.

(4005)—In order to notice the electronic message having been transmitted to the message processor A203B, the message processor A203A transmits the respective message to the electronic message preparation device 201. The electronic message preparation device 201 makes renewal of its storage region, memorizes the transmission status (*s, *a, b, z) in its storage region and recognizes that the processing in the message processor A203A has been finished and the message is being transmitted by the change of the transmission status from (*s, a, b, z) to (*s, *a, b, z).

(4006) The message processor A203B receives the electronic message transmitted in (4004) and additionally memorizes–the transmission status (*s, *a, *b, z) in its storage region. After finishing processing of the text, the processor A203B transmits the message to the next address z, i.e., the terminal noticing device A204.

(4007)–In order to notice the electronic message having been transmitted to the terminal noticing device A204, the message processor A203B transmits the respective message to the message processor A203A. The message processor A203A makes renewal of its storage region and memorizes the transmission status (*s, *a, *b, z) in its storage region.

(4008)—The message processor A203A retransmits the electronic message received as a notice to one prior address as it is. The electronic message preparation device 201 makes renewal of its storage region and memorizes the transmission status (*s, *a, *b, z) in its storage region and also recognizes that the processing in the message processor A203B has been finished and the message is being transmitted to the terminal noticing device 204 from the change of the transmission status (*s, *a, *b, z).

(4009)—The terminal noticing device A204 receives the electronic message transmitted in (4006) and transmits the message noticing a completion of a series of the message transmission processing to one prior address i.e., to the message processor A203B. The message processor -A203B deletes the transmission status (*s, *a, *b, z) from the storage region and recognizes the completion of all the processing since the transmission status has been deleted.

(4010)—The message processor A203B retransmits the electronic message received as a completion to one prior address as it is. The message processor A203A deletes transmission status (*s, *a, *b, z) from the storage region and recognizes the completion of all the processing since the transmission status has been deleted.

(4011)—The message processor A203A retransmits the electronic message received as a completion to one prior address as it is. The electronic message preparation device 201 deletes the transmission status (*s, *a, *b, z) from the storage region and recognizes the completion of all the processing since the transmission status has been deleted.

As described above, according to this embodiment, a circulation of transmission of the primitive electronic messages prepared by electronic message preparation devices can be made in the order of a relay system by providing the primitive electronic messages with a transmission path determination device which provides a transmission information showing both a transmission path including a transmitter address depending on an electronic transmission classification and a range of finished transmission as collateral information of electronic messages, the transmission processor A, which memorizes a transmission status of the electronic messages one after another by checking transmission information within the messages being transmitted, and the terminal noticing device A carry out terminal processing of the circulation. In this time, users handling the message processor can transmit the message automatically without knowing to where the message should be circulated. Further, the users can check the transmission status of the required messages by referring at any time to the contents of the storage region provided in the electronic message preparation device or message processor A. In this case, since the message processor A notices the transmission information ("Notice" and "Completion") showing the transmission status one after another in a relay system, a heavy traffic for the notice can be avoided.

Further, in this embodiment, a basic transmission path within the transmission determination device is determined in advance (fixed), however, as in the prior example of Pat. Disclosure No. 62-25373 (filed in 1987) it can be determined by providing a deputy depending on the conditions at the time. Furthermore, if a structure of a transmission path determination device is made which includes a transmission path determining device, a receiving device, an information separating device, a transmission path memory device, a transmission information forming device, a transmission information composing device and a transmission device and that of the transmission processor which includes a receiving device, a transmission information separating device, a transmission status memory device, a memory control device, a transmission information composing device and a transmitting device, similar functions and effects can be expected without providing the terminal noticing device A.

Embodiment 10

The tenth embodiment relating to this invention will be described as follows based on FIGS. 35 to 36:

FIG. 35 is a block diagram showing a transmission system in an embodiment of this invention. In FIG. 35, 201 is an electronic message preparation device, 202 is a transmission path determination device, 233A, 233B–233n are message processors B and 234 is a terminal noticing device B respectively. An operation of primitive message preparation of the electronic message preparation device is the same as in the fourth embodiment.

Figure 36:
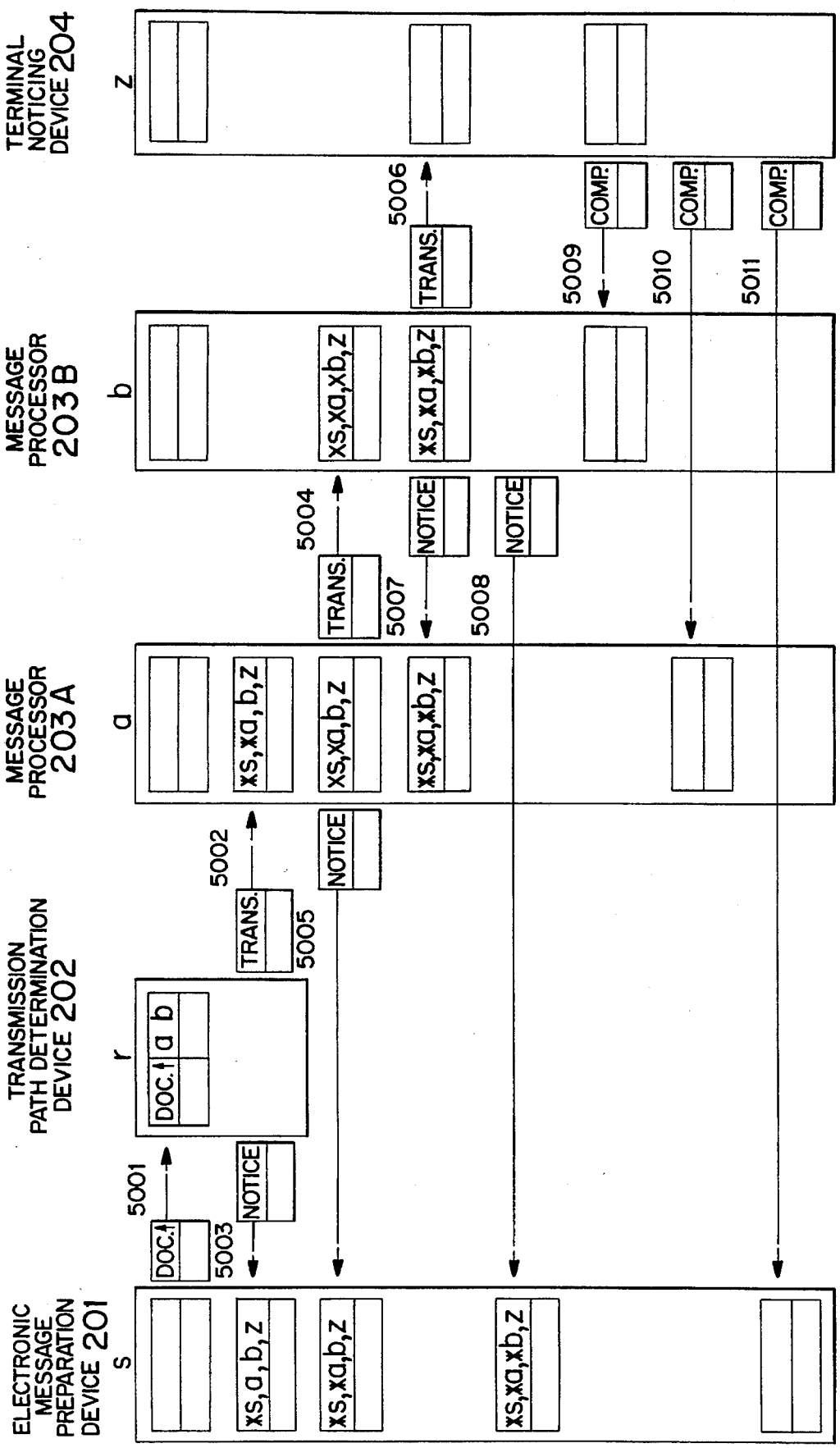
Figure 37:
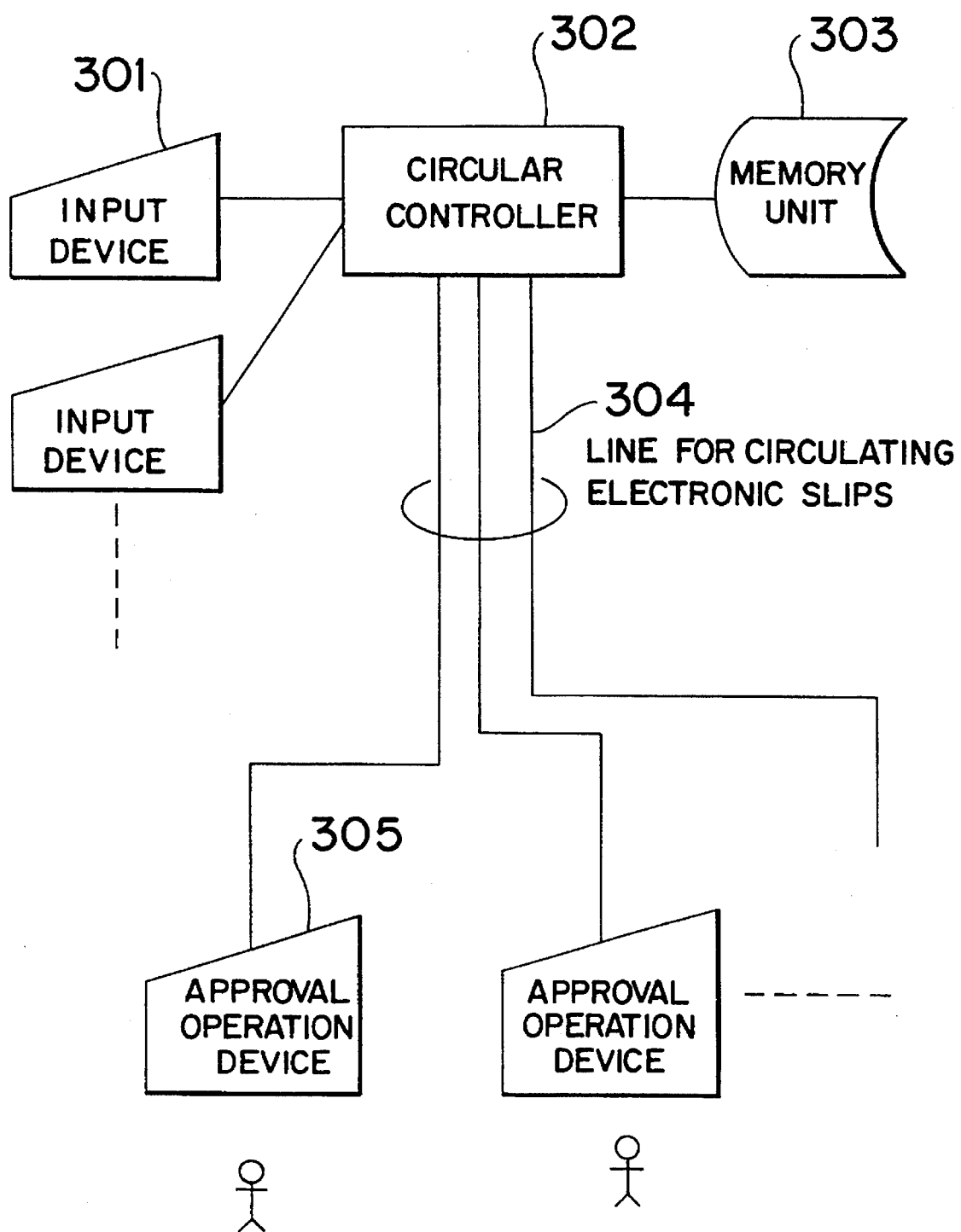
FIGS. 37 to 38 show an example of a prior art system.
Figure 38:
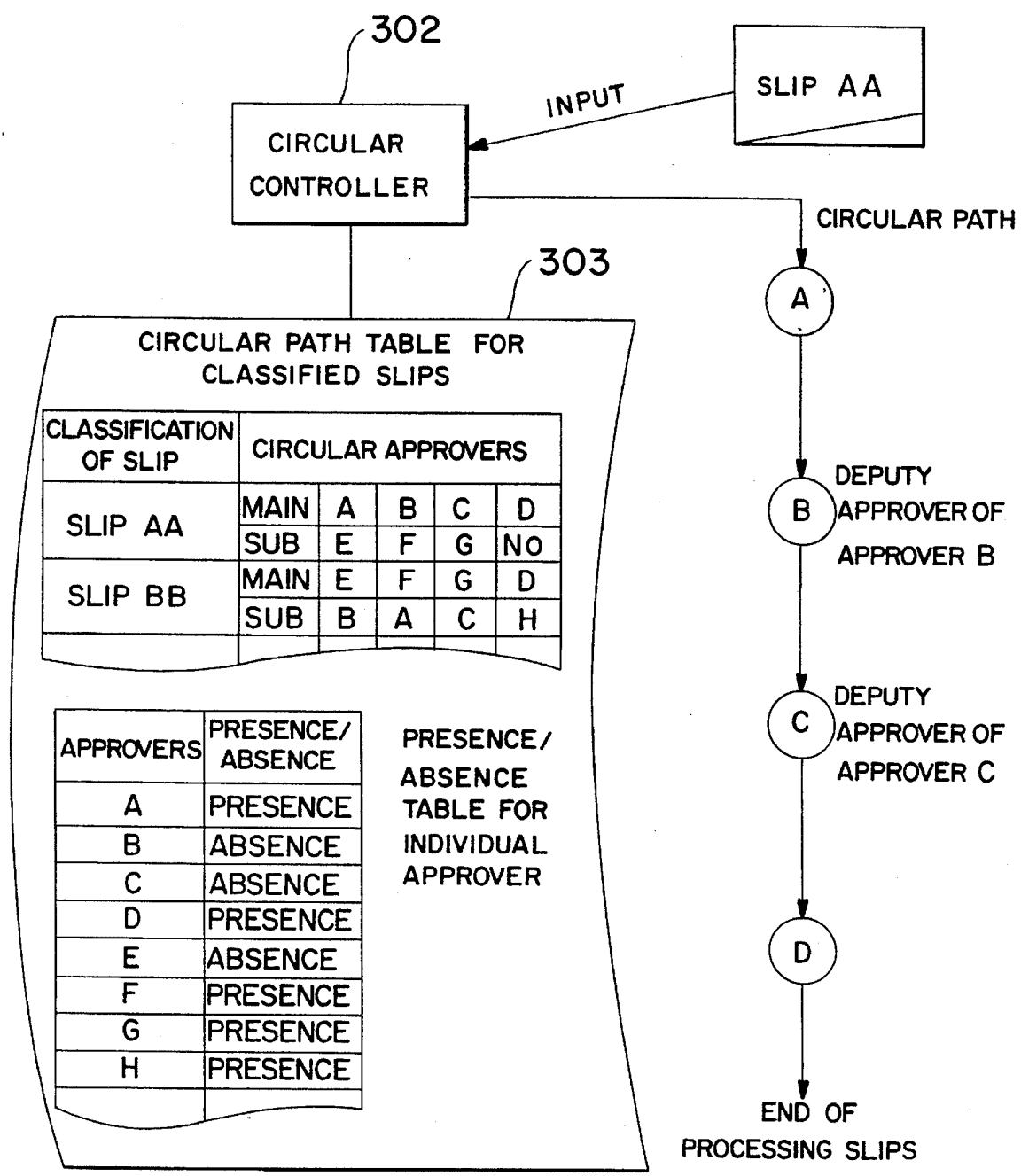

An explanation follows for how the primitive message prepared by the electronic message preparation device will be circulated in a message transmission system in this embodiment by referring FIG. 36. Now, assuming that addresses for the electronic message preparation device 201, the transmission path determination device 202 and the terminal noticing device are s, i and z respectively and the address i corresponds to the message processor B213$i$:

(5001)—Supposing that users prepared an electronic message classification of "Document T" by the electronic message preparation device 201, then, the electronic message preparation device 201 transmits this document to the transmission path determination device 202.

(5002)—The transmission path determination device 202 forms a transmission path (s, a, b, z) as the basic transmission path of "Document T" is (a, b). The users recognize the operational order of the message processor B is in 233A and 233B. Then, the primitive message prepared by the electronic message preparation device 201 is processed and transmitted to the address a.

(5003)—In order to notice the electronic message having been transmitted to the message processor 5213A, the transmission path determination device 202 transmits the respective message to the electronic message preparation device 201. The preparation device 201 additionally memorizes the transmission status (*s, a, b, z) in its storage region.

(5004)—The message processor B233A receives the electronic message transmitted in (5002) and additionally memorizes the transmission status (*s, *a, b, z) in its storage region. After finishing processing of the text, the electronic message is transmitted to the next address b, i.e., the transmission processor B233B.

(5005)—In order to notice the electronic message having been transmitted to the message processor B233B, the message processor B233A transmits the respective message to the electronic message preparation device 201. The electronic message preparation device 201 makes a renewal of its storage region and memorizes the transmission status (*s, *a, b, z) in its storage region and recognizes that the processing in the message processor B233A has been finished and the message is transmitted to the processor B233B from the transmission status (*s, *a, b, z).

(5006)—The message processor B233B receives the electronic message transmitted in (5004) and additionally memorizes the transmission status (*s, *a, *b, z) in its storage region and after finishing processing of the text, transmits the message to the next address z, i.e., the terminal noticing device B234.

(5007)–(5008)—In order to notice the electronic message having been transmitted to the terminal noticing device, the message processor B233B transmits the respective message to all the prior addresses. The message processor B233A makes a renewal of its storage region in (5007) and memorizes the transmission status (*s, *a, *b, z) in its storage region. From this, it is recognized that the processing in the message processor B233B has been finished and the message being transmitted to the terminal noticing device B234. In (5008), the electronic message preparation device 201 makes a renewal of its storage region and memorizes the transmission status (*s, *a, *b, z). From this, it is recognized that the processing in the message processing device B233B has been finished and the message is transmitted to the terminal noticing device B234.

(5009)–(5010)—The terminal noticing device B234 receives the electronic message transmitted in (5006) and transmits the message noticing that a series of message transmission processing has been finished to all the prior addresses. In (5009), the message processor B233B deletes the transmission status (*s, *a, *b, z) from its storage region. From this, the transmission processor B233A recognizes that all the processing has been completed. In (5010), the message preparation device 201 deletes the transmission status (*s, *a, *b, z) from its storage region and recognizes that all the processing has been finished from this.

(5011)—The electronic message 201 deletes the transmission status (*s, *a, *b,-z) from its storage region and recognizes that all the processing has been completed.

As described above, according to this embodiment, the primitive electronic message prepared by the electronic message preparation device can be circulated one after another in a relay system by providing a transmission path determination device which provides a transmission path including a transmitter address depending on an electronic transmission classification and a transmission information showing a range of finished transmission as a collateral information, a transmission processor memorizing transmission status successively by checking the message information being transmitted and a terminal noticing device for carrying out terminal processing of the circulation. In this time, the users handling transmission processors can transmit the relevant message automatically after processing without knowing to where the relevant message should be circulated. Further the users, by referring at any time to the contents of the storage region provided by an electronic message preparation device or message processor, can recognize the transmission status of the required messages. In this case, the transmitting device B notices the transmission information ("Notice" and "Completion") showing the transmission status to all the prior addresses to the relevant address shown in the transmission path at a time, and a smooth notice without much delay can be made.

Furthermore, in this embodiment, the basic transmission path within a transmission path determination device is determined in advance (fixed), but the basic transmission path can be determined depending on the conditions of the time by designating a deputy as in the prior example of Pat. Disclosure No. 62-25373 (filed in 1987). The same functions and effects can be expected if a structure of a transmission path determination device which includes a transmission path determining device, a receiving device, an information separating device, a transmission device, a transmission information forming device, a transmission information composing device and a transmission device and that of the message processor B which includes a receiving device, a transmission information separating device, a transmission status memory device, a memory control device, a transmission information composing device and a transmitting device.

In the case when the users do not need to know the transmission status of the required message by referring to the contents of the storage region except by an electronic message preparation device, the transmission status can be given more simply by making the structure of the message processor B and the terminal noticing device B to include a receiving device, a transmission information separating device, a transmission status memory device, a memory control device, a transmission information composing device and a transmitting device.

As described above, according to this invention, it is possible to provide a highly effective message transmission system in practical use, wherein; for the messages received by a message process operator who is to confirm the messages under the condition of being unable to confirm can be confirmed without a delay by designating a deputy to whom the messages and their confirmation process are transferred. In the case where the process operator returns to the condition of being able to confirm, a self-processing is possible by obtaining a notice of being a deputy process for the finished ones among those messages transferred to the deputy process operator and by recalling the messages from the deputy for outstanding ones.

Furthermore, according to this invention, another effective aspect in practical use is that a transmission status of the message (advancing and delaying) can be grasped by both a transmitter side and a process operator side in the course of a transmission path of the message and when there appears to be considerable delay in traffic, necessary measures can be taken such as issuing special instructions based on this information.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed:

1. A message transmission state noticing system comprising:

an electronic message input device to input an electronic message;

more than one electronic message processors each allocated to each of persons who are obliged to process said electronic message;

a transmission path memory means for memorizing a transmission path of said electronic message;

a processing position memory means for memorizing said electronic message processor in said transmission path in which said electronic message is processed presently;

a transmission controller for transmitting an electronic message input by said electronic message input device to each of said electronic transmission processors according to said transmission path memorized in said transmission path memory means and making said processing position memory memorize said electronic message processor in which said electronic message is under processing; and a processing position display means for displaying contents memorized in said processing position memory means.

2. A transmission status noticing system according to claim 1 wherein said processing position display means displays contents in said processing position memory means according to said transmission path memorized in said transmission path memory means.

3. A message transmission apparatus comprising:

a receiving means for receiving an electronic message including transmission information having transmission mode information showing each state of transmission/notice/completion, electronic message identification codes and a transmission path expressed in an order of addresses and a text to be processed;

a transmission information separating means for separating said transmission information from said text in said electronic message;

a transmission status memory means for memorizing said transmission information obtained from said transmission information separating means;

a memory control means for checking said transmission information and up-dating said transmission status memory means so as to memorize a set of said electronic message identification code and said transmission path additionally after putting "Finished" code to a relevant address within said transmission path if said transmission mode is "Transmission", renews said transmission path information related to a set having an electronic message identification code which coincides with said electronic message identification code corresponding said transmission mode if it is "Notice", and deletes the set having on electronic message identification code which coincides with said electronic message identification code corresponding to said transmission mode if it is "Completion";

a transmission information composing means for composing said transmission information and said text having been processed; and a transmitting means for checking said transmission mode of said electronic message obtained by said transmission information composing means and transmitting said transmission mode to one prior address to the relevant address after renewing said transmission mode to "Notice" after transmitting said electronic message to the next address to the relevant address if it is "Transmission" and transmitting said transmission mode to one prior address to the relevant address in said transmission path if it is "Notice" or "Completion".

4. A message transmission apparatus according to claim 3, wherein said transmitting means transmits said transmission mode to one prior address to the relevant address after renewing said transmission mode to "Notice" and after transmitting said electronic message to said next address, if said transmission mode is "Transmission" i.e., if there exists a next address to the relevant address when said transmitting means checks said transmission mode of said electronic message obtained from said transmission information composing means and transmits said transmission mode to one prior address to the relevant address after renewing said transmission mode to "Completion" if there does not exist the next address to the relevant address.

5. A message transmission apparatus according to claim 3, wherein said transmitting means transmits said transmission mode to all prior addresses to the relevant address after renewing said transmission mode to "Notice" and after transmitting said electronic message to a next address to the relevant address if said transmission mode is "Transmission" and stops its operation if said transmission mode is "Notice" or "Completion".

6. A message transmission apparatus according to claim 5, wherein said transmitting means transmits said transmission mode to all prior addresses to the relevant address after renewing said transmission mode to "Notice" and after transmitting said electronic message to said next address if there exists a next address to the relevant address i.e. if said transmission mode is "Transmission" and transmits said transmission mode to all prior addresses to the relevant address after renewing said transmission mode to "Completion" if there does not exit a next address to the relevant address.

7. A message transmission apparatus comprising:

a receiving means for receiving an electronic message including transmission information having transmission mode information showing a each state of transmission/notice/completion, electronic message identification codes and addresses and a transmission path expressed in an order of a text to be processed, a transmission information separating means for separating said transmission information from said text in said electronic message, a transmission status memory means for memorizing said transmission information obtained from said transmission information separating means;

a memory control means for checking said transmission information and up-dating said transmission status memory means so as to memorize a set of said electronic message identification code and said transmission path, if a relevant address is at the head of said transmission path after putting "Finished" code to the relevant address within said transmission path if said transmission mode is "Transmission", renews said transmission path information related to a set having an electronic message identification code which coincides with said electronic transmission identification code corresponding to said transmission mode if it is "Notice", and deletes the set having an electronic message identification code which coincides with said transmission mode if it is "Completion"; and a transmission information composing means for composing said transmission information and said text having been processed and a transmitting means for checking said transmission mode of said electronic message obtained from said transmission information composing means and transmitting said transmission mode to the head of said transmission path after renewing said transmission more to "Notice" and after transmitting the electronic message to a next address to the relevant address if it is "Transmission" and if there exits a next address to the relevant address and transmitting said transmission mode to the head of said transmission path after renewing said transmission mode to "Completion" if it is "Transmission" and if there does not exits a next address to the relevant address.

8. A message transmission apparatus according to claim 3, wherein said receiving means makes said transmission path memory means memorize said transmission path information after renewing the same if a set having an electronic identification code which coincides with the relevant one is found when said transmission mode is "Notice" and if not found, additionally memorize a set of said electronic message identification code and said transmission path.

9. A message transmission apparatus according to claim 8, wherein said receiving means makes said transmission path memory means memorize said transmission path information after renewing the same if a set having an electronic identification code which coincides with the relevant one is found when said transmission mode is "Notice" and if not found, additionally memorize a set of said electronic message identification code and said transmission path.

10. A message transmission apparatus according to claim 8 further comprising:

a text means for forming a text of an electronic message, a code means for giving an electronic identification code;

a kind information means for generating a kind information including a kind of the electronic message to be transmitted;

said electronic message identification code given by said code means for giving the same and addresses to be transmitted;

a composing means for composing said kind information and said text formed by said text means; and an original message transmission means for transmitting an original electronic message composed by said composing means.

11. A message transmission apparatus comprising:

a transmission path determining device for receiving said original electronic message from said electronic message forming apparatus and determining a transmission path of said electronic message comprising;

a receiving means for receiving an electronic message including kind information having an electronic message identification code, a kind of an electronic message, addresses of destinations and a text;

a kind information separating means for separating said kind information from said text in said electronic message;

a transmission path memory means for memorizing basic transmission paths each expressed in an order of addresses determined according to every kind of said electronic message;

a transmission information forming means for searching a relevant basic transmission path among those memorized in said transmission path memory means according to the kind of said electronic message obtained by said kind information separating means and forming a transmission information including said basic transmission path provided with said destination addresses at its head, said electronic message identification code and additional transmission mode information;

a transmission information composing means for composing said transmission information formed by said transmission forming means and said text, a transmission means for transmitting the composed electronic message to a head destination address of said basic transmission path after putting "Finished" code to said destination address and setting said transmission mode of said electronic message as "Transmission" and thereafter transmitting said transmission mode to said destination address after renewing it to "Notice".

12. A message transmission apparatus according to claim 11, wherein said transmission information forming means provides a basic trans:mission path with a destination address at its head and an end destination address at its end as well.

13. A message transmission system including an electronic message forming apparatus comprising:

a text means for forming a text of an electronic message;

a code means for giving an electronic identification code to the electronic message;

a kind information means for generating a kind information including a kind of the electronic message;

said electronic message identification code given by said code means and destination addresses;

a composing means for composing said kind information and said text formed by said text means; and an original message transmission means for transmitting an original electronic message composed by said composing means, a transmission path determining device for receiving said original electronic message from said electronic message forming apparatus and determining a transmission path of said electronic message comprising;

a receiving means for receiving an electronic message including a kind information containing an electronic message identification code, a kind of the electronic message, destination addresses and a text;

a kind information separating means for separating said kind information from said text in said electronic message;

a transmission path memory means for memorizing basic transmission paths each expressed in an order of destination addresses determined according to every kind of said electronic message;

a transmission information forming means for searching a relevant basic transmission path among those memorized in said transmission path memory means according to the kind of said electronic message obtained by said kind information separating means and forming a transmission information including said basic transmission path provided with said destination addresses at its head, said electronic message identification code and additional transmission mode information;

a transmission information composing means for composing said transmission means and said text; and a transmission means for transmitting the composed electronic message to a head destination address of said basic transmission path after putting "Finished" code to said destination address and setting said transmission mode of said electronic message as "Transmission" and, thereafter, transmitting said transmission mode to said destination address after renewing it to "Notice", a plurality of message processing apparatuses each comprising:

a receiving means for receiving an electronic message including transmission information having transmission mode information showing each state of transmission/notice/completion, electronic message identification codes and a transmission path expressed in an order of addresses and a text to be processed;

a transmission information separating means for separating said transmission information from said text in said electronic message;

a transmission status memory means for memorizing said transmission information obtained from said transmission information separating means;

a memory control means for checking said transmission information and up-dating said transmission status memory means so as to memorize a set of said electronic message identification code and said transmission path additionally after putting "Finished" code to a relevant address within said transmission path if said transmission mode is "Transmission", renews said transmission path information related to a set having an electronic message identification code which coincides with said electronic message identification code corresponding said transmission mode if it is "Notice", and deletes the set having on electronic message identification code which coincides with said electronic message identification code corresponding to said transmission mode if it is "Completion", and a terminal noticing device for transmitting said transmission mode to one prior address to the relevant address after renewing said transmission mode to "Completion" without demanding processing of said text when said electronic message is transmitted thereto.

14. A message transmission system including
an electronic message forming apparatus comprising:
a text means for forming a text of an electronic message;
a code means for giving an electronic identification code to the electronic message;
a kind information means for generating a kind information including a kind of the electronic message;
said electronic message identification code given by said code means and destination addresses;
a composing means for composing said kind information and said text formed by said text means; and
an original message transmission means for transmitting an original electronic message composed by said composing means,
a transmission path determining device for receiving said original electronic message from said electronic message forming apparatus and determining a transmission path of said electronic message comprising;
a receiving means for receiving an electronic message including a kind information containing an electronic message identification code, a kind of the electronic message, destination addresses and a text;
a kind information separating means for separating said kind information from said text in said electronic message;
a transmission path memory means for memorizing basic transmission paths each expressed in an order of destination addresses determined according to every kind of said electronic message;
a transmission information forming means for searching a relevant basic transmission path among those memorized in said transmission path memory means according to the kind of said electronic message obtained by said kind information separating means and forming a transmission information including said basic transmission path provided with said destination addresses at its head, said electronic message identification code and additional transmission mode information;
a transmission information composing means for composing said transmission means and said text; and
a transmission means for transmitting the composed electronic message to a head destination address of said basic transmission path after putting "Finished" code to said destination address and setting said transmission mode of said electronic message as "Transmission" and, thereafter, transmitting said transmission mode to said destination address after renewing it to "Notice",
a transmission means for transmitting the composed electronic message to a head destination address of said basic transmission path after putting "Finished" code to said destination address and setting said transmission mode of said electronic message as "Transmission" and thereafter transmitting said transmission mode to said destination address after renewing it to "Notice",
a plurality of message processing apparatuses each transmitting means said transmission mode to one prior address to the relevant address after renewing said transmission mode to "Notice", and after transmitting said electronic message to said next address, if said transmission mode is "Transmission" i.e., if there exists a next address to the relevant address when said transmitting means checks said transmission mode to said electronic message obtained from said transmission information composing means and transmits said transmission mode to one prior address to the relevant address after renewing said transmission mode to "Completion" if there does not exist the next address to the relevant address.

15. A message transmission system including
an electronic message forming apparatus comprising:
a text means for forming a text of an electronic message;
a code means for giving an electronic identification code to the electronic message;
a kind information means for generating a kind information including a kind of the electronic message;
said electronic message identification code given by said code means and destination addresses;
a composing means for composing said kind information and said text formed by said text means; and
an original message transmission means for transmitting an original electronic message composed by said composing means,
a transmission path determining device for receiving said original electronic message from said electronic message forming apparatus and determining a transmission path of said electronic message comprising;
a receiving means for receiving an electronic message including a kind information containing an electronic message identification code, a kind of the electronic message, destination addresses and a text;
a kind information separating means for separating said kind information from said text in said electronic message;
a transmission path memory means for memorizing basic transmission paths each expressed in an order of destination addresses determined according to every kind of said electronic message;
a transmission information forming means for searching a relevant basic transmission path among those memorized in said transmission path memory means according to the kind of said electronic message obtained by said kind information separating means and forming a transmission information including said basic transmission path provided with said destination addresses at its head, said electronic message identification code and additional transmission mode information;
a transmission information composing means for composing said transmission means and said text; and
a transmission means for transmitting the composed electronic message to a head destination address of said basic transmission path after putting "Finished" code to said destination address and setting said transmission mode of said electronic message as "Transmission" and, thereafter, transmitting said transmission mode to said destination address after renewing it to "Notice",
a plurality of message processing apparatuses each of which transmits said transmission mode to all prior addresses to the relevant address after renewing said transmisson mode to "Notice" and after transmitting said electronic message to a next address to the relevant address if said transmission mode is "Transmission" and stops its operation if said transmission mode is "Notice" or "Completion", and
a terminal noticing apparatus for transmitting said transmission mode to all prior addresses to the relevant address after transmitting said electronic message to said next address without demanding processing of said text if there exists a next address to the relevant address i.e. if said transmission mode is "Transmission" and transmitting said transmission mode to all prior addresses to the relevant address after renewing said transmission mode to "Completion" without demanding processing of said text if there does not exit a next address to the relevant address.

16. A message transmission system including an electronic message forming apparatus comprising:

a text means for forming a text of an electronic message;

a code means for giving an electronic identification code to the electronic message;

a kind information means for generating a kind information including a kind of the electronic message;

said electronic message identification code given by said code means and destination addresses;

a composing means for composing said kind information and said text formed by said text means; and an original message transmission means for transmitting an original electronic message composed by said composing means;

a transmission path determining device for receiving said original electronic message from said electronic message forming apparatus arid determining a transmission path of said electronic message comprising;

a receiving means for receiving an electronic message including a kind information containing an electronic message identification code, a kind of the electronic message, destination addresses and a text;

a kind information separating means for separating said kind information from said text in said electronic message;

a transmission path memory means for memorizing basic transmission paths each expressed in an order of destination addresses determined according to every kind of said electronic message;

a transmission information forming means for searching a relevant basic transmission path among those memorized in said transmission path memory means according to the kind of said electronic message obtained by said kind information separating means and forming a transmission information including said basic transmission path provided with said destination addresses at its head, said electronic message identification code and additional transmission mode information;

a transmission information composing means for composing said transmission means and said text, and a transmission means for transmitting the composed electronic message to a head destination address of said basic transmission path after putting "Finished" code to said destination address and setting said transmission mode of said electronic message as "Transmission" and, thereafter, transmitting said transmission mode to said destination address after renewing it to "Notice", and a plurality of message processing apparatuses each transmitting said transmission mode to all prior addresses to the relevant address after renewing said transmission mode to "Notice" and after transmitting said electronic message to said next address if there exists a next address to the relevant address i.e. if said transmission mode is "Transmission" and transmitting said transmission mode to all prior addresses to the relevant address after renewing said transmission mode to "Completion" if there does not exit a next address to the relevant address.

* * * * *